United States Patent
Anthony et al.

(10) Patent No.: US 6,976,020 B2
(45) Date of Patent: Dec. 13, 2005

(54) SOFTWARE COMPOSITION USING GRAPH TYPES, GRAPH, AND AGENTS

(75) Inventors: Jon S. Anthony, Arlington, MA (US); Dean T. Allemang, Boston, MA (US)

(73) Assignee: Poppet International, Inc., Oakland, CA (US)

( * ) Notice: Subject to any disclaimer, the term of this patent is extended or adjusted under 35 U.S.C. 154(b) by 452 days.

(21) Appl. No.: 10/182,295

(22) PCT Filed: Jan. 26, 2001

(86) PCT No.: PCT/US01/02688

§ 371 (c)(1),
(2), (4) Date: Jul. 26, 2002

(87) PCT Pub. No.: WO01/55898

PCT Pub. Date: Aug. 2, 2001

(65) Prior Publication Data

US 2003/0069908 A1 Apr. 10, 2003

Related U.S. Application Data

(60) Provisional application No. 60/178,363, filed on Jan. 27, 2000.

(51) Int. Cl.[7] ............................................. G06F 17/30
(52) U.S. Cl. .................... 707/6; 707/102; 707/104.1
(58) Field of Search ...................... 707/6, 102, 104.1; 706/45; 715/513

(56) References Cited

U.S. PATENT DOCUMENTS

| | | | | | |
|---|---|---|---|---|---|
| 5,444,837 A | * | 8/1995 | Bomans et al. | ............. | 345/440 |
| 5,506,985 A | * | 4/1996 | Motoyama et al. | ......... | 715/523 |
| 5,727,158 A | * | 3/1998 | Bouziane et al. | ........... | 709/225 |
| 5,732,192 A | * | 3/1998 | Malin et al. | .................... | 703/2 |
| 5,802,529 A | * | 9/1998 | Nakatsuyama et al. | ..... | 715/513 |
| 5,887,171 A | * | 3/1999 | Tada et al. | .................. | 719/317 |
| 6,009,436 A | * | 12/1999 | Motoyama et al. | ......... | 707/102 |
| 6,038,573 A | * | 3/2000 | Parks | ......................... | 715/513 |
| 6,041,331 A | * | 3/2000 | Weiner et al. | .......... | 707/103 R |
| 6,125,351 A | * | 9/2000 | Kauffman | ...................... | 705/7 |
| 6,154,738 A | * | 11/2000 | Call | ............................. | 707/4 |
| 6,191,787 B1 | * | 2/2001 | Lu et al. | ..................... | 345/418 |
| 6,476,814 B1 | * | 11/2002 | Garvey | ........................ | 345/440 |
| 6,556,983 B1 | * | 4/2003 | Altschuler et al. | ............ | 706/55 |
| 6,574,655 B1 | * | 6/2003 | Libert et al. | ................ | 709/200 |
| 6,662,355 B1 | * | 12/2003 | Caswell et al. | ............. | 717/103 |

* cited by examiner

Primary Examiner—Wayne Amsbury
(74) Attorney, Agent, or Firm—Gordon E. Nelson

(57) ABSTRACT

An environment for composing software permits the separation of control functions from information about the context in which the control functions operate. The software composition environment is used to make a system which will translate XML documents into models and vice-versa. The translation system is used to translate an XML document having one DTD into an XML document having another DTD by translating the first XML document into a model representing the semantics of the XML document and translating the model into the second XML document (2005). The system for translating XML documents into models employs a general technique for translating any XML documents into a mirror model (2107) that reflects the structure of the XML document and a general technique of using tag pattern models (2109) to obtain information from one model and using it to make or modify another model. In the system for translating XML document, the tag pattern models are used to translate mirror models into semantic models and vice-versa.

41 Claims, 25 Drawing Sheets

SOFTWARE COMPOSITION USING GRAPH TYPES, GRAPH, AND AGENTS

CROSS REFERENCES TO RELATED APPLICATIONS

The present application claims priority from U.S. provisional application No. 60/178,363, D. T. Allemang, System for translating XML documents into interactive multimodal semantic models and translating such models into AML documents, filed 27 Jan. 2000 and is a continuation-in-part of the international patent application PCT/US00/01042, J. S. Anthony, A system for composing applications based on explicit semantic models, event driven autonomous agents, and resource proxies, filed 14 Jan. 2000 and claiming priority from U.S. provisional application No. 60/116,257, J. Anthony, et al., A system for composing applications based on interacting multimodal models and the explicit separation of models and their subjects, filed 16 Jan. 1999. The present patent application contains the complete Detailed Description and figures of PCT/US00/01042. The new material begins with the section Innovations and benefits of the Ariadne system and includes new FIGS. 18–26.

BACKGROUND OF THE INVENTION

1. Field of the Invention

The invention pertains generally to techniques for composing software and more particularly to composition techniques which permit separate specification of context information and control information. The software composition techniques are illustrated with an example that shows how they can be employed to implement a new technique for converting XML having one DTD into XML that has another DTD. The new technique in turn employs new generally-applicable techniques for making or modifying a graph from information contained in another graph.

2. Background of the Invention a. Software Composition Architecture

One of the main goals behind the design of the Ariadne system disclosed in the parent of the present patent application was to provide a capability for a new paradigm for software composition. In other composition frameworks (e.g., Object Oriented Programming, Modular Programming), information about the context of use of a program are intertwined with the control structure of the program in the program code; if one wanted to reuse the control information in a new semantic context, one would have to reverse engineer the code to separate these aspects, and reengineer a solution in the new context.

What is needed is a program composition architecture that separates control information from contextual information. Such an architecture would allow for a more robust kind of reuse than is possible in any program component based reuse paradigm. It is an object of the present patent application to provide such an architecture b. Using the Software Composition Architecture to Solve an XML Translation Problem XML (extensible Markup Language), described in George Lawton, "Unifying Knowledge with XML", Knowledge Management, August 1999, is an emerging standard for information interchange between applications. XML advocates promise that XML will create a true "open system" environment in which it is easy to create integrated systems that exchange information using XML. In order for XML to be able to deliver on these promises, it must be possible to read and write information in XML easily and smoothly. As part of the standardization process, XML parsers and the Document Object Model (DOM) have been made available in the public domain to perform the basics of processing XML. Using these tools is a skilled programming task. With these tools, system integration involves settling on an XML template (called a DTD) that defines how the XML documents will be formatted. Then all the information in each system is exported/imported into/from XML using this DTD. If both systems use the same DTD, then this happens quite smoothly, and the overall system integration proceeds as promised. Certain aspects of this integration process can be simplified by current tools; for example, Bluestone Software provides tools that allow non-programmers to create XML documents and DTDs using graphical interfaces, making certain parts of this process more easily edited by non-programmers.

The problem facing the industry today is that there is no standards body for the DTDs. Each individual who uses an XML application can create his or her own DTD. In the case of multiple DTDs, interchange will require more sophisticated tools than just parsers and servers; there needs to be a way to match patterns in an XML document and do something with them. The W3 consortium has recognized this problem, and is addressing it with the XML Query Language, explained in The W3 Consortium, XML Query Language Workshop CFP, http://www.w3.org/TandS/QL/QL98/cfp. However, the XML query language only deals with specifying searches through an XML document, not with the problem of transforming the XML document into another form. Thus proposed solutions to the W3 XQL call can only solve part of the problem; the problem of translating information from one DTD to another remains. It is thus another object of the present patent application to provide a technique for translating information from one DTD to another.

SUMMARY OF THE INVENTION

One of the design aims of the Ariadne system described in the parent of the present patent application is to provide a software composition architecture that separates control information from contextual information; in the Ariadne system, context is specified by defining graph types and making graphs of the types and control information is specified by defining agents that operate in the contexts provided by graphs of particular types. The program composition architecture provided by Ariadne is used to implement new techniques for extracting information from one graph and using the information to make or modify another graph and these techniques are in turn used to implement new techniques for translating an XML document into an Ariadne graph that represents the semantics of the XML document and vice-versa. The semantic representation and the new techniques are then used to implement a new system for translating an XML document having one DTD into another XML document that has similar semantics but a different DTD.

Other objects and advantages will be apparent to those skilled in the arts to which the invention pertains upon perusal of the following Detailed Description and drawing, wherein:

Figure 1:
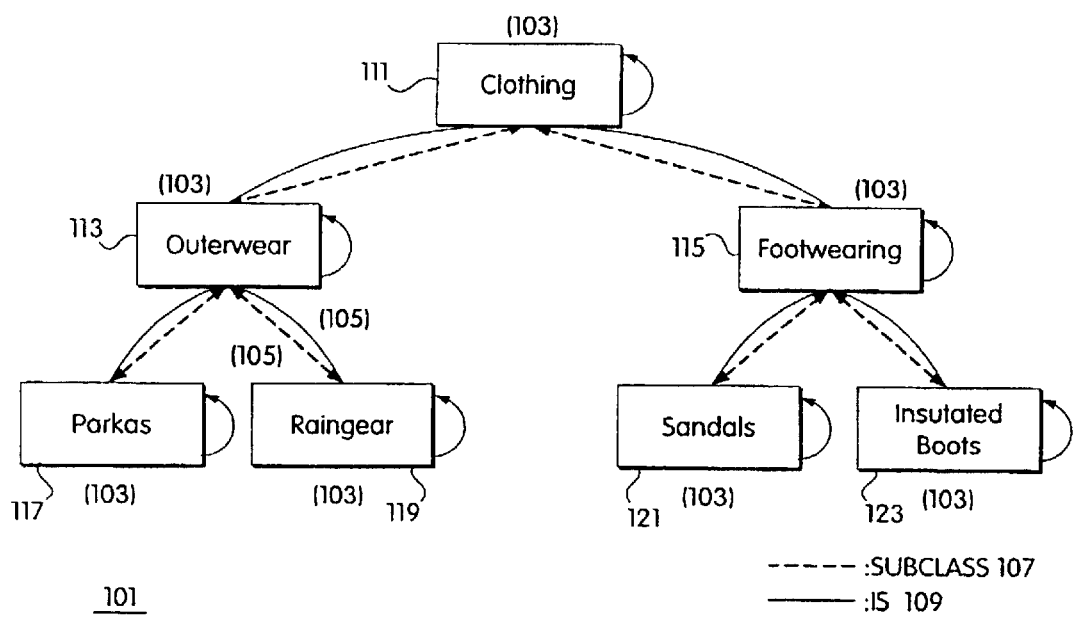
FIG. 1 illustrates how graphs may be used to show relationships among entities.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

The following Detailed Description will begin with a simple example of how the invention may be used and a description of an implementation of the example and will conclude with a generalized description of the invention.

Using Graphs to Specify Multiple Aspects of a Collection of Data: FIG. 1

For purposes of the following informal discussion, the term graph is used in the sense of a set of points where at least one of the points is connected to itself or another point by an arc. The points are termed the vertices of the graph and the arcs are termed its edges. In the graphs used in the invention, the vertices represent entities such as concepts and the edges represent relationships between the concepts. In FIG. 1, graphs are used to represent a taxonomy 101 of concepts relating to clothing. The concepts belonging to a given taxonomy are related to each other in both a top-down fashion, i.e., from the most general concept to the least general concept, and a bottom-up fashion, i.e., from the least general concept to the most general. In the top-down relationship, the concepts are related as class and subclass; for example, in taxonomy 101, footwear is a subclass of clothing and insulated boots is a subclass of footwear. The bottom-up relationship is termed an is a relationship, i.e., insulated boots is one of the concepts of footwear and footwear is one of the concepts of clothing.

Thus, in taxonomy 101, each vertex 103 represents a concept relating to clothing, and edges 105 connect the vertices 103. The arrowhead on the edge indicates the direction of the relationship. There are two graphs in FIG. 1; one graph, indicated by dashed straight lines 107, indicates the subclass relationships between the concepts represented by the vertices; the other graph, indicated by solid arcs 109, indicates the is a relationships. Thus, graph 107 shows that outerwear 113 and footwear 115 are subclasses of clothing 111 and parkas 117 and raingear 119 are in turn subclasses of outerwear 113. Further, as shown by solid arcs 109, sandals 121 has an is a relationship to footwear 115, footwear 115 has an is a relationship to clothing 111, and so forth for the other concepts. Each concept has a solid arc 119 pointing to itself because each concept is itself, and therefore has an is a relationship with itself.

Subclass graph 107 and is a graph 109 thus organize the set of clothing concepts in FIG. 1 according to two aspects: a subclass aspect and an is a aspect. Subclass graph 107 tells us that outerwear 113 has two subclasses: parkas 117 and raingear 119; is a graph 109 tells us that outerwear 113 is clothing 111. Graphs 107 and 109 make it possible to consider any concept in taxonomy 101 from the point of view of its subclass relationships to other concepts and from the point of view of its is a relationships to other concepts. The operation of considering an entity in taxonomy 101 first as it belongs to one of the graphs and then as it belongs to another of the graphs is termed pivoting. The concepts of FIG. 1 can of course have relationships other than those of taxonomy 101, and those relationships, too, can be represented by graphs made up of concepts belonging to the set shown in FIG. 1 and edges connected to them. Each such graph organizes the set of clothing concepts according to another aspect, and pivoting permits a given concept to be seen according to any of the aspects represented by any of the graphs that the concept belongs to.

Figure 2:
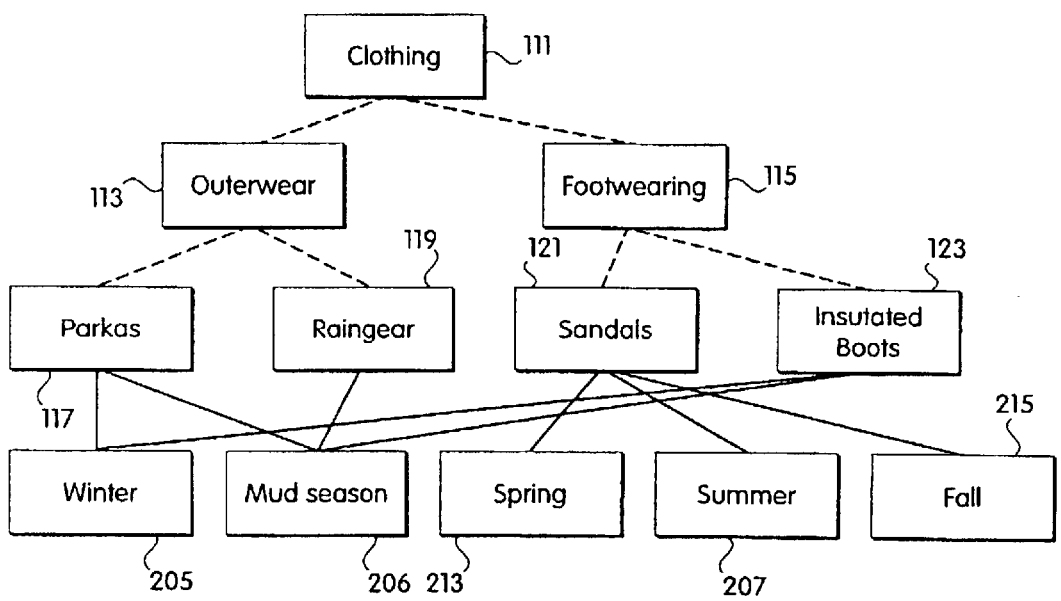
FIG. 2 shows a complex model.

Models and Facets: FIG. 2

Taxonomy 101 is of course only one of many possible ways of organizing the set of concepts shown in FIG. 1. In the following discussion, a particular way of organizing a set of concepts or other entities is termed a model. Thus, in FIG. 1, the concepts are organized according to a taxonomy model. As we have seen, when concepts are organized in this fashion, the relationships between them are shown by two graphs: subclass graph 107 and is a graph 109; each of these graphs is termed a facet of the model; thus the taxonomy model of FIG. 1 has a subclass facet 107 and an is a facet 109. The pivoting operation permits a concept in the set to be considered according to each of the facets that the concept belongs to.

The model of FIG. 1 is simple, i.e., it is a single taxonomy. A model may, however, also be complex, i.e., composed of two or more models. FIG. 2 shows such a complex model 201. In FIG. 2, the set of concepts of FIG. 1 has been expanded so that the items of clothing can be organized according to the season they are appropriate for. The new concepts represent the five seasons of the New England climate: winter 205, mud season 206, spring 213, summer 207, and fall 215. The set of concepts shown in FIG. 2 is organized according to complex model 201, which in turn is made up of two simple models. Clothing taxonomy model 209 is the taxonomy model shown in FIG. 1; seasonal clothing model 211 is a model of type simple graph which relates concepts representing clothing to concepts representing the five New England seasons. The facets of model 211 relate a season concept to clothing concepts for the kinds of clothing worn in the season and a clothing concept to the seasons in which the clothing is worn. The concepts parkas 117, raingear 119, sandals 121, and insulated boots 123 belong to both models. Considered as part of clothing model 209, sandals 121 is a subclass of footwear 115; considered as part of the seasonal clothing model, sandals 121 is related to the seasons in which sandals are worn, namely spring, summer, and fall. Outerwear 113, on the other hand, belongs only to clothing model 209, while winter 205 belongs only to seasonal clothing model 211.

Complex models permit additional operations. For instance, pivoting may be used with complex model 201 to consider a given concept according to each facet of each of the models the concept belongs to. For example, the concept sandals may be considered on the one hand as it is related to the concepts of clothing model 209 and on the other as it is related to the concepts of seasonal clothing model 211. Moreover, since each model organizes the concepts in different ways, the models define different sets of concepts and set operations such as union, intersection, difference, and set xor may be applied.

Model Types

Any set of entities which belongs to a taxonomy can be organized by means of a taxonomy model like model 209. Just as all taxonomies are alike in how they organize the entities that belong to them, any taxonomy model will have an is a facet and a subclass facet and similar relationships will exist between the entities belonging to a given facet. Moreover, any user of a taxonomy model will want to perform similar operations using the taxonomy. For example, a user will want to display all of the concepts that are subclasses of a given concept or all of the concepts that a given concept has an is a relationship with. One can thus speak of the taxonomy model type, and all other models will similarly belong to model types. As with models, a model type may be either simple or complex. Because all models belonging to a given model type have similar operations, it is possible to define those operations for the model type and make them automatically available for any model of the type.

In the present invention, users of the invention may define their own model types or use model types defined by others. A model type is defined as follows:

a facet specifier specifies each of the facets belonging to models of the type;

within each facet specifier, a relation specifier that specifies how entities joined by an edge of the facet are related;

propagation specifiers for the facets and/or the entire model; a propagation specifier specifies how operations belonging to models having the model type are performed.

The model type for the taxonomy model thus has a subclass facet specifier for the subclass facet and an is a facet specifier for the is a facet. The relation specifier for the subclass facet specifies that the subclass relationship is transitive, non-reflexive, and non-symmetric. The fact that the relationship is transitive means that if entity A is a subclass of entity B and entity C is a subclass of entity B, then entity C is a subclass of entity A, or in terms of FIG. 1, that parkas 117 is a subclass of clothing 111. The fact that the subclass relationship is non-reflexive means that an entity cannot be a subclass of itself (which is why there are no edges of subclass graph 107 connecting an entity to itself). The fact that the relationship is non-symmetric means that if entity B is a subclass of entity A, entity A cannot be a subclass of entity B or in terms of FIG. 1, if parkas 117 is a subclass of outerwear 113, outerwear 113 cannot be a subclass of parkas 117. The relation specifier for the is a facet specifies that the is a relationship is transitive, reflexive, and non-symmetric. Thus, as shown in FIG. 1, parkas 117 is itself as well as outerwear and clothing, but if parkas are outerwear, then outerwear cannot be (just) parkas.

The relation specifiers are used to define procedures for adding concepts to models belonging to the class. For instance, if new concepts, say swimwear, bathing suits, and wetsuits are added to the model of FIG. 1, with swimwear being a subclass of clothing and bathing suits and wetsuits being subclasses of swimwear, the relation specifiers will ensure that there are edges in the subclass facet connecting clothing to swimwear and swimwear to bathing suits and wetsuits, but no edges in the subclass facet connecting clothing to wetsuits or bathing suits to wetsuits, and will similarly ensure that there are edges in the is a facet connecting each of the new concepts to itself and wetsuits and bathing suits to swimwear and swimwear to clothing, but no edges connecting wetsuits and bathing suits to clothing and none connecting wetsuits and bathing suits to each other.

One example of a propagator for a taxonomy is a subclass display propagator that displays all of the subclasses belonging to a class. The subclass display propagator works by simply following the subclass facet beginning at the specified class. Thus, if the class is clothing, the display propagator will display outerwear 113, parkas 117, raingear 119, footwear 115, sandals 121, and insulated boots 123. Another example is an is a display propagator that displays the concepts that the specified concept belongs to. This propagator simply follows the is a facet beginning at the specified concept. Thus, for sandals 121, it will display sandals 121, footwear 115, and clothing 111.

Figure 3:
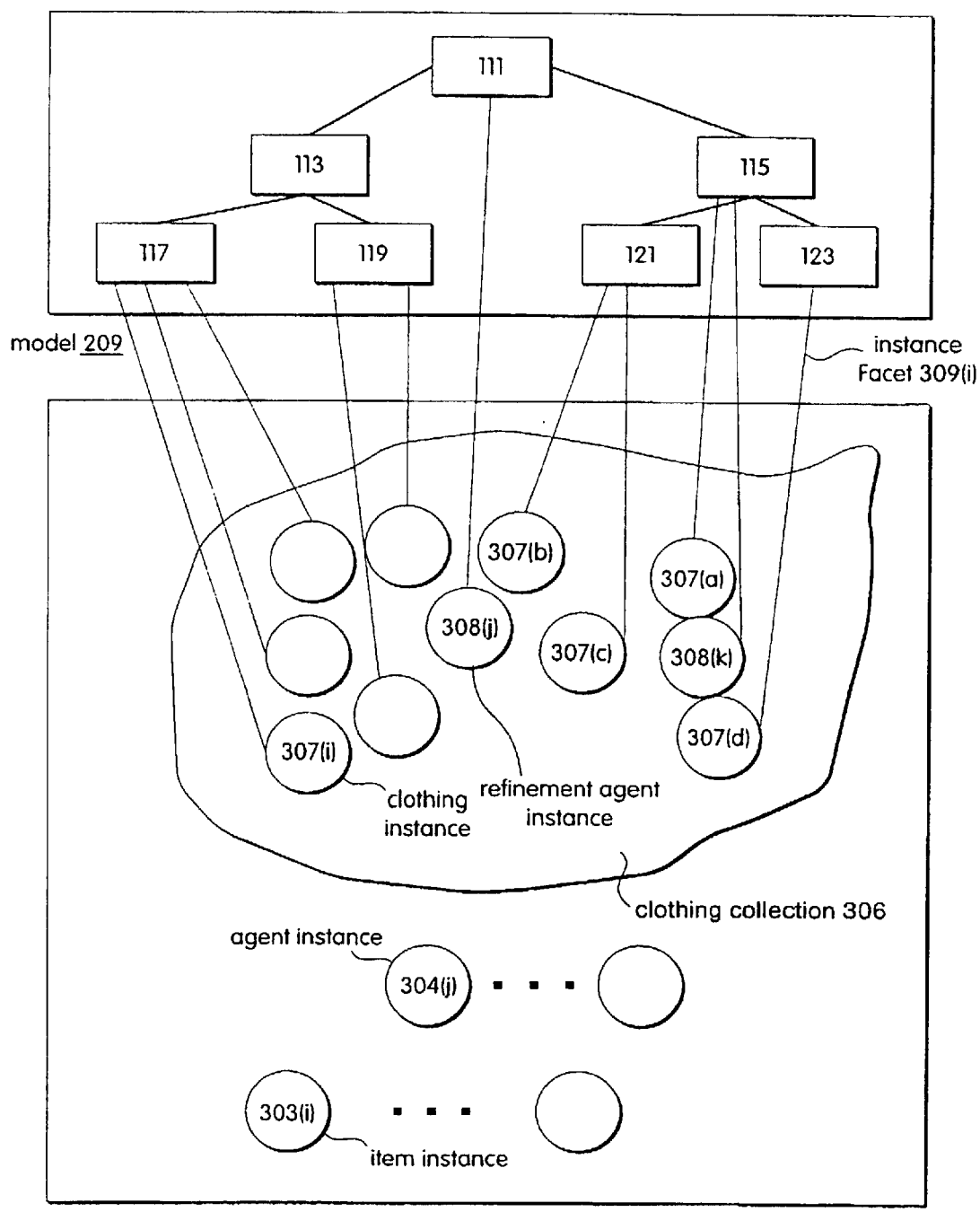
FIG. 3 shows how the concepts of a model are related to instances and agents.

Relating Concepts to the World: FIG. 3

In order to be useful, the cards in a library card catalog relate the concepts used in the catalog to books in the library. The same is true with concepts organized by models. In order for the concepts to be useful, they must be related to entities that are examples of the concepts. In the invention, an entity that is or may be an example of a concept is termed an instance, and an instance that is an example of a concept is termed an instance of the concept. It should be pointed out here that one of the things which may be an example of a concept is a model, and thus, an instance may be a model. Using models as instances in other models is one way of making complex models.

All of the instances available to a system in which the invention is implemented is termed the world of the system. In general, one makes a model to deal with a given area from several aspects, and this area is termed the model's subject. For example, the subject of model 209 is clothing and all of the instances of its concepts represent items of clothing. One thus makes a model for a subject and then relates the model to instances in the world that are relevant to the model's subject. The instances in the world that are relevant to a given subject are termed the subject's collection.

FIG. 3 shows how concepts are related to instances in a preferred embodiment. FIG. 3 shows a set 301 of instances representing objects accessible to the system upon which model 209 is being used. This set 301 is termed herein the world of the model. The subject of model 209 is clothing; in FIG. 3, instances belonging to clothing's collection are surrounded by a curve, as shown at 306. Thus, in FIG. 3, model 209 is being applied to world 301, but the instances with which it is actually concerned belong to clothing collection 306. Item instances in clothing collection 306 are consequently termed clothing instances 307. The instances in clothing collection 306 with which model 209 is concerned all represent items of clothing or agents, as will be explained below; however, other instances in clothing collection 306 may represent models. Of course, more than one set of concepts may apply to a subject or a world and a given set of concepts may be applied to different subjects or worlds.

There are two kinds of instances in world 301: item instances 303, which represent items, including other models, that may be related to concepts, and agent instances 304, which represent programs that are executed by models in response to the occurrence of events such as the addition of a concept to the model or a request by a user to view items belonging to a given concept. While the program represented by an agent may be any program at all, the program executes in the context of the model and can thus take advantage of the model's facets and propagators. In effect, the operations defined for the model are available to agents in the same fashion that programs belonging to run-time libraries are available to application programs.

The mechanism by which an item instance 303 or an agent instance 304 is related to a concept is an instance facet 309. There is an instance facet 309 for each instance that is related to a given concept. Thus, instance facets relate clothing instances 307($b$ and $c$) to concept 121. Of course, an instance may have instance facets connecting it to more than one concept and even to concepts belonging to different models. Generally, the item represented by an instance has another representation, termed an object, in the computer system. What kind of object an instance represents will depend on the application for which the invention is being used. For example, the clothing instances might represent database identifiers of rows describing products in a database table describing a clothing company's products or they might be URLs of WEB pages describing the products.

Propagators may work on instances as well as concepts. For example, a propagator may be defined for the taxonomy model type which retrieves all of the instances associated with a concept and its subclasses. It does so by first following the instance facets for the concept and retrieving all of the concept's instances. Then it follows subclass facet 107 from the concept to its subclasses, their subclasses, and so on down to concepts which have no subclasses. At each concept, the propagator retrieves the instances associated with the concept. Thus, in FIG. 3, when the propagator is applied to concept 115, it will retrieve the clothing instances 307 labeled a,b,c,d in collection 306.

One agent instance is shown in collection 306: the instance for refinement agent 308. Refinement agent 308 is executed when a concept representing a new subclass is added to model 209. For example, in model 209 as shown in FIG. 1, the concept footwear 115 has two subclasses: sandals 121 and insulated boots 123. Instances which belong to neither of those subclasses belong to footwear. One such instance, 307($a$), is shown in FIG. 3. The instance represents gardening clogs. Now, the user of the model is planning to sell more kinds of clogs and consequently decides to add the concept clogs as a subclass of footwear. When that is done, instance 307($a$) should become an instance of clogs rather than an instance of footwear. This process of moving an instance into the proper subclass concept is termed refinement, and refinement agent instance 308 automatically does refinement whenever a subclass concept is added to model 209.

In FIG. 3, refinement agent instance 308 is shown attached to clothing concept 111 and to footwear concept 115. Clothing concept 111 is the broadest concept in the model and is termed the root concept of the model. Of course, every model of type taxonomy has a root concept. In models of the taxonomy type, an agent attached to a concept propagates along subclass facet 107; thus, any concept which is a subclass inherits the agent. Consequently, each concept in model 209 has its own copy of refinement agent instance 308. In FIG. 3, only the copies for clothing 111 and footwear 115 are shown. Since each concept has its own copy of refinement agent instance 308, execution of the agents can be done in parallel.

When the user adds the new subclass clogs to footwear 115, that event causes refinement agent instance 308($k$) to execute. The program follows the subclass facet to the new subclass concept clogs and examines it to determine whether any of the item instances that are related to it are also related to footwear 115. One such item instance, garden clogs, is, and the program rearranges the instance facets 309 so that there is now an instance facet relating clogs to garden clogs, but no longer an instance facet relating footwear to garden clogs. As can be seen from the foregoing, an agent, while user-defined, operates within the context of the environment provided by the model and takes advantages of the operations defined for the model's type.

Figure 4:
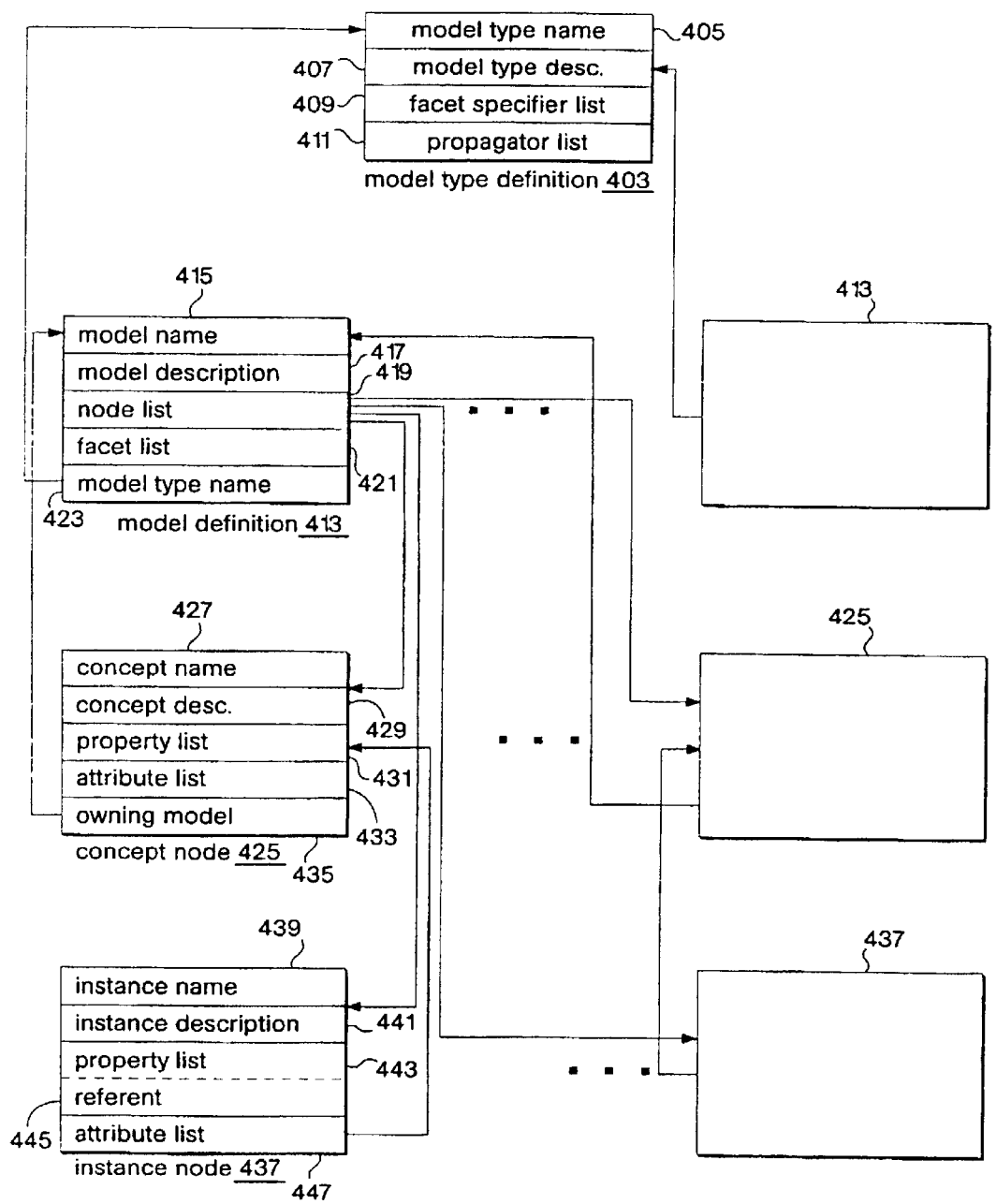
FIG. 4 shows the structures that represent model types, models, concepts, and instances in a preferred embodiment.

Representing Models, Concepts and Instances: FIG. 4

FIG. 4 shows at 401 how the representations of model types, models, concepts, and instances are structured in a preferred embodiment. In overview, as shown by the arrows in FIG. 4, each model definition 413 refers to a model type definition for its model type and to a set of node structures. Some of the node structures represent concepts belonging to the model and others represent instances of the concepts. Each concept node 425 refers to its model and each instance node 437 refers to the concepts the node is instances of. There may be many models of a given model type, a given model may have many concepts, a given concept may have many instances and a given instance may be an instance of many concepts. A model type definition may thus be located from any model definition of its type, a model definition may be located from any of its concepts, and a concept may be located from any of its instances.

Continuing in more detail, model type definition 403 includes the model type's name 405, a description 407 of the model type, a facet specifier list 409 that specifies the kinds of facets that models of the type have, and a propagator list 411 that specifies the propagators for models of the type.

Model definition 413 includes the model's name and description at 415 and 417, a list 419 of the concept and instance nodes in the model, a facet list 421 showing how the model's nodes are related by each facet of the model, and a model type name 423, which refers back to the model type definition 403 for the model.

Concept node 425 includes the concept's name and description at 427 and 429, a property list 431, which is a list of user-defined properties of the concept, and attribute list 433, which is a list of attributes for the concept. Each attribute specifies the name of a facet to which the concept node belongs and the name of the node which is the next neighbor of the concept node in the facet. The facets, and correspondingly, the attributes may be subdivided into model facets, which specify facets whose vertices are made up only of concepts of the model, and instance facets, which specify facets connecting concepts and instances. What kinds of model facets a model has is determined by its model type; in a preferred embodiment, there are three kinds of instance facets that run from the concept to an instance:

item facets, which connect a concept to an item instance representing an item that belongs to the concept;

exhibitor facets, which connect a concept to an item instance representing an item that possesses a property specified by the concept; and action facets, which connect a concept to an agent instance.

Exhibitor facets are used to deal with concepts like color. A blue clog, for example, exhibits the property of being blue and would therefore be connected to a concept representing the color blue by an exhibitor facet. Owning model 435, finally, refers to model definition 413 for the model the concept belongs to.

Instance node 439, finally, has an instance name 439, an instance description 441, and a property list 443 for the instance. Included in property list 443 is referent 445, which specifies how to locate the object represented by instance node 439. What the referent is depends on what kind of object the instance node represents. For example, if the instance node represents a Web page, the referent will be the page's URL; if it represents an agent, it may be a pathname for the agent's code; if it represents another model, the referent will be the model's name. Attribute list 447, finally, specifies the instance facets that run from the instance to the concepts it belongs to. There is one such facet corresponding to each of the instance facets running from the concept to the instance. Each of these facets is termed the dual of the corresponding facet. Thus, the item of facet is the dual of the item facet; exhibitor of is the dual of the exhibitor facet; and action of is the dual of the action facet.

Applying all of the foregoing to concept 115 of model 209, we see that concept node 425 for that concept has model attributes for the subclass facet for concepts 121 and 123 and for the is a facet for itself and for concept 111, an item instance attribute for clothing instance 307(a), and an action instance attribute for refinement agent instance 308 (k). Instance node 437 for clothing instance 307(a) has an item of instance attribute for concept 115 and the instance node for refinement agent instance 308(k) has an action of attribute for concept 115.

In a preferred embodiment, the structures that make up the components of a model are all linked by name, and hash functions and hash tables are used to relate names in the structures to the locations of the structures in memory. For example, to find a concept instance, the preferred embodiment takes the name and presents it to a hash function, which hashes the name to obtain an index of an entry in a hash table and uses the index to find the entry for the name in the hash table; that entry contains a pointer to the location of the concept instance. In other embodiments, other techniques such as pointers might be used to link the components of the structures 401 that represent a model.

Figure 5:
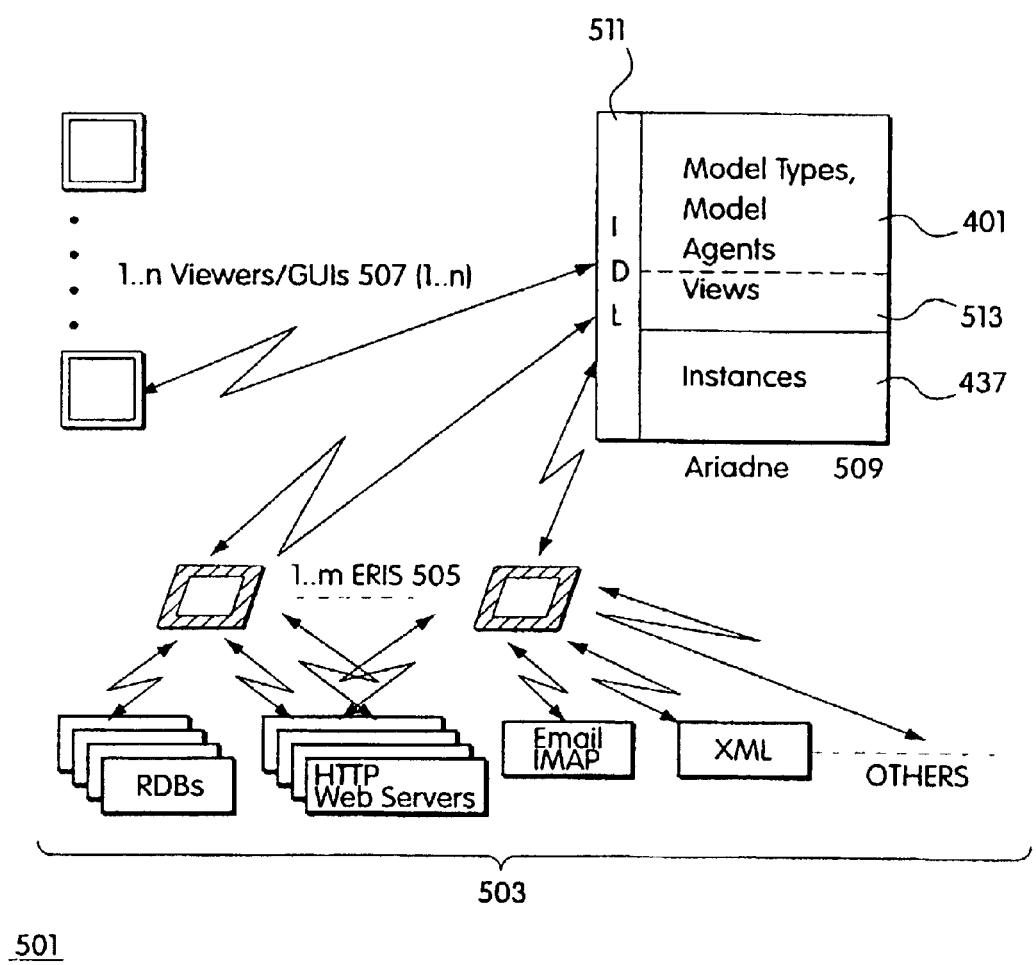
FIG. 5 is an overview of a system in which models and model types are implemented.

A System that Uses Models to Organize Information: FIG. 5

FIG. 5 is an overview of a system 501 that uses models to organize information. The system, called Ariadne, has three major components:

server 509 maintains the data structures 401 that implement model types, models, and instances, together with views 513, which provide logical descriptions of models and their parts, but do not specify how the model will appear in a specific GUI.

a number of viewers 507, which present the contents of the views as required for particular graphical user interfaces (GUIs); and ERIS (external resource interface system) 505, which provides access to the systems 503 that contain the objects represented by instances 407.

Server 509 may be implemented on any kind of computer system, and viewers 507 may be monitors, Web browsers, PC's or other systems that have either local or remote access to the computer system upon which server 509 is implemented. As shown in FIG. 5, the outside systems accessed via ERIS 505 may include relational database systems, with the objects being records or queries, Web servers, with the objects being Web pages, email systems, with the objects being email messages, and systems that use XML as their interface to other systems. The viewers 507 and the components of ERIS 505 interact with the model types, models, agents, views, and instances by way of interfaces 511 defined using Interface Definition Language (IDL).

An example of how system 501 functions is the following: A user of a viewer 507(i) is interacting with clothing model 209 via a graphical user interface and wishes to see all of the instances of footwear that are currently available in collection 306 of clothing model 209. The user specifies footwear concept 115 and a "display instances" operation. This operation specification arrives via IDL 511 in server 509, and the propagator for the taxonomy model type which retrieves instances retrieves the instances that are related to concepts footwear 115, sandals 121, and insulated boots 103. Ariadne server 509 then typically makes a list of the instances represented by the objects for display in viewer 507(i). If the user of the viewer selects one or more of the instances from the list, Ariadne server 509 provides the referents 445 for the objects represented by the selected instances to ERIS 505, which retrieves the objects referred to by the referents and returns them to Ariadne, which then makes a display using the retrieved objects and sends the display to viewer 507(i). For example, if the clothing instances represent Web pages containing catalog descriptions of the items, when the user of viewer 501 selects an item from the list, Ariadne server 509 will provide the URL for the item's web page to ERIS 505, ERIS 505 will fetch the Web pages, and Ariadne 509 will provide them to viewer 507(i). Ariadne server 509 also provides views 513 which permit a user at viewer 507(i) to define, examine, and modify models. The user interfaces for doing so will be explained in detail later on.

Figure 6:
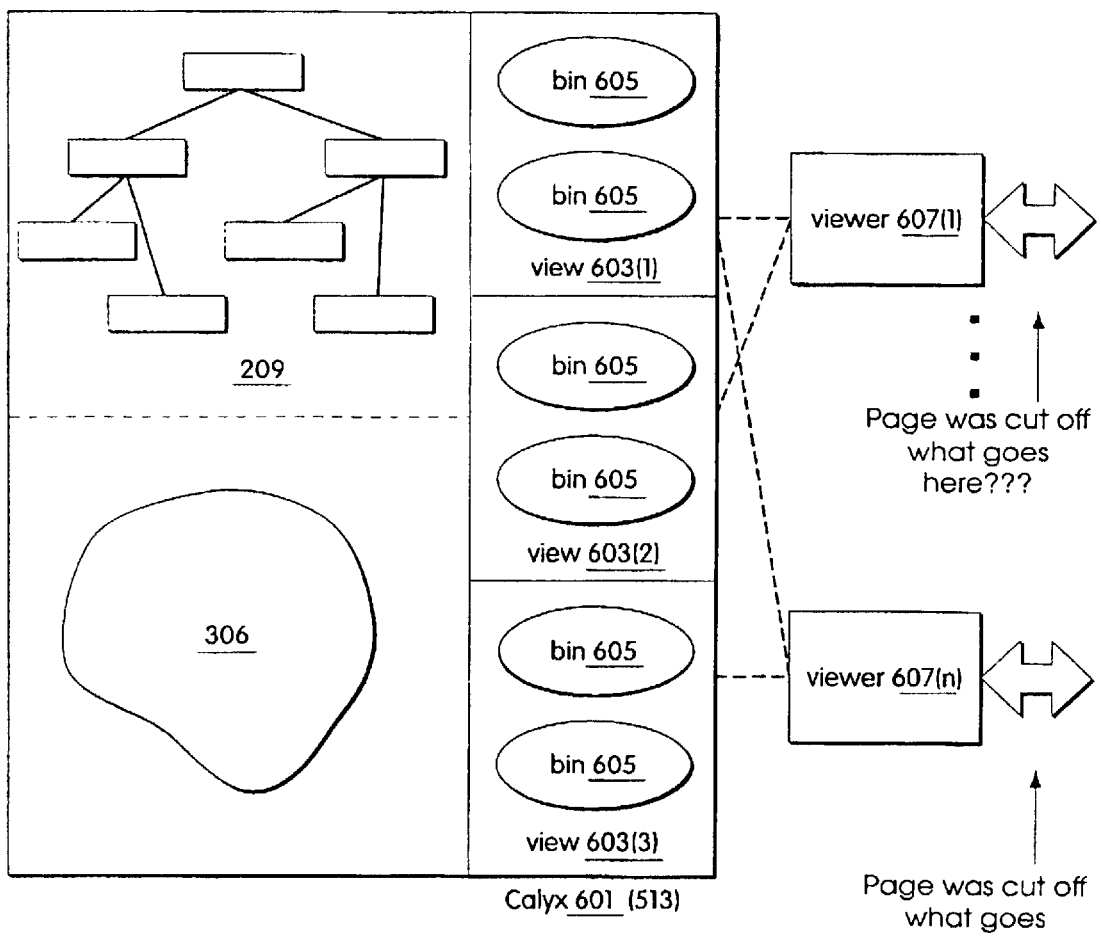
FIG. 6 is an overview of views and viewers in the system of FIG. 5.

Details of Views 513: FIG. 6

FIG. 6 shows details of the implementation of views 513 in a preferred embodiment. Models may have multiple views and views may have multiple presentations. The implementation supports different presentations of the same model concurrently, collaborative modeling and real time knowledge sharing, and independent yet sharable knowledge explorations.

In Ariadne, views are implemented in a subsystem known as Calyx. Calyx 601 is a CORBA server which exports via IDL specifications an abstract interface for views. Calyx 601 could also be any other distributed middleware server (for example, proprietary RPCs or DCE or possibly DCOM). A view 603 is a collection of bins 605 of information about the target source: A model or a world. Bins hold information such as the current objects being shown, whether the attributes of an object along any given facet are expanded, what facet a bin is looking at, etc. The typical representation

601 of a view is a structure containing (among other things) a container of bins 605.

All views and bins (as well as any other externally accessible resource) are referenced by opaque IDs which are presented to any viewer 607 logging into Ariadne. A viewer 607 is a active object through which the abstract information is displayed. Each viewer takes the abstract information maintained by Calyx in a view 601 and presents it in a manner which is consistent with the interface requirements and look and feel of a given GUI. For example, a taxonomy might be represented by a graph, an outline, or simply as an indented list of text and the viewer will use whatever resources are provided by its GUI to make the representation. For example, an outline might be presented by a Java Swing tree widget or an MFC tree widget.

As may be seen from the dashed lines in FIG. 6, a view 601 may be shared by a number of viewers 607. Calyx ensures that all viewers 607 that use a given view 6021(*i*) are synchronized to the most recent changes in view 602(*i*). When a viewer 607(*j*) requests Calyx to update or otherwise change part of the view (say, expand a node in a bin), Calyx performs this operation for viewer 607(*i*) and then asynchronously sends the update information to all other viewers actively using the view in question. These requests by Calyx to such viewers are client requests to server portions in those viewers. Hence, Calyx is a client and the viewers must implement a server interface for these asynchronous updates.

Calyx also supports (via the model and world infrastructure) various operations on the contents of bins. Specifically, various set operations (union, set difference, intersection, etc.) may be applied to arbitrary sets of bins. Additional operations may be defined by the user. The effect of the set operations is to apply the operation on the sets of information represented in the bin to produce a new bin (called a composition bin) with the computed resulting information. This is then propagated to all connected viewers. Further, bins may be combined in this way to create constraint networks of composition bins. If any bin in the network is changed (manually or via automated updates) the effect is propagated throughout the entire affected subnetwork in which the bin is connected. These propagated results are sent to all viewiers via the asynchronous operations described above.

Separation of Levels of Information in the Implementation: FIGS. 3–6

An important characteristic of Ariadne is the manner in which complexity is reduced and flexibility increased by separating various levels of information from each other. One of these is the separation of model types from models, as seen in the separation of model type definition 403 from model definition 413 in FIG. 4. Another is the separation of models from instances, as seen in FIGS. 3 and 4; this permits multiple models to be built independently of each other and yet work over the same world. It also permits models to be reused in different worlds. Yet another is the separation of an instance from the object that it represents, so that the instance serves as a proxy for the object, as seen in with regard to referent property 445 in FIG. 4 and the use of ERIS interface 505 to retrieve objects represented by referents from a number of different information sources 503. Then there is the agent/model separation: agents run in the context of models, but they are defined in terms of model types, not the individual models. For example, the refine agent will work with any model that has the taxonomy type. Finally, as seen in FIGS. 5 and 6, views 601 are separated from models and worlds and viewers 607 are separated from views 601.

The User Interface for Building, Modifying, and Displaying Models: FIGS. 7–12

A particular advantage of model types is that they greatly simplify the construction and modification of models. They do so because the part of Ariadne which constructs models can use the information in the model type to automatically place concepts in the proper facets and in the proper locations in those facets and to propagate information provided by the user to the concepts that require it. One example of such propagation is the propagation of the refinement agent from the root of a model of the taxonomy type via the subclass facet to all of the concepts in the model.

Figure 7:
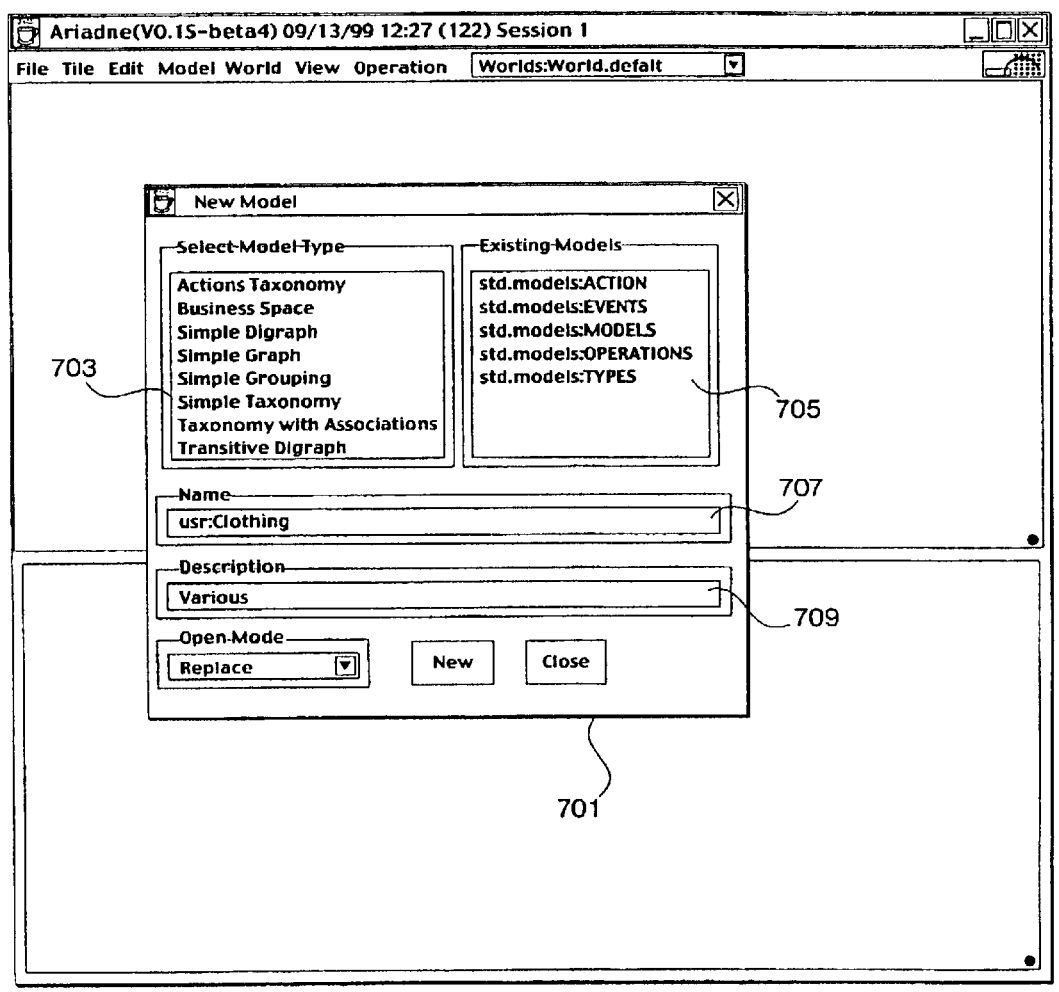
FIG. 7 shows a user interface for defining a new model.

FIG. 7 shows the dialog box 701 used in a preferred embodiment to create a new model. At 703 there appears a list of the presently-available model types; the user has selected simple taxonomy, indicating that the new model is to have the simple taxonomy model type; in the name box, the user has input "usr:Clothing", indicating that that is to be the name of the new model; at 709, the user may input the description. The result of these inputs is of course the construction of a model definition 413 for the new model, with model name 415 being "usr:Clothing" and model type name 423 being "Simple Taxonomy". List 705 gives an example of what can be done with models. In Ariadne, models themselves are instances in a model whose concepts are model types; one can thus simply select an already-made model from that model. In instance node 437 for an instance representing a model, referent 445 simply specifies the location of the model's model definition 413. The action model similarly treats agents as instances of a model whose concepts are the model types the agents are written for.

Figure 8:
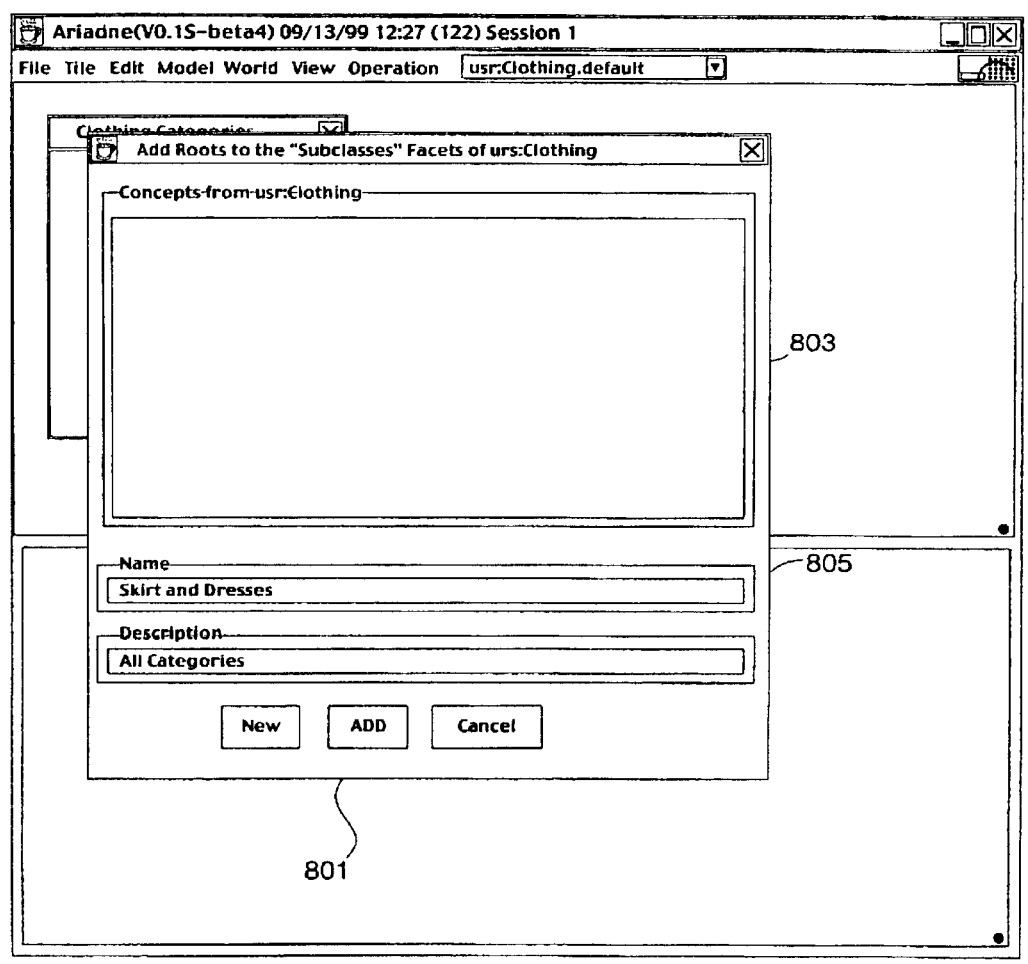
FIG. 8 shows a user interface for defining a root concept.

FIG. 8 shows the dialog box 801 used to add a root concept to the subclasses facet of the new model "Clothing". At 803 would normally appear the concepts that are presently in the model; the field is empty, as the model as yet has no concepts. At 805, the user writes the name of the root concept, and as before, the user may also add a description. The result of these inputs is the creation of a concept node 425 with the name "Clothing" in field 427 and the model name "usr:Clothing" in field 435. Since "Clothing" is a root concept and there are no other nodes, the taxonomy type requires that there be as yet no subclass attributes in attribute list 433, but a single is a attribute for "Clothing" itself, and Ariadne automatically adds these to "Clothing"'s concept node 425.

Figure 9:
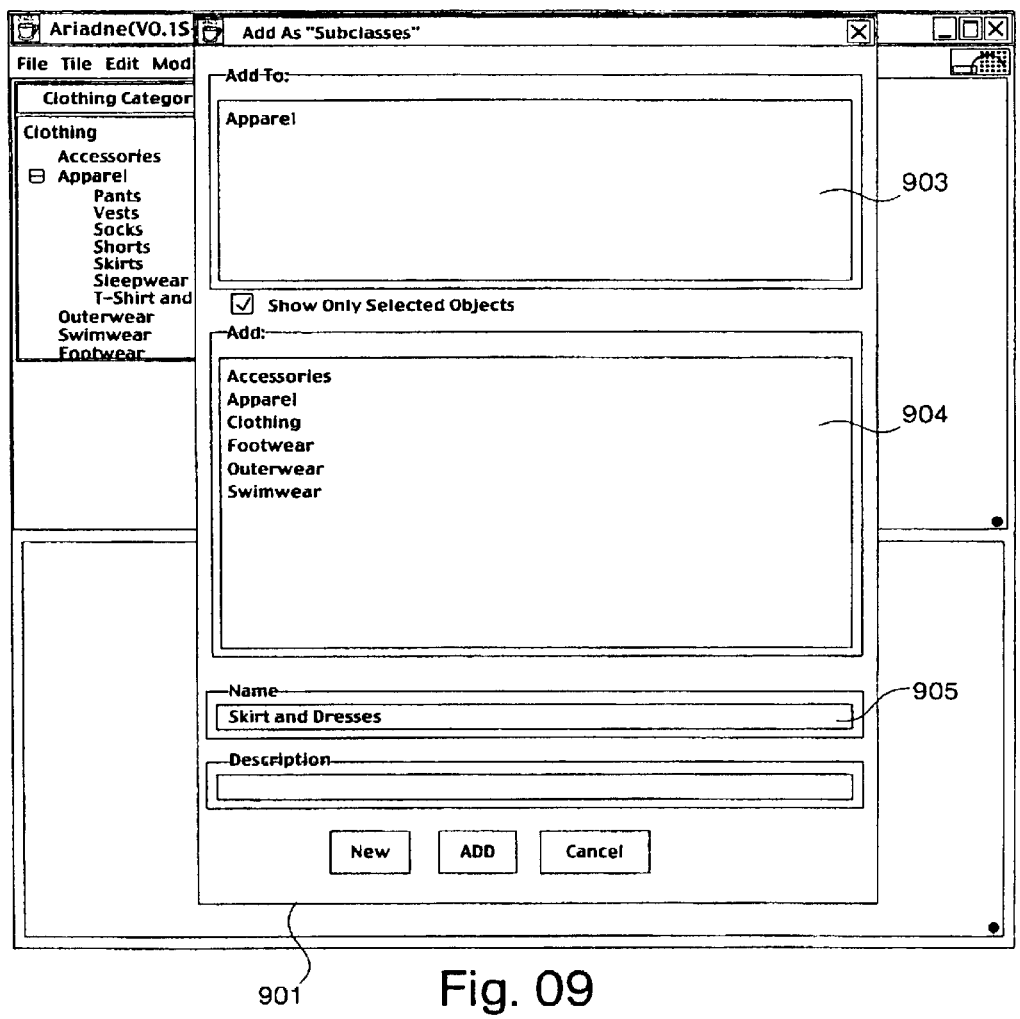
FIG. 9 shows a user interface for adding a subclass concept to a model of the taxonomy type.

FIG. 9 shows the dialog box 901 used to add subclasses to an existing taxonomy model. Here, the model already has as subclasses of the root concept clothing the concepts accessories, apparel, swimmwear, and footwear, and further subclasses are being added to to the apparel subclass. At 903, the name apparel of the concept to which subclasses is being added appears; at 904, names of aready existing concepts appear; since only the first level of concepts have as yet been defined, the names are those of concepts at the same level as apparel; at 905, finally, is a field for adding a newly-made concept.

A user may add a subclass either by selecting from among concepts listed in 904 or by using field 905 to add a newly-made subclass. For each newly-made subclass concept that is added, Ariadne creates a concept node 425 with the name of the concept at 427 and the name of the model at 435; for each concept being added as a subclass, Ariadne adds attributes in attribute list 433 for the is a facet specifying the new concept node itself and the concept node for the apparel concept. Ariadne further creates an attribute in attribute list 433 in the concept node for the apparel concept for the subclass facet which specifies the new concept node.

Thus, when all of the subclasses have been added, they all belong to the subclass and is a facets in the manner required for the taxonomy model type. It should be pointed out here that if the user attempts to select one of the concepts listed in 904 to be added to apparel, Ariadne will determine from the model type that this is not possible in the taxonomy model type (in a taxonomy, a concept at one level of the taxonomy may not be a subclass of another concept at the same level) and will not add the concept but will indicate an error. In other embodiments, Ariadne may simply not display concepts that cannot be added to the concept selected at 903.

Figure 10:
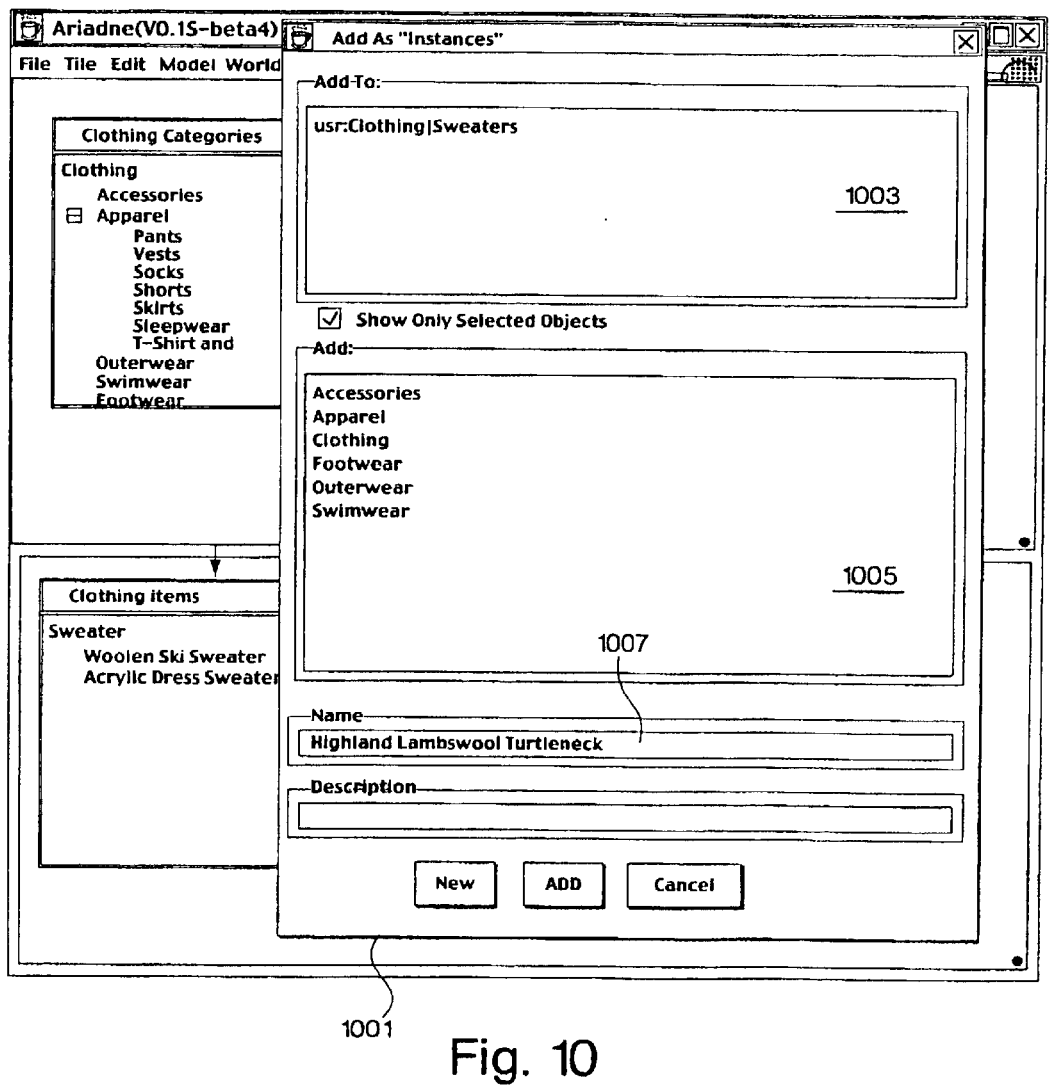
FIG. 10 shows a user interface for adding an instance to a concept of a model.

FIG. 10 shows dialog box 1001 used to relate instances to a concept. Dialog box 1001 has the same form as dialog box 901, with area 903 containing the name of the concept to which the instances are being related, area 905 containing the names of instances that are available to be added to the concept, and field 1007, which can be used to add a newly-made instance. When a newly-made instance is added, an instance node 437 is created for the instance, with the instance's name at 439 and any description provided by the user at 441. For a newly-made or prevously-existing instance, an attribute for the item of facet that indicates the concept sweaters is added to the instance node's attribute list 447, and one for the item facet that indicates the instance is added to the concept node's attribute list 433. Similar dialog boxes are used to add agents and items that are exhibitors, with corresponding modifications in the attribute lists of the concept and instance nodes. Ariadne also has a copying interface that can be used to select instances belonging to a concept in one one model to become instances of a concept in another. The attribute lists 433 off the instance nodes for the copied instances are modified to add attributes for the instance of facet specifying the concept, and the other concept's attribute list 433 is modified to include attributes for the instance facet for the newly added instances.

Figure 11:
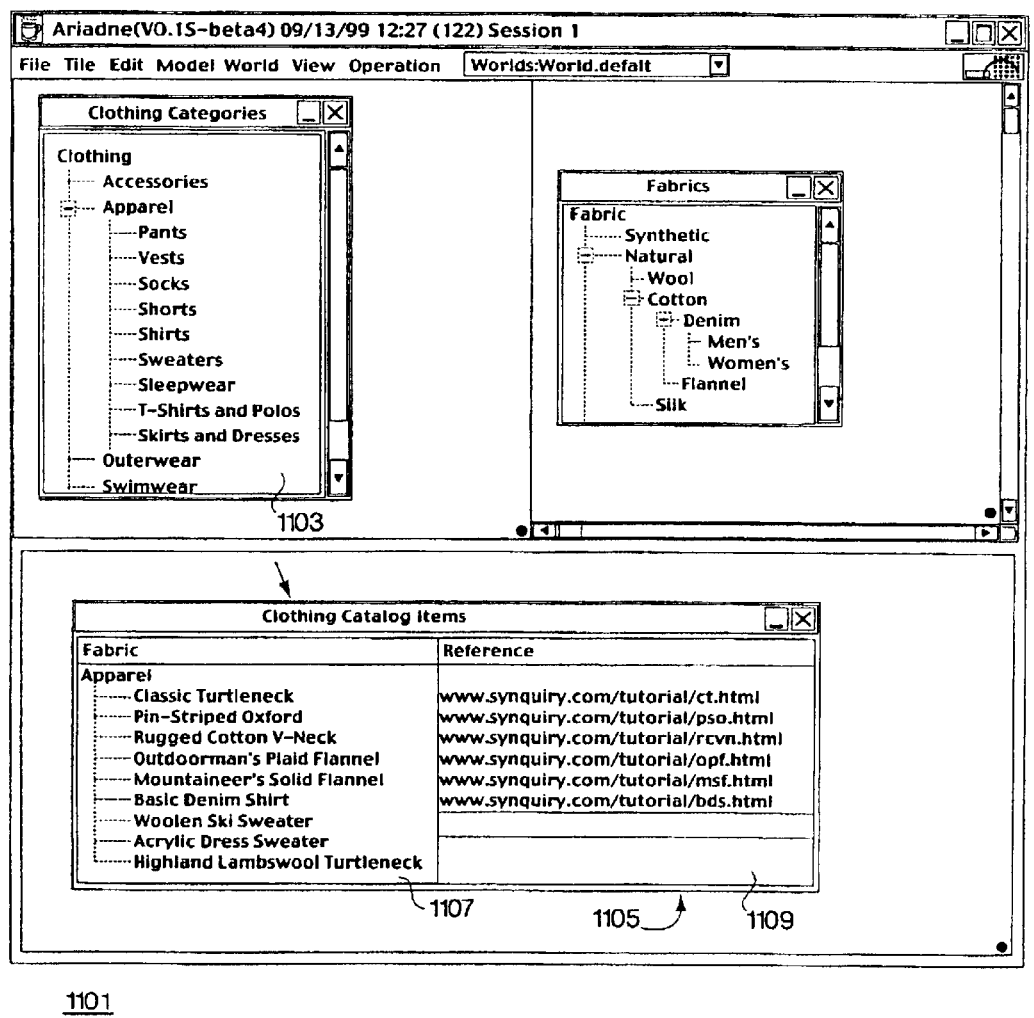
FIG. 11 shows a user interface for adding a referent to an instance.

FIG. 11 shows how referent fields 445 are set in instance nodes 437. Window 111 has three subwindows: two show models that apply to the clothing world: "clothing categories" and "fabrics". Both models belong to the taxonomy type, and thus both can be displayed as outlines, as shown at 1103. The user wishes to add referents, in this case the URLs of Web pages that show the items represented by the instances, to the instances that belong to the concept "apparel". In terms of facets, that is all of the instances which have an is a relationship to "apparel", that is, the instances that are related to "apparel" and all of its subclasses. To perform this operation the user selects "apparel" in outline 1103; Ariadne then uses a propagator for the taxonomy model type to generate the list seen at 1107, which is the list of all of the instances that belong to "apparel" and its subclasses. To assign an URL to an instance, the user writes the URL opposite the instance in field 1109. The URL for a given instance goes into referent 445 in node 437 for the instance.

Figure 12:
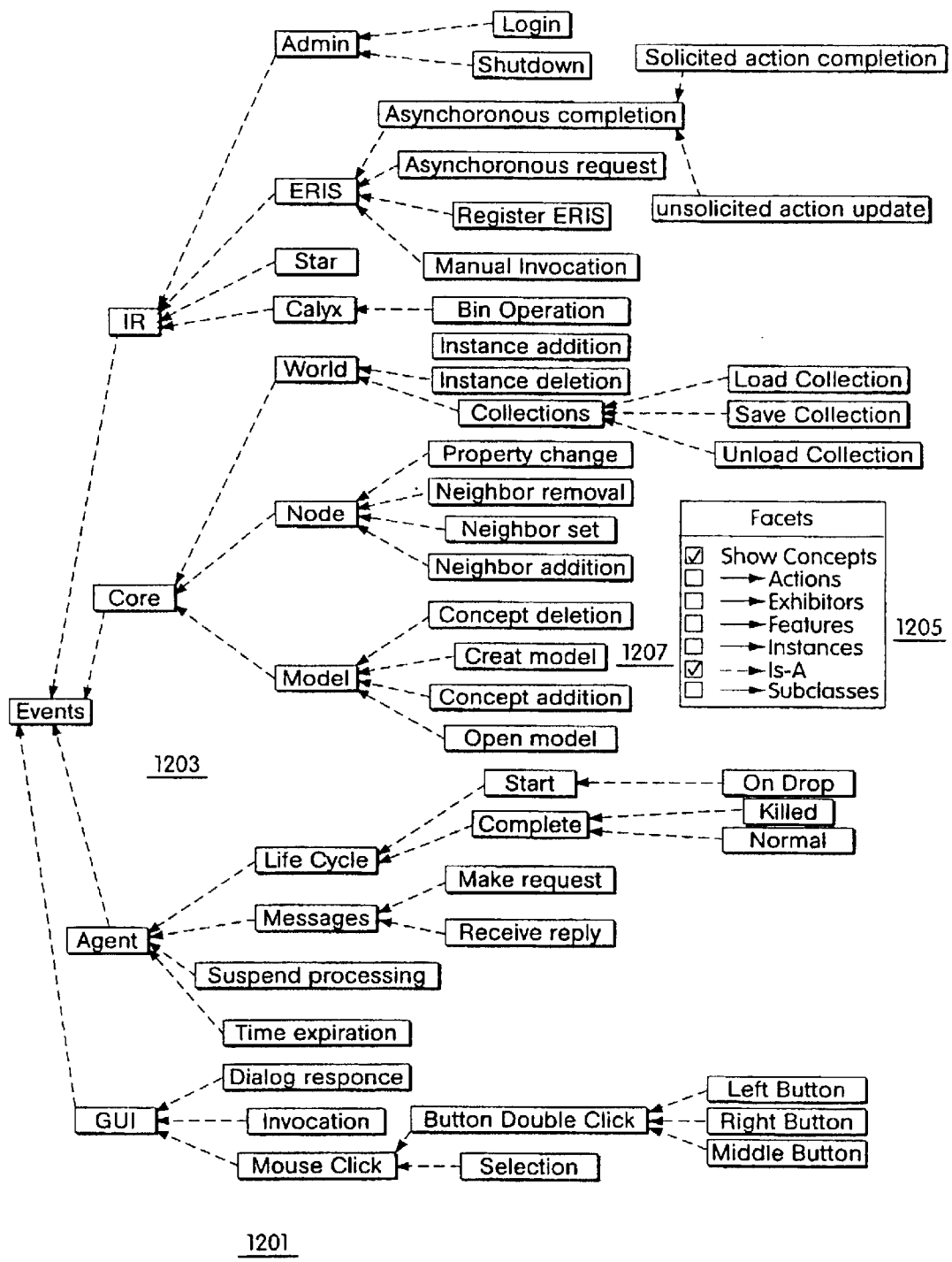
FIG. 12 shows a user interface for displaying a model.
Figure 13:
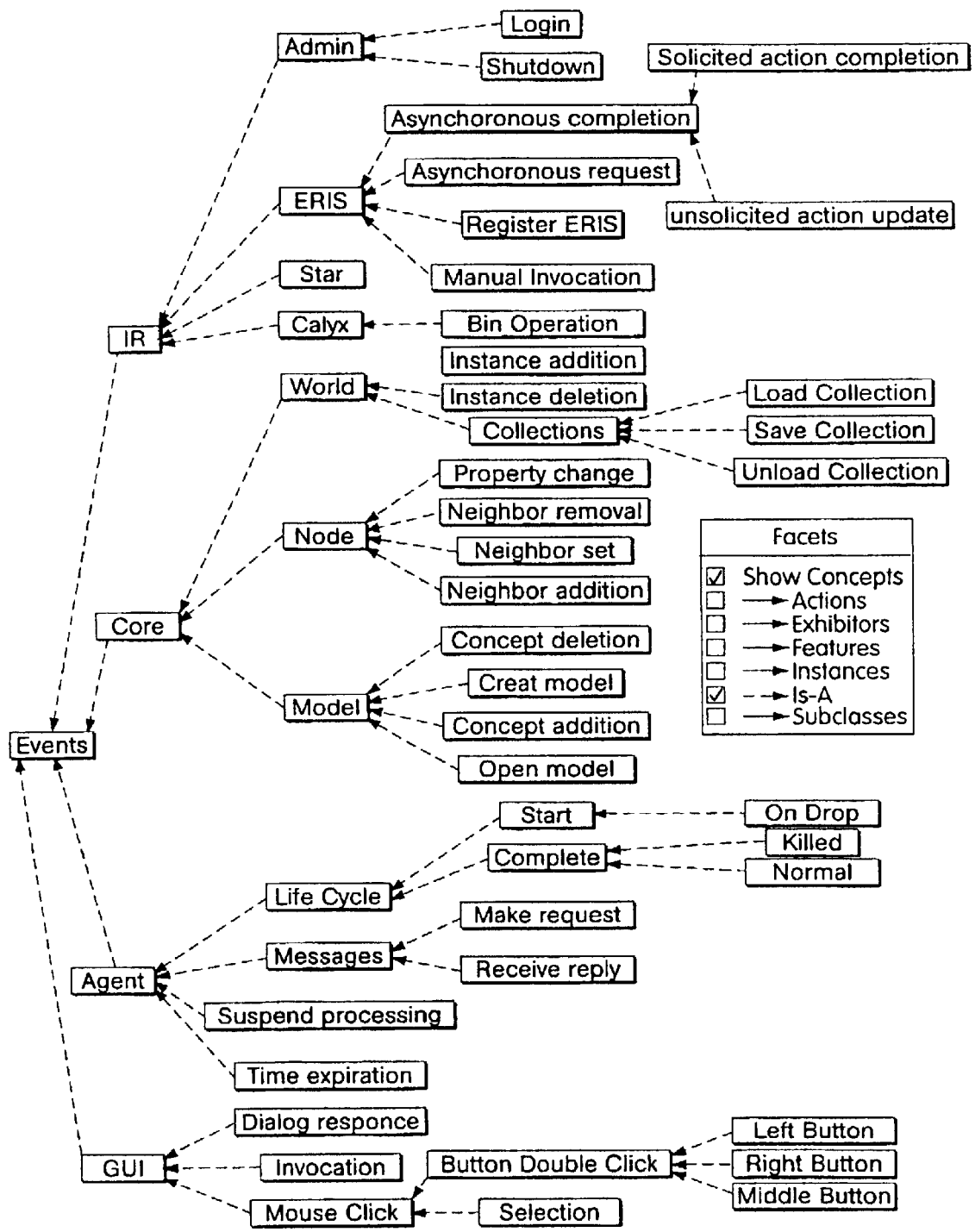
FIG. 13 shows the events model in Ariadne.

FIG. 12 shows how Ariadne displays a model. Model 1201 is a taxonomy of the events handled by Ariadne. The boxes are the model's concepts and the arcs 1203 are the arcs of one of the facets, in this case, the is a facet. Selection of facets to be viewed is controlled by check box 1205; as seen there, model 1201 is to be displayed showing its concepts and its is a facets. More than one facet may be selected, in which case, the arcs for each selected facet are displayed simultaneously.

Architecture of Model Types

Facets and Facet Specifiers

As could be seen from the taxonomy models explored in the foregoing, all models of a given type have the same kinds of facets. To define a model type, therefore, one defines its facets. Each facet of a model is defined by its corresponding facet specifier. All the facets available to a model are determined by the set of facet specifiers given in the model's corresponding model type definition (see below).

Each facet specifier defines the set theoretic relational properties of the base relation captured by the facet and provides an interpretation of what the relation is intended to convey. This interpretation provides the meaning of the facet through semantic constraints on what concepts may be related by the facet and how the facet is mapped to facet descriptions in other model types. Hence, the set of facet specifiers defines the complete semantics of the model type at any given concept in an instance of that model type.

Def: Facet-specifier. A facet specifier F is defined by a tuple:

$$F=<N,I>$$

where

N=the name of the facet and

I=the interpretation of the facet

We will often refer to a facet specifier as simply a facet and let context ensure the sense of use. A facet name is a simple string (actually an interned symbol).

Def: Facet Interpretation. A facet interpretation I is defined by a tuple:

$$I=<R,P>$$

where

R=The specification of the relation semantics governing the facet

P=Designates a propagator for the facet. P may be null.

While a propagator may be null an interpretation can never be null, since a relation specifier can never be null as it must at least provide the basic set theoretic properties of the relation.

Def: Relation Specifier. A relation specifier R is a tuple which describes the relation of the facet in terms of its set theoretic character and the local semantic constraints imposed on concepts connected to each other through the facet.

$$R=<C,SC>$$

where

C=the set theoretic character of R. This is a list selected from the following set of properties (note that other properties can be deduced from this, such as equivalence relation, partial order, etc.):

reflexive, xRx nonreflexive symmetric, xRy⇒yRx nonsymmetric transitive, xRy and yRz⇒xRz nontransitive trichotomy, for any z and y, exactly one of x=y, xRy, yRx holds nontrichotomy SC=the semantic constraints of R governing the structure of the graph represented by the facet. These are given by a semantic constraint specifier.

Def: A semantic constraint specifier: A semantic constraint specifier for a relation R of a facet F in a model type MT is a set of sentences Γ which determines when two concepts in a model M of type MT can be connected along F and how that relationship is mapped relative to possibly connected models of other model types and to instances in the world. That is, $\Gamma$ supply necessary conditions on R (and thus F): $c_1 R c_2 \Rightarrow \Gamma$, $\Gamma$ can be null and we adopt the convention that anything implies the null set: $c_1 R c_2 \Rightarrow \emptyset$ for all possible $c_1$, $c_2$, and R.

Each sentence $\phi \in \Gamma$ is a statement with free variables over the concepts in the model M, possibly free variables over the concepts in a related model FM of some model type FMT, and possibly free variables over the instances in the world. These variables are implicitly bound to the specific values of their corresponding sets provided by the context of each specific constraint action. In addition any global predicates and operators defined for all model types can be used as can R and any $R_{FM}$ associated with the related FMT. There may be several such related model types involved in a semantic constraint. Such related models and their model types are often referred to as "feature models" and "feature model types" and the concepts in them as "features", though this terminology is a bit misleading (they do not have to be related via a "feature" facet—any facet may have such relationships, but for historical reasons we often use this terminology).

Both universal and existential quantification are available for binding variables ranging over explicitly specified sets. Quantifiers can be mixed and nested to any level. Deeper sentences may refer to the quantifier variables of outer sentences with the expectation that any binding is properly maintained.

Additionally a constraint may assert a condition to hold provided another condition holds. This supports actions which must be atomic with respect to the overall constraint. For example, if a concept $C_1$ is added to the concept $C_2$ in the subclasses facet of a model with a taxonomic model type having facets subclasses and superclasses, then the constraint for the facet can assert the dual relationship: $C_2$ added to $C_1$ in the superclasses facet.

Language for Semantic Constraints

Letting M be a model of model type MT and FM be a model of model type FMT and F be a facet defined in MT, then the following lexical elements are available for use in semantic constraint specifiers:

$c_i$, i=1, ..., k, ... =the set of natural numbers. The free variables available for concepts in M $f_j$, j=1, ..., k, ... =the set of natural numbers. The free variables available for concepts in FM $x_i$ $y_j$, i and j=1, ..., k, ... =the set of natural numbers. The free variables available for instances.

R=the relation of facet F to which the semantic constraint belongs simple-name, the name of a facet of the model type MT (simple-name simple-name), the designator for a facet in model type FMT, where the first name is that of FMT and the second is the name of the facet.

The following set of quantifiers (listed with their semantic interpretation):

for-every, universal quantification: for-every var set forms, where var is a free variable in the sentences of forms and set is the universe set for this quantifier instance. Forms is a set of sentences which may contain var, and if so it must be a free variable. Yields true if all sentences informs are true for every binding of var from set.

there-exists, existential quantification: there-exists var set forms, where var is a free variable in the sentences of forms and set is the universe set for this quantifier instance. Forms is a set of sentences which may contain var, and if so it must be a free variable. Yields true if there is at least one binding of var from set which makes all sentences in forms true.

The following set of connectors (listed with their semantic interpretation):
=>, logical implication
not, logical negation
and, logical conjunction
or, logical disjunction
<, numerical less than
>, numerical greater than
=, equality (across all types)
(, start enclosing s-expr
), close enclosing s-expr The names of all predefined operators on models of all types. This set is subject to continual change, but has at least the following (listed with their semantic interpretation):
card, cardinality
inst, instances of
attr, binary operator, takes a concept and attribute name and returns attribute value
prop, binary operator, takes a node (concept or instance) and property name and returns the value of the property. Note this includes the standard property of referent. A referent is the connection information for a resource (file, url, model, spreadsheet, accounting system, etc.)
in, set membership
intersect, set membership intersection
union, set membership union
set-diff, set membership difference
subset, set inclusion
deg, takes a concept and facet name and returns the degree of a concept (vertex) in a facet graph The syntax for sentences is standard s-expression forms, where any quantifier, operator, relation, and connector may define a clause. Additionally, since all of $\Gamma$ are implied by a constraint, $\Gamma$ can be represented as a single conjunctive expression (there is no need for an explicit set of sentences).

Ex-1 Constraint: Suppose MT is a model type with a facet specifier F containing the following constraint:

```
(=> (R c1 c2)
    (or ((> (card (attr c2 features))
           (card (attr c2 features))
        (there-exists f1 (attr n1 features)
            (there-exists f2 (attr n2 features)
                (FM Rfm) f1 f2)))))
```

Then for any two concepts $c_1$ and $c_2$ of a model M of type MT if $c_1 R c_2$ then either there is a related model of type FM with facet (and relation) $R_{fm}$ for which there are features $f_1$ and $f_2$. in the features of $c_1$ and $c_2$ respectively, for which $f_1 R_{fm} f_2$ in the related model or the cardinality of the feature set of $c_2$ is larger than the cardinality of the feature set of $c_1$ The second disjunct of the or-clause in this example illustrates a particularly interesting constraint between models of two model types. It induces a homomorphism between two such models with respect to the graphs of the two facets involved. Hence, this sort of constraint ensures that sets of models are constructed to ensure such homomorphisms and this can be relied upon by agents or other processing of the models involved. One obvious use of this is the standard technique of exploring and investigating questions concerning one structure by looking at one or more of its homomorphic images. In such a technique, the issues would typically already have been resolved for the images or the images would be significantly simpler to explore. This can be particularly useful in agent autoclassifying and configuration scenarios.

Ex-2, Facet Specifier: If MT is a model type for a simple graph without edge constraints (a so called "weak" semantic model type) then the following simple facet specifier could capture the edge set of models of type MT:

<adjacent-vertices, <<(symmetric), nil>, nil>>

The facet's name is adjacent-vertices, its interpretation specifies no propagators and inside the relation specifier of the interpretation, no semantic constraints are given and the relation's properties are the singleton symmetric (standard character for simple graphs).

Ex-3, Facet Specifier: If MT is a simple taxonomic model type then the following facet specifiers could capture simple notions of subclasses and features (given in s-expr clause form):

---
(subclasses
    (((transitive nonreflexive nonsymmetric)
        (> (card (attr ?c2 features)) (card (attr ?c2 features))))
    nil))
(features
    (((nontransitive nonreflexive nonsymmetric)
        nil)
    inherit-features))
---

The facets are subclasses and features. The subclasses facet has a simple constraint requiring the addition of some new feature(s) for a subclass to be legal and a null propagator. The features facet has a null constraint but designates a propagator.

The purpose of the propagator on features is to ensure that features of concepts of models of type MT obey the expected standard class based inheritance behavior for concept features (or characteristics).

Propagators and Propagation Specifiers

As noted earlier, a propagator provides a degree of expected behavior for all models of the model type containing the propagator's specification. Propagation specifiers define what and how values of attributes of models are moved, i.e., propagated, between concepts—both within the model and between concepts in related models.

Def: Propagation Specifier. A propagation specifier PS is a tuple which describes an expected intrinsic piece of behavior for information movement between selected attributes along a path in a given facet graph for any model whose model type contains the specifier.

$PS = <N, A_i, A_j, D, O, W, F>$ where

N=the name of the propagator (a simple-name)

$A_i$=the attribute in the model type whose value is to be propagated, the from attribute $A_j$=the attribute in the model type to which the value is to be propagated, the to attribute D=the direction of propagation as given by:
    $>, A_i \rightarrow A_j$
    $<, A_j \rightarrow A_i$ O=the form :on <condition>, where condition is one of
    access, propagate when the from attribute of a concept is accessed
    update, propagate when the from attribute of a concept is updated
    change, propagate when the from attribute of a concept is changed (not just updated, but changed)

W=the form :when s-expression. propagate only when expression is true

F=the form :along <facet>, where facet denotes a facet that exists in the model type.

While $A_i$ and $A_j$ may be different attributes, the most typical case is where they are the same attribute. The along facet F controls whether propagation is one step or continues until all concepts along the facet from the starting concept have been visited. If the relation of F is transitive, then propagation continues for all concepts in the potential path, otherwise propagation stops after the first step.

In many cases, the global propagation semantics provided by propagation specifiers may need to be supplemented with context specific aspects. This is accommodated by providing two predefined properties for concepts in models of any type. These are, pre-propagation-actions: A set of ordered pairs of names and functions:
    {<N, f>|N names PS and f an operator for the space of $A_i$ of PS} post-propagation-actions: A set of ordered pairs of names and functions:
    {<N, f>|N names PS and f an operator for the space of $A_j$ of PS}

On a propagation event, if the propagator involved has a prepropagation action, then the corresponding function is called on the value of the from attribute before propagation; if the propagator has a postpropagation action, then the corresponding function is called on the updated value of the to attribute.

Ex-4: Suppose MT is a typical taxonomic model type including the facets superclasses and features, with the facet interpretation for features designating the following propagation specifier (also included in MT's definition): We also presume the typical case that the relation of superclasses is transitive.

(inherit-features features features > :on access :along superclasses)

Then any access designating features on a concept c in a model of type MT will obtain all the features directly attributed to c and any features in any superclass of c, i.e., the result is standard class based inheritance.

Ex-5, Propagation Specifier: Suppose MT is as above in example 1. All model types have the predefined attribute instances (and a simple predefined facet specifier for this) and so MT has this. Assume the typical further condition that MT includes a facet specifier subclasses whose relation is also transitive and that instances' interpretation designates the following propagation specifier (also included in MT):

(instances-of instances instances > :on access :along subclasses)

Then any access designating instances on a concept c in a model of type MT will obtain all the instances directly connected to c and any instances of any subclass of c, i.e., the result is standard class based instance set covering.

Ex-6, Propagation Specifier: Suppose MT is some example of a causal network model type. Let MT have facets causes, effects, and happened and assume that the facet interpretation of happened designates the following propagation specifier which is also defined in MT:

(happened happened happened > :on change :when (>0)
:along effects)

If effects are transitive (each effect is a cause for something else), then any change to happened at a concept c in a model of type MT, where the value is greater than zero, will "fire" all the causes along the causal chains connected to c whose values are not the same as the value supplied.

Model Type Definition

We are now in a position to give the definition of a model type. A model type definition requires the following basic set of information:

- A set of attributes for its models. This includes both predefined attributes for all model types and those specific to the requirements of the style of modeling being captured in the model type.
- A set of facets defined over the attributes for specifying the semantics of how concepts in its models may be connected in order to capture the intended semantics of the facet graphs in the style modeling being captured
- A set of propagators that provide the expected base behavior in its models for the style of modeling captured by the model type.
- In order to satisfy any intermodel connection constraints in the semantics of the facets, there need to exist the set of model types referenced in the constraints along with any of their facets that are designated.

The last point can be made implicit. Any currently extent model types are available for use in semantic constraint specifications of facet specifiers of the model type. We assume this scenario.

Def: Model Type: A model type MT is defined by a tuple of sets which collectively describe the complete semantics of the model type:

$$MT = <\{A_i\}, \{P_j\}, \{F_k\}>$$

where

- $A_i$=The attributes that are specific to the requirements of the modeling style being captured. These are simply a list of simple names. The following may be (this is an implementation's choice) predefined attributes which are always included (whether explicitly specified or not):
  Instances, ties concepts to the world as examples of the concepts
  Exhibitors, ties concepts to the world as characters of the concepts
- $P_j$=The propagation specifiers that capture the intrinsic behavior expected of the style of modeling being captured by the model type.
- $F_k$=The facet specifiers that tie together the attributes and propagators along with the relational character and semantic constraints for the set of graphs required to support the modeling style.

The $P_j$ and $F_k$ are specified per the definitions and descriptions covered in the relevant sections given earlier. This completes the definition of model type and this definition allows the description of the various styles of models mentioned earlier. We give some examples here to illustrate the technique for capturing a style with the machinery. All the examples are given in s-expression clausal form.

Ex-7, Model Type: One of the simplest model types possible is that of the basic simple graph from graph theory. The following model type definition provides this most basic structure:

```
(simple-graph
    nil ;; Specific attributes
    nil ;; Propagator is null => no expected behavior
    ;; Now the facet specifier set
    ;;
    ((adjacent-vertices    ;; "concepts" here are simply vertices
        (((symmetric) nil)  ;; Simple graph def has symmetric
                            ;; relation & no constraints
        nil))) ;; And no propagators . . .
```

While not explicitly specified, there are also attributes and facets for instances and exhibitors (as required by the definition of model type). Note that there is also no need to specify attributes which have explicit facet specifiers, as these imply the corresponding attributes.

Ex-8, Model Type: A somewhat more interesting example is that of a very simple taxonomy. This style of model is the one where there are no "features" and subclassing proceeds essentially by fiat.

```
(simple-taxonomy
    nil ;; No attributes without explicit facet specifiers
    ;; Propagators
    ;;
    ((instances-of instances instances >
        :on access :along subclasses))
    ;; Now the facets
    ;;
    ((is-a
        (((transitive reflexive nonsymmetric) nil) nil)
    (subclasses
        ((transitive nonreflexive nonsymmetric) nil) nil)
    (instances
        ((nontransitive nonreflexive nonsymmetric) nil)
        instances-of)))
```

Note that if we had decided to use a "superclasses" facet instead (or perhaps in addition to) the is-a facet the relational character would be slightly different: it would specify non-reflexive: a rose is a rose is a rose, but a rose is not a superclass of itself.

As pointed out in the example introduction, there are no semantic constraints on any of the facets so what is or isn't a legal subclass or instance is left completely up to the modeler when building a specific instance of simple-taxonomy.

Lastly note the propagator. It is the same as that given in Ex-5 and it is designated by facet instances. This means that whenever the facet instances is accessed at a concept c, the propagator instances-of will run in order to obtain the correct value for instances at c. When the propagator runs it will first get the instances directly attached to c, then it will move along the subclasses facet to all the immediate subclasses of c and get the instances of each of these. Since subclasses's relation is defined to be transitive, the propagator will then recurse.

We could augment simple-taxonomy a little to get automatic "what am I" kind of semantics (the standard "is-a" game). We would do this by adding a propagator:

(i-am-a is-a is-a > :on access :along is-a)
and designating it as the propagator for the is-a facet:

```
((is-a
    (((transitive reflexive nonsymmetric) nil)
    i-am-a)
```

Since is-a is transitive, on access to the is-a facet of a concept c, the result will be c and all concepts along the entire chains of is-a rooted at c.

Global Structural Semantics

It is worth noting that our definition of model type is silent concerning certain global semantic properties of possible models of the types that may be constructed. It is, however, not always silent as there are cases where it may be deduced that a given model type provides sufficient conditions for that property and thus all models of the type will have the property. However, this is the unusual case. The canonical example is that of all model to world (and vice-versa) facets which are bipartite. A more specific example comes from our definition of simple-taxonomy, which states that subclasses is transitive and nonreflexive and thus we know that (the graph of) subclasses is acyclic.

Typically, however, the above machinery is silent for individual models with regard to the following important global properties of facets:

Whether a facet is acyclic
Whether a facet is connected
Whether a facet is eulerian
Whether a facet is hamiltonian
Whether a facet is bipartite
Whether a facet is planar
Whether the graph resulting from the combination of two or more facet graphs has any of the above properties.

In large measure, these issues must be answered by looking at the particular graphs in question and running an analysis on them. In many cases such analyses will be unable to answer the question. This can be due to the fact that the graph does not exhibit known necessary or sufficient conditions for the property in question or that the required computational complexity to determine such conditions exceeds "allowable limits". In any event, various intrinsic predicates and path finders are provided for such analyses for all model types Notice that this is possible since the scope of the styles of models captured by model types is constrained by the requirement that they are all a graph in their most fundamental character.

Intrinsics for Model Walks

The set of supplied intrinsic model walkers and predicates should behave in a functional manner. This is not an issue with respect to predicates as they simply take a model and proceed to (attempt to) determine whether the graph in question is of the sort specified by the predicate. There are two possible sorts of output from such predicates:

Often, the determination of a property will involve finding a particular kind of path through the graph. In this case, it makes the most sense to return as the value the actual path found: the ordered list of nodes defining the path. Note, we allow for the case where both instances and concepts may be mixed in such a path.

Certain other properties should simply return nil or t.

The Available Intrinsics

The set of model intrinsics is subject to continual update, but includes at least the following set of capabilities:

Transitive closure walks: generalized facet "applier"
Model traversals and search forms. These may be invoked with various predicate or predicate sets to determin when to termininate and whether and what to collect and return:
Along a facet
Along a sequence of facets
Randomly (nondeterminancy)
If tree
  depth first with pre-, in-, and post-order application
  breadth first with pre-, in-, and post-order application
Search
  depth first
  breadth first
  best first
  beam search
  hill climbing
  A*search
Special graph predicates
  Eurlerian
  Hamiltonian
  Bipartite
  Connected Details of Agents and Events: FIGS. 13–17

Agents and Events

Ariadne agents reflect the typical set of required properties for agents such as autonomy, mobility, reactiveness (sometimes called "responsive"), proactiveness, and social ability. These all have explicit constructs in the agent language to allow for direct and simple descriptions involving such characters. However, constructs for such more controversial agent aspects as the "Belief, Desire, and Intent" (BDI) model have been deemed too vague and problematic. In addition these latter are more concerned with large scale agents with internalized "symbolic models" of their world. Ariadne explicitly parts company with such traditional AI techniques.

Agents are specified by means of constructs arising out of a family of interrelated languages that all "play together". Model types in Ariadne provide various specialized "formats" to organize and structure information. As such, agent descriptions for moving within and among the models built upon these should have access to the more specific and higher level semantics that the model types present. Additionally models in an Ariadne application present semantic interpretations (perspectives) of the various subjects on which the application is focused. Collections of such interrelated models provide the contextual, or "domain level" semantics of the application. Again, descriptions of agents for processing these structures should have constructs which more directly reflect this level of semantic for the subject.

Hence users should have access to corresponding families of agent (mini) languages. In order to satisfy these highly desirable qualities and keep the results consistent and manageable, these "mini" languages are in turn part of a family of extensible languages layered on top of a more general base language. The base language has a fuller but "lower level semantic" capacity for agent descriptions and at any point a (power) user can dip down into it from a higher level child language to access this capacity.

Such layered languages creating families of inter-related languages can be built by various means, but the most straightforward method would be to define a very simple consistent syntax with a macro style compile time constructor. All new constructions are defined by means of this constructor and each construction itself becomes a new construct in a language layer. Hence, the constructor always has access to all previous constructions when defining a new construct. At compile time of a set of constructions for an agent's definition, each construct is first expanded according to its definition into the lower level constructs upon which it is based. The process recurses. The recursion stops when the base level constructs are all that is left. The resulting base level version of the original code is then compiled into machine code.

The design and implementation of such an extensible base language for agent descriptions needs to take into account these notable points:

Ariadne agents are largely reactive in nature, in the sense that they do not have internalized semantic structures reflecting a model or their external environment.

Nevertheless, agents will have access to and will directly utilize the conceptual information of many models to synthesize their results.

Despite their largely reactive nature, Ariadne agents have various degrees of proactive behavior. This allows users to create agents with a goal(s) which can run periodically in the background over a set of models.

Ariadne agents are independent—they each have their own thread of execution. Hence, the base language will account for such parallelization.

Agents can be highly communicative (requesting services and replying to such requests). The base language provides an event based messaging service for the expression of all such communication.

Agent construction and definition takes place within the context of the overall Ariadne system and makes use of three basic models:

An event model for Ariadne. Event model 1301, shown in FIG. 13, includes events received from the core level infrastructure, agent actions, Star interface, Calyx interface, any conforming GUI, and ERIS brokered external resources.

Figure 14:
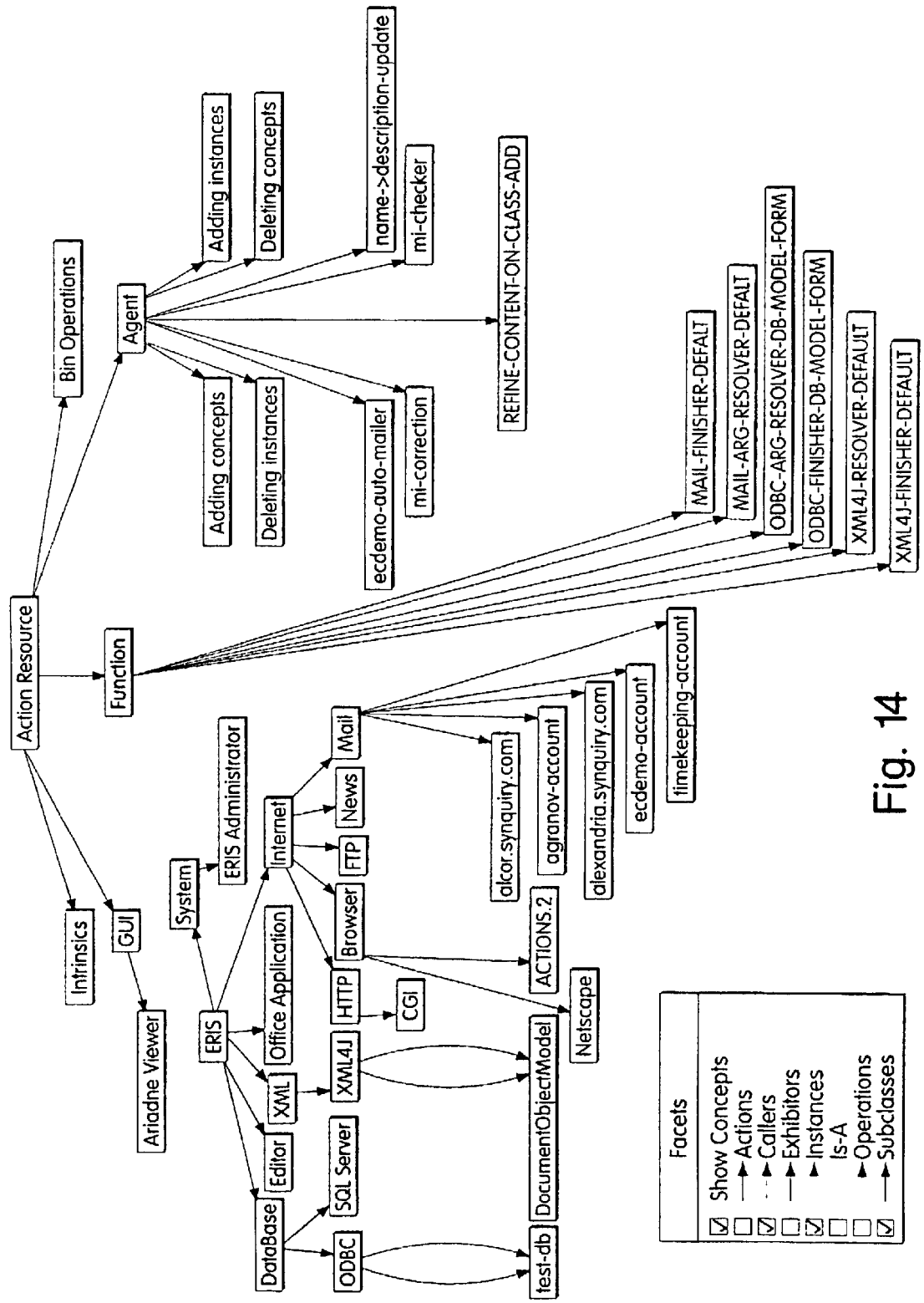
FIG. 14 shows the actions model in Ariadne.
Figure 15:
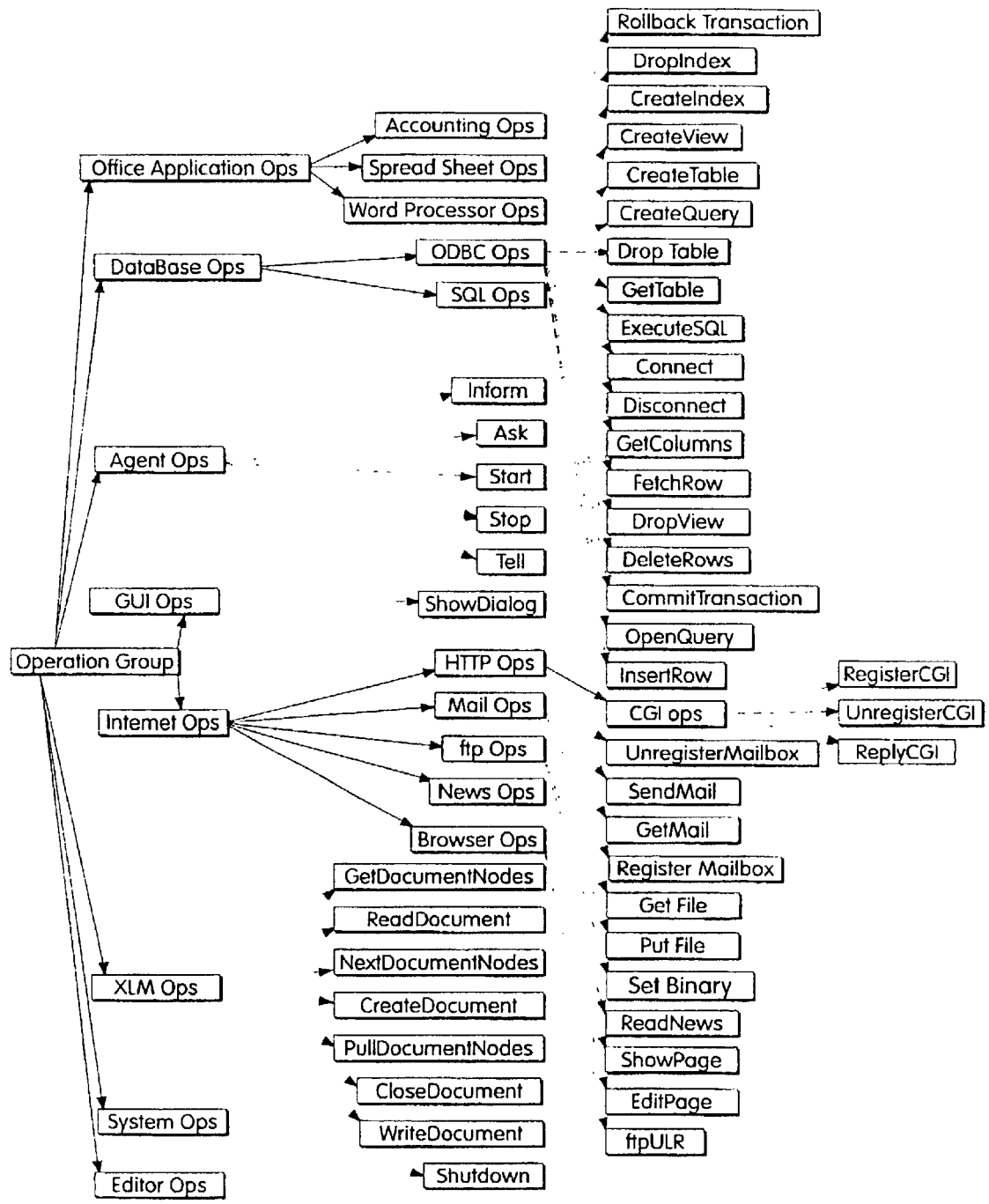
FIG. 15 shows the operations model in Ariadne.

An actions model, shown at 1401 in FIG. 14. This model includes the various sorts of active processes that can be invoked via events. One of the subclasses of this model is agent 1405; among the instances of this concept is the refine agent discussed earlier; the instance is at 1407.

An operations model 1501 (FIG. 15) for describing the various parameter lists of actions and in particular the signatures of agents.

In addition, as we have seen, all models that have agents have the standard actions facet that relates agents to concepts. All of these standard models are user extensible and manipulatable like any other model. The ability of users to access and change the models provides a very high degree of flexibility to users in changing and contextualizing the processing model of Ariadne to their specific needs.

Details of Event Model 1301

Continuing in more detail with event model 1301, that model is used to indicate the event classes with which an agent may be registered. If an agent has been registered with an event class, the agent will be invoked and run whenever an event of the class occurs in a context where the agent is available. Each agent invocation creates an activation copy of the agent which runs as a separate thread. There can be any number of agents (modulo system resources) running at any given time. The event class for an agent indicates what sorts of events that the agent should respond to when it is configured for use. An agent is available in a given context if either:

1. It has been connected along the actions facet of a given concept (FIG. 16) or 2. It is in the extent of some concept "A" connected along the subclasses facet to the "Agent" concept in the actions model and further that there is an instance I connected to "A" in the caller's facet (FIG. 14) or 3. It is manually selected and dropped onto a set of objects. This last option manually invokes an agent on a model. (FIG. 17)

Figure 16:
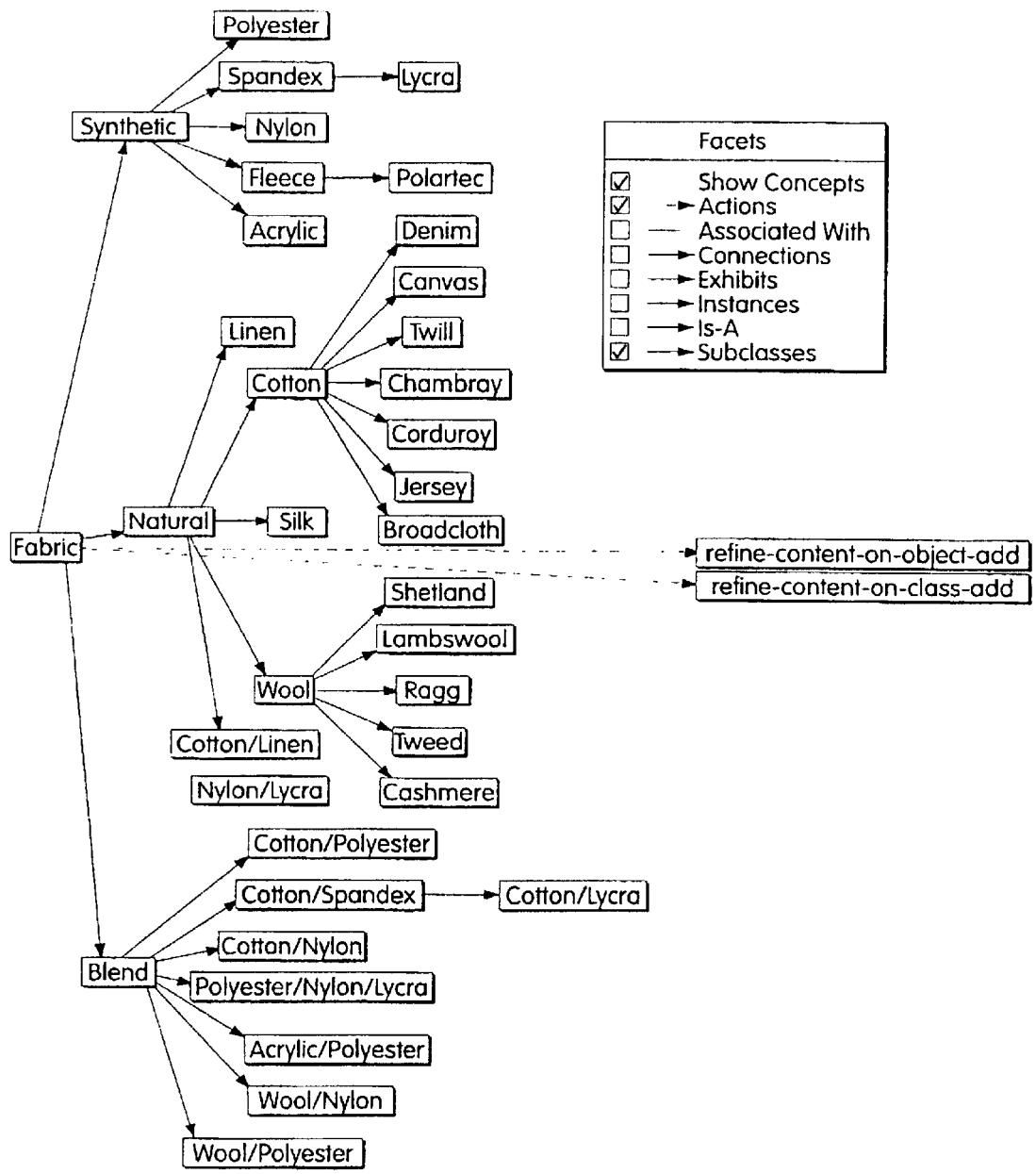
FIG. 16 shows two agents attached to the root of a taxonomy model.

Continuing in more detail with the above three options, FIG. 16 shows a fabric model 1601 which belongs to the taxonomy class. The actions facet of model 1601 has two agents attached to the root concept fabric, as shown at 1605. The two agents respond to the events of adding a concept to the model and adding an instance to the model. Since they are attached to the root of model 1601 and by the rules of the taxonomy class are inherited by all of the concepts of the model, one or the other of the agents runs whenever a concept is added to the model and whenever an instance is added to the model.

The predefined actions facet has several constraints on it which prevent various possible misconfigurations. Again all of this setup, configuration and enforcement is done via standard Ariadne model and model type definitions and manipulations. The actions facet (like any other) may also have a variety of propagation behaviors for any given model type. For example, in a typical taxonomy it may well be the case that the Actions facet will be inherited down the subclasses facet, as described above for the agents 1605. This basically gives all the capabilities of standard object oriented method inheritance, but is far more flexible and is also end user configurable. Many other scenarios are possible.

Figure 17:
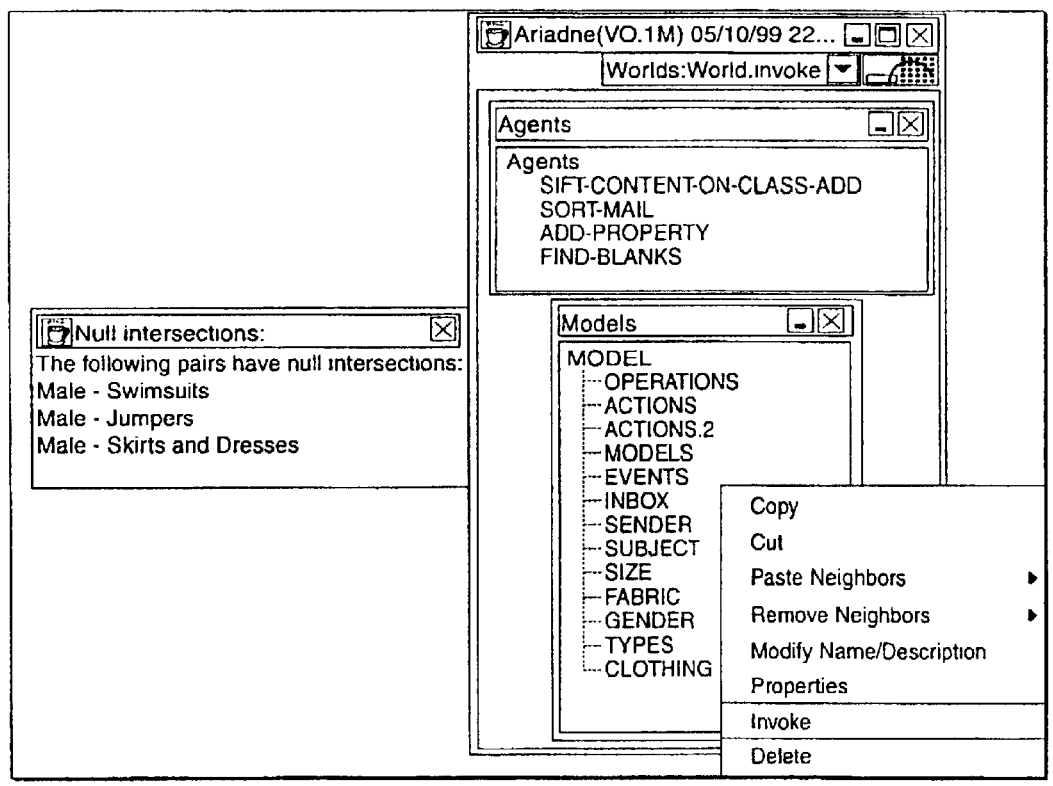
FIG. 17 shows a user interface for attaching an agent to a model.

FIG. 17 shows how the user interface permits a user to manually invoke an agent. In interface 1701, the instances representing the agents are listed at 1705. The user has selected one of them, named FIND-BLANKS. When invoked with two taxonomy models, this agent finds concepts of the one model that have no instances which belong to a given concept of the other model. The instances representing the models are listed at 1703; the user has selected two models, gender and clothing. Ariadne will respond to this input by invoking the selected agent on the two models. The effect of invoking the agent is the following: for any combination of a clothing and a gender concept for which there are no instances, Ariadne will display both the clothing concept and the gender concept.

In addition to the models, there is a subsystem for event handling which fully supports asynchronous event processing, including posting, dispatching and handler threads for each top level event class (concept in the events model). Part of this subsystem is an event activation layer for the core level capabilities. This layer supports various core level actions (adding and deleting objects, adding and deleting neighbors along facets, agent invocation, etc.) with transparent posting of associated events. Each event consists of the event's event class in event model 1301, a universal identifier for the particular event, and an argument list. The latter, together with the event class, serve as a "signature" to determine what code is executed for the event. A component which generates the event posts it to a main event queue. Each of the GUI, Agent, Core, and IR classes of events has its own event queue and a main event dispatcher reads the events in the main queue and places each event in the proper queue for its class. The queues are read by an event dispatcher for each class. Each of the class event dispatchers runs in its own thread and dispatches each event in turn as it reads it from the class queue. The event dispatcher for the core class further runs in its own separate task. This split between the core event dispatcher and the other class event dispatchers supports clustering of event actions and increases flexibility and performance of core actions.

An extensive palette of out-of-the-box agent "prototypes" is provided for intermediate level users—those not expected to write agent level code. These prototypes can be completed by configuring various properties and registering them with a set of events. Both of these actions are performed by the standard model manipulation capabilities of Ariadne and the GUI: most typically selection, bin element addition, and copy a set of objects and paste along a facet of other objects. This will result in an agent definition instance (in the world) which can then be attached (along the actions facet) to any concept in any model of a model type, where the type is one that is included in the agent's model type list.

Typically the actions facet for a model type will have a propagator (though none of these are implicitly provided—the model type definer must decide to make one for the specific case). For example FIG. 16 shows a fabric model 1601 used in an Ecatalog application dealing with clothing. The model 1601 belongs to the model type Simple Taxonomy which is a kind of taxonomy. It has facets is-a (not displayed), subclasses 1611, actions 1607, and a propagator for facet actions:

```
(inherit-actions actions actions >
    :on access :along is-a)
(actions
    (((nontransitive nonreflexive nonsymmetric) nil)
    inherit-actions))   ; Actions are inherited from
parents
```

This propagator causes actions to be inherited by subclass concepts from their parents (in the direct analogue to OO class based inheritance of "methods"). For example, agent refine-content-on-clas-add 1605 is connected in facet actions 1607 to root concept Fabric 1613 and thus it will be available to all concepts throughout the underlying tree. This would be equally true if it were attached to any concept C in the subclasses facet: 1605 would be available to the subclasses under C.

Continuing further, let agent 1605 be registered with the event class "Neighbor addition" 1207 of FIG. 12. This indicates that the events that 1605 should watch for in any model where it is attached along the actions facet, are those where some concept (or instance) is being added to one of the existing concepts in the model. For example, if the new concept Chamois is added to the Cotton concept 1609 along subclasses facet 1611, this will generate a "Neighbor addition" event. Agent 1605 would then become active (in its own thread) and perform its actions based on the context of the event: the model where the event happened (model 1601), the concept being added to (Cotton concept 1609), the neighbors being added (new concept Chamois), and the facet involved (subclasses facet 1611).

Agent 1605 would then reclassify any chamois fabric instances attached to the originating concept (Cotton concept 1609) down into the more specific new Chamois concept. Note how this uses the context specific information of working with only the instances that are known to be only cotton (not some other existing specialization of cotton or all instances in the world).

As an example of an agents code we present here the definition for agent 1605:

```
(defagent refine-content-on-class-add ((owner node facet
    neighbors)
            "Neighbor addition"
            "Simple Taxonomy")
    (when (is= facet (the-facet "Subclasses"))
        (with ((new-concept (element 0 :of neighbors))
            (insts (all x :in (the-direct-instances-of node)
                :suchthat
                (matches new-concept (the-description-
of x)))))
            (the-name-of x) :case-fold t)
    (move insts :from node :to new-concept)))
```

Innovations and Benefits of the Ariadne System

Further experience with the Ariadne system disclosed in the parent of the present patent application has led to an improved understanding of the notions that underlie the system and of the benefits of basing a software composition system on those notions.

Underlying Notions

The notions underlying the Ariadne system can be summarized as follows:

1. The use of multiple models of various styles (part-whole, grouping, taxonomy, associative, causal, etc.) to capture various aspects of a set of items or body of information. Each of these aspects represents an abstraction one might use when describing or analyzing the set of items of body of information. The result is an open ended, dynamically and independently extensible, interacting collection of varied representations that capture various sets of "knowledge" about the subject.

2. The realization that these various ways of abstracting an aspect (categorizing, associating, cause-effect, etc.) of something can in turn be represented as sets of semantically enhanced overlaid graphs which all use the same vertex set. Each such graph captures a facet of the abstraction involved and the total collection is able to capture all the elements of the style of abstraction involved.

3. The determination that a formal collection of facet definitions (or specifications) can be used to define a style of abstraction and thereby provide a model type for many models expressing this style. So, a model type can (without being unduly misleading) be thought of as a "generator" of multiple models (of the same style, which style is captured by the model type definition).

4. The use of context sensitive declarative constraint annotations to provide and enforce the intended semantics of any given edge set for any given facet. The constraint annotations implicitly fire on associated events. This implies that the relation provided by the facet (by its edge set) actually means something. It is not just a set of connections between vertices made by fiat. Further, these constraints can (and typically should) make use of the semantics embodied in the facets of related models.

5. The recognition that most styles of modeling presume an expected set of implicit behavior for any given example of the modeling. In a system of causes and effects, there is an expectation that when a cause is asserted the effects will be asserted. In a taxonomic sort of categorization, we expect the features of a more general category G to be "inherited by" or propagated to specializations of G; that the objects categorized as examples of some set of specializations of G are also subsumed under G.

6. The determination that such behavior is actually the propagation of various subsets of the vertex set of one or more facets along subsets of the edge/arc set of other facets, and that such propagation can be made explicit by users and implicitly invoked.
7. The observation, taken from model theory (the sub-branch of mathematical logic explicitly dealing with the semantics of formal systems), that a "body of information" is a collection of things and any abstraction of them is a wholly separate and independent thing. Further, that what the collection of things is considered to be, how they will be used, etc. is in turn wholly determined by some set of these abstractions.
8. The determination that this explicit separation of "abstractions and the world of things" can be formally captured by the same facet mechanism used to represent models. Further, these facets produce bipartite graphs with concepts in abstractions and objects in the world of things forming the partition of vertices.
9. The recognition that much of the semantics of a program can be captured in explicit models instead of being woven throughout various pieces of code (as is the case in all traditional programming). In particular the contextual and domain semantics of an application can be captured by such explicit models and then utilized as the basis of various applications.
10. The further recognition that autonomous agents guided by and roving over and among these structures can supply the behavioral aspects of programs. Hence a user can program a system (or modify the semantics of one and thus its characteristics and behavior) by changing the domain information captured in its set of domain and context models and/or placing different agents on these models.

Benefits of a System that Implements the Notions

The benefits of a system that implements the above notions include the following:

1. Explicit and direct representation of the relevant information for the semantics of the various aspects of an application. This comes from the explicit support of multiple styles of modeling and their direct representation in model types and the ability to compose together various models via intermodel connections. For example, in a Web Ecommerce application for a hardware store, a hierarchical classification of its inventory (in which pipe fittings are further categorized in terms of water pipes or gaspipes, or where bathroom cabinets are a particular type of cabinet) will need to interoperate with a compatibility model (in which English vs. metric measurements or decorating styles for external fixtures, etc. are captured). In this setting there are two kinds of abstraction: hierarchical classification, and consistency constraints. The models based on them need to interoperate as the focus on the items shifts back and forth with the two very different ways of looking at them.
2. Consistent and direct access to all aspects of an item of information. This is also known as pivoting and reflecting: find an item along the lines of one aspect then access any concept in any other aspect along which it is characterized. From each such aspect one can then reflect back to find related items to the first according to the new aspects. For example, in a Web catalog setting for hardware, there may be several models capturing several different aspects of the catalog items. A fixture could be found while using a classification according to size, flow rates, materials, etc. From this item, one could then reflect back up to find the items placement in models capturing aspects of styling, manufacturers, required accessories, etc. and thus discover contextually relevant similar or analogous items.
3. The multiple model paradigm results in simpler models that can then be composed to solve larger problems. Since models in Ariadne can be developed independently and still transparently integrate together, many of these models can be developed in parallel or taken from previous efforts.
4. Changes to an applications schema (metadata) information can be made independently of changes to the data for the application. For example, in a Web catalog setting, changes to the site architecture (expressed as a model) can be made independently of changes to the site content (data, represented by instances). In addition changes to such metadata can be made as simply as changes to data in traditional systems. This is a direct result of the explicit separation of models (abstractions codifying the schema or metadata information) from the world (the holder of the representative data, including external resources). In traditional systems, in particular databases, changes to the table or classification layout and/or interconnections (the database schema) cannot be made without changing the data as well, and this is typically a system level (database administrator) task.
5. Changing an applications schema is dynamic, simple, and can be easily automated for the given context. Schema migration problems of traditional representations (in particular in relational databases and in object oriented databases) don't exist. Again this is a direct result of the explicit separation of models and the world. In addition the integrated event driven agents provide for end user configurable automatic data updates reflecting the changes. For example, in a Web catalog setting, an agent or agents can watch for changes to the site architecture (expressed as a model) and then automatically re-classify the various web pages holding the catalog items to fit the changes.
6. Extensible event system with dynamically (and end user) configurable actions. This is in sharp contrast to traditional systems (in particular, GUI based event drivers such as Visual Basic) that have static sets of hard coded events and limited means of configuration.
7. Support for multiple simultaneous styles of presentation of the same information models where each is tuned to the most appropriate format for a given context. This moves beyond the traditional model, view, controller paradigm in two ways: 1) by providing different presentations of the same view and 2) by providing the ability to have many different views of (into) the same core information (the abstractions captured in models).
8. Splitting applications among three orthogonal elements—models, agents, and resource proxies—provides programmers with new levels of component based application composition. An application constructed for a specific context may be reused in a similar context by only making changes to one or more of the explicit models. The agents and resource proxies can function as before. Similarly a new application for the same context and resources may be constructed by only providing or selectively applying new agents. Further, the degree of orthogonality provided affords a highly significant increase in the composability of independently developed components.

9. End users acquire greater leverage in two broad areas. First, for an Ariadne based application they will be afforded control over various contextual aspects of an application specific to their setting. This is available through the explicit models. This results in higher productive use of the application in less time and with greater degrees of freedom of where it can be naturally used. Second, for a large class of cases an end user will be able to construct the application without having to involve expensive and scarce expertise needed for a traditional program. This is similar in expectation to the kind of leverage afforded end users of spreadsheets. By constructing or modifying models, constructing or selectively using agents, and by simply changing resource proxies, end users can solve many of their own "programming" problems by means of an unprecedented level of configurability.

The effect of all of this is that in the Ariadne programming environment, "programs=models+agents+adapters", instead of "programs=algorithms+data structures", as in the traditional programming environments.

Introduction to Software Composition Using Model Types, Models, and Agents

Development of Software Composition Techniques

From the very beginning of software writing up to the present, one of the main problems has been bridging the gap between the functional design of a program and its implementation in the environment provided by a particular combination of a hardware architecture and an operating system. In the beginning, programmers actually wrote code in the binary machine language that the hardware interpreted. This approach was both slow and error prone, so the programmers began using the computer to bridge the gap between the program design and its implementation. The first step in this process was assembly language, which used symbolic representations of areas in memory and of machine instructions. A program called an assembler translated the program written in assembly language into machine language. Each hardware architecture had its own assembly language and the programmer thus still had to have an intimate knowledge of the hardware the code was being written for.

The next step in the process of bridging the gap between a program's functional design and its implementation was the development of high-level languages such as Cobol, FORTRAN, and C. These languages were hardware-independent and further permitted direct expression in the program of complex data types and of programming constructs such as conditional branches, loops, functions and procedures, and invocations of functions and procedures.

Then came object-oriented programming languages such as C++ or Java. In these languages, programs manipulated objects belonging to programmer-defined classes. The definition for an object's class included a definition of the representation of an object of the class in memory and definitions of operations that could be performed on the object. The implementations of the operations were hidden within the object. For example, a programmer could define a list class and define a representation of the list, for example as a linked list data structure, and operations such as adding an entry to the list, deleting an entry from the list, and reading an entry in the list. The only operations that could be performed on an object of the list class were those defined for the class. A programmer using the object could not directly manipulate the data structure that represented the list.

Object-oriented programming languages have many advantages. The entities being manipulated by the program could be defined at as high a level as the programmer desired and as long as the operations on an object and the interfaces to those operations did not change, an object could be reimplemented without disturbing the rest of the program. Further, once a set of object classes had been defined, the class definitions could be reused in many different programs. In terms of the entities manipulated by a program, object oriented programming represented an enormous improvement. A fundamental difficulty remained, however: Though any kind of object could be defined, how the objects manipulated by a program related to each other could be determined only by reading the program code. In other words, there was no way of defining semantic relationships between objects apart from the code that manipulated the objects.

The lack of a way of defining the semantic relationships apart from the code makes programs harder to understand and decreases the reusability of their components. The programs are harder to understand because two kinds of information are intertwined in the program:

semantic information about how the objects manipulated by the program relate to each other; and
  control information about how the program controls processing of the objects.

A good example of the problem of intertwined information is provided by the use of tables in relational database systems (RDBs) to implement complex structures such as trees of Web pages. When a tree is implemented in an RDB, the semantic information and the control information are necessarily intertwined. The reason for this is that the only kind of semantics that can be directly expressed in an RDB is that of a table. In Ariadne terms, an RDB has only one model type, an enhanced two-dimensional matrix, and all of the information in the RDB must be stored in such matrices. Information having any other semantics must be implemented in specific cases by means of this tabular structure. When RDB tables are used to implement a tree of Web pages, what makes the tabular structure behave like a tree is the code that manipulates the information in the tabular structure. What's more, such a representation's implementation must be encoded in the data involved; there is no separation of tables from their data. These limitations make it difficult for applications that are implemented using RDBs and deal with information-rich problems and spaces to handle problems that arise in areas such as flexibility, dynamism, consistency, change, update, etc. For example, schema migration is generally an issue when an RDB is used to represent information-rich problems and spaces. Schema migration becomes necessary when there is a need to change the structure (schema) of the data in the RDB, e.g., adding a column, deleting a column, or changing the type of a column. Since the data and structure are mixed in the tables, all of these changes require making changes to the previous existing versions of the schema to bring them (migrate them) into compliance with the new format.

The development of software composition techniques sketched above can be described in broad terms as a growth of expressiveness of the techniques used to compose software. Expressiveness is measured by how simply, explicitly, and directly one can express something in a software composition technique. Anything can be in fact implemented in a program written in machine code; it is however, much harder to write a program of any complexity in machine code and to understand the program once it is written than, for example, to do the same with a program that uses an object-oriented programming language. The reason it is harder is that the machine code is less expressive than the object-oriented programming language. Similarly, because an RDB cannot directly represent a tree, writing and understanding programs that represent trees using RDBs is hard.

Using software composition techniques with a low degree of expressiveness for the problem at hand has several severe disadvantages, the most prominent being:

Defocusing of resources. You waste time and creativity trying to understand how to build the forms of representation that you know you need to describe the problem and its solution.

Wasteful delays of delivery. You have to build the means for representation (once you decide what it is) before you can begin on the task at hand.

Fragility and inflexibility of result.

Lost opportunities for innovative solutions. If you can't express it, you most likely won't think of it.

An important difference between Ariadne and other software composition techniques is Ariadne's expressiveness. Ariadne's model types supports the direct expression of novel contextually sensitive formats for the descriptions of the intricate issues involved. Ariadne's models permit the programmer to interweave models of various types in a free and open-ended fashion. Ariadne's agents permit the programmer to simply and explicitly augment the models, and Ariadne's instances permit transparent interaction with a wide variety of external resources.

Software Composition Techniques Permitting Direct Expression of Relationships Between Objects Manipulated by a Program The model types, models, and agents disclosed in the parent of the present patent application provide a way of separating semantic information from control information. As is apparent from the foregoing discussion, the semantic information about a group of objects will remain unchanged as long as the kinds of objects remain unchanged, while the control information will vary with every program involving the group of objects.

It has long been known that graphs can be used to represent relationships between entities. Each entity is a vertex in the graph, while relationships between the entities are represented by edges connecting the vertices. The graph thus provides a representation of the semantic information concerning the entities represented by the vertices. A simple example of such a graph is a family tree, where each vertex represents an individual and the edges represent relationships between the individuals. It has also long been known that graphs may be organized into classes of graphs. For example, the relationships among the members of any family may be expressed using a family tree graph, and one may speak of a family tree type of graph. The relationships between the vertices of all graphs belonging to the family tree type are the same.

The model types of the parent of the present patent application are of course types of graphs, and the models are graphs. Semantics are represented in the Ariadne system at two levels: the model type and the model. A model type represents semantic relationships between the concepts and instances represented by the vertices of any model having the type. A model represents semantic relationships between the particular items represented by the vertices of the model. Control is provided in the systems disclosed in the parent of the present application by defining agents and making the agents available to the models. Agents are programs that respond to events and operate in the context provided by one or more models. As disclosed in the parent of the present patent application, an agent is defined for one or more types of models and one or more classes of events and may be made available to models belonging to the types for which the agent is defined. When an agent is made available to a model, it will respond to an event of a class for which agent is defined by executing in the context provided by the model. Among the events to which an agent may respond is an invocation of the agent by a user of the Ariadne system or another agent.

The programming system of the parent of the present patent application thus separates the semantic information about the concepts, represented in the model types and models, from the control information, incorporated in agents. It should be noted here that the use of agents with the models and model types of the parent of the present patent application is in no way dependent on the fact that certain of the vertices of the models of the parent patent application represent concepts. Agents can in fact be used with graphs whose vertices represent any kind of entity whatever, and the model types, models, and agents of the parent patent application thus represent a particular example of a general software composition paradigm.

Figure 18:
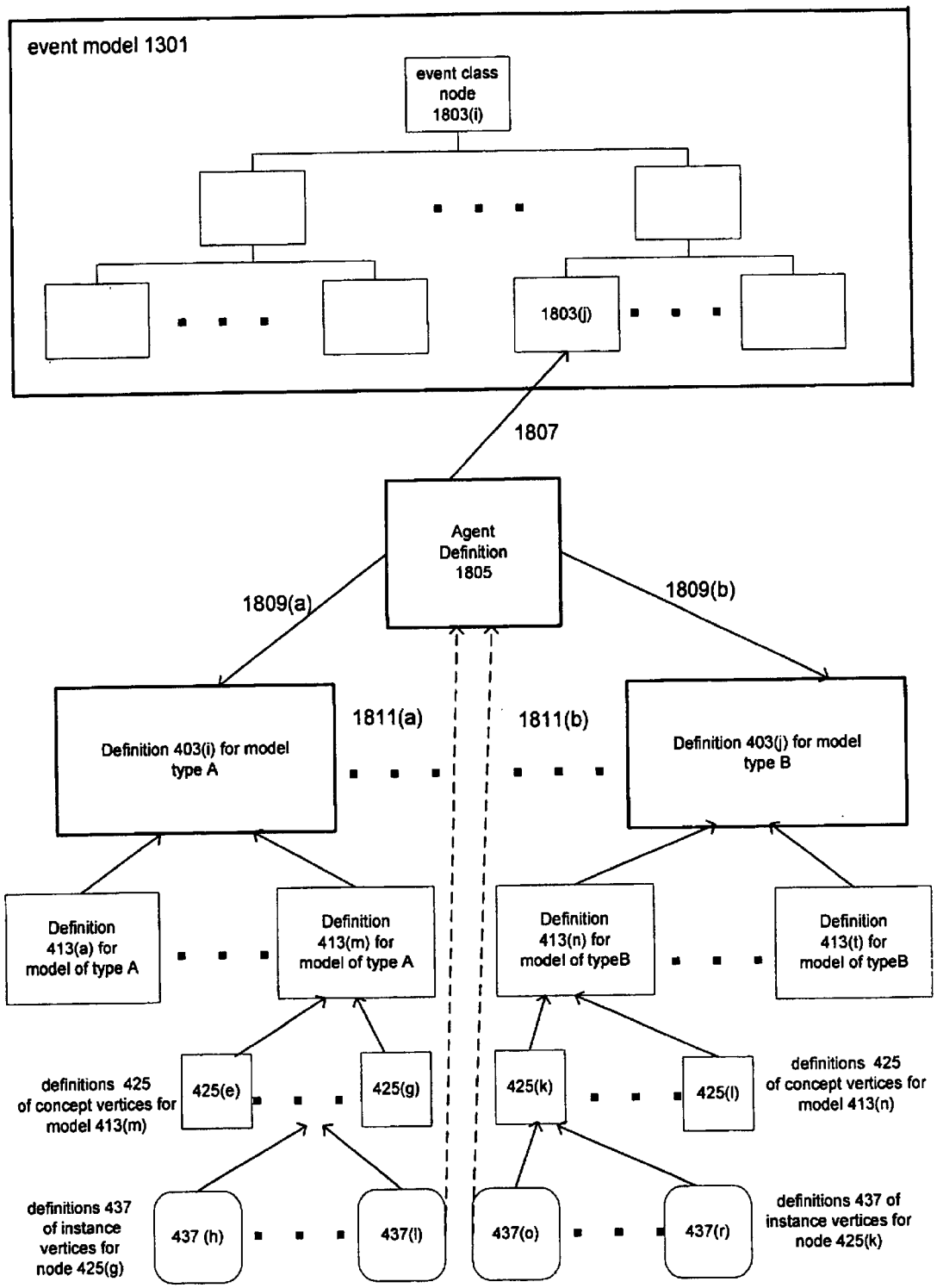
FIG. 18 shows an agent and its relationship to other components of the Ariadne system.

Model Types, Models, Events, and Agents in a Preferred Embodiment: FIG. 18

FIG. 18 shows how model types, models, events, and agents are related to each other in the system of the parent of the present patent application. As shown at 1801 in the figure, an agent definition 1805 defines an agent. Agent definition 1805 is always related to one or more events in event models 1301 (shown by arrow 1807) and to one or more type definitions 403 (arrows 1809(*a* and *b*)) and may be made available to one or more models 413 of the types to which the agent definition is related (arrows 1811(*a* and *b*)). Arrows 1811 are dashed to indicate that it is up to the person making a model or even up to the person using a model whether an agent is made available to the model.

Continuing in more detail, event model 1301 is an Ariadne model in which the concepts 1803 are classes of events. An example of such a class of event is the addition of a concept to a model. Here, agent definition 1805 is related to concept 1803(*j*) in event model 1301. In the terms used in the parent of the present patent application, agent definition 1805 is registered with the event class represented by concept 1803(*j*). In FIG. 18, agent definition 1805 is further related to two model types, one defined by model type definition 403(*i*) and the other defined by model type definition 403(*j*). In the Ariadne system of FIG. 18, there are a number of model definitions 413 for models of type A and a number of such definitions for models of type B. The agent defined by agent definition 1805 may be made available to the models defined by any of these model definitions. In FIG. 18, only two models to which the agent of definition 1805 has been made available are shown: model 413(*m*) and model 413(*n*). Each of these models has a number of different concept vertices; the agent definition may be made available to any of these concept vertices; as described in the parent of the present application and shown in FIG. 18, one way of making the agent definition available is to add an agent instance definition 437(*l* or *o*) to a concept vertex. The agent instance's referent field 445 refers to agent definition 1805. Agent 1805 is executed as follows: when an event of the class specified by concept 1803(*j*) occurs which is relevant to either model 413(*m*) or 413(*n*) to which agent 1805 has been made available, agent 1805 is executed in the context provided by model 413(*m*) and 413(*n*).

Using Ariadne to Translate from an XML Document to a Model and Vice-versa

The advantages of Ariadne as a software composition technique will be illustrated in the following by showing how Ariadne can be used to translate XML documents. The discussion will begin with a description of XML and of the problems involved in translating XML documents and will then disclose how translation may be done using Ariadne.

XML

XML (Extensible Markup Language) is a standard language for defining application/industry-specific tagged dialects for description of the definer's unique data. XML is particularly useful for this purpose because it separates the description of the dialect from the content of the data for which the dialect is to be used. The separation of description and content permits easy parsing and transformation of XML documents using industry standard tools. For more information about XML, see http://www.w3.org/XML. XML documents are interpreted by means of document type definitions (DTD's). A DTD defines what XML constructs may appear in documents defined by the DTD and what the syntax of these constructs is.

Figure 19:
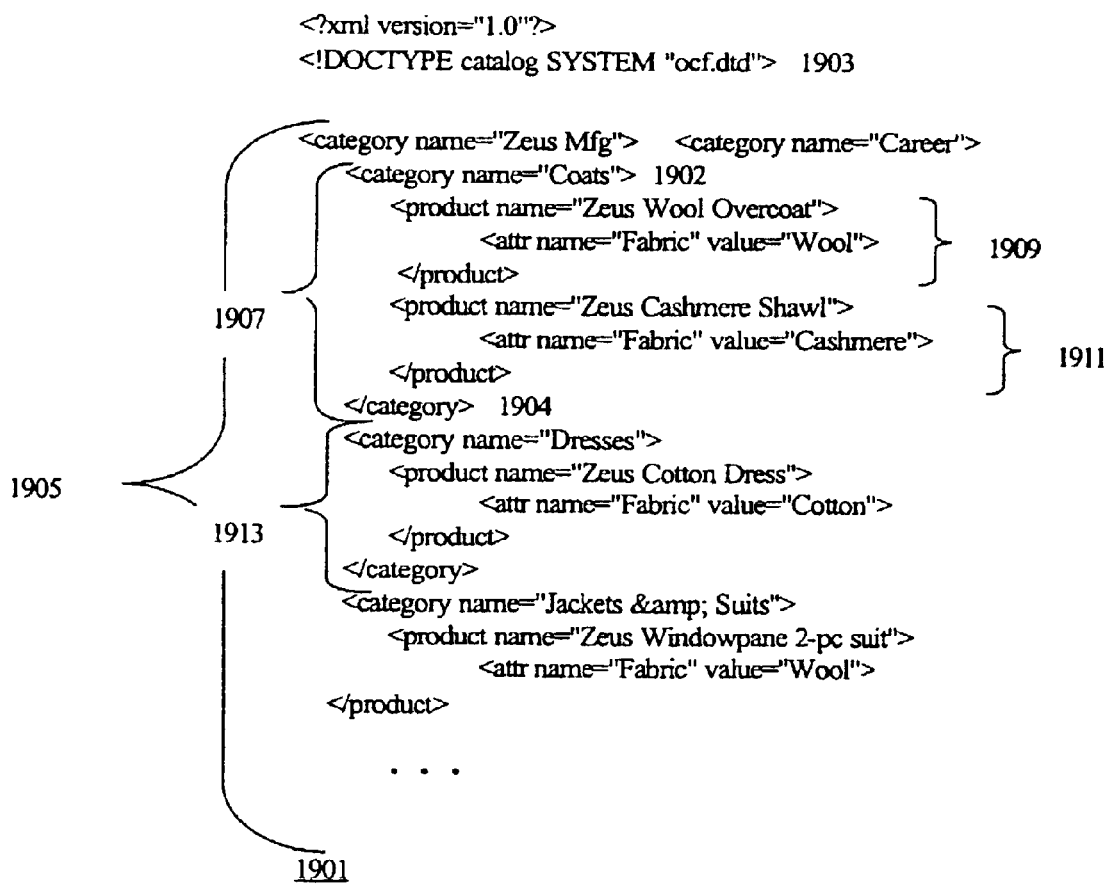
FIG. 19 shows an XML document according to the OCF standard.

FIG. 19 shows an XML fragment 1901 that is written in the Open Catalog Format (OCF), a proposed standard XML DTD for XML representations of catalogs of merchandise. The catalog is made up of categories of products; within a category, products are listed, and for a product, attributes such as what the product is made of are listed. The DTD for fragment 1901 is specified at 1903. XML is made up of constructs defined by tags. An XML tag has the form:

<construct_name zero or more parameters>

For example, the tag used to define attributes in fragment 1901 has the name attr and parameters for the attribute's name and value. The tag <attr name="Fabric" value="Wool> indicates an attribute that specifies that the fabric of the product with which it is associated in fragment 1901 is wool.

Constructs may be nested, i.e., they may be contained in other constructs. Constructs that contain other constructs have the form <construct_name zero or more parameters> construct_ content </construct_name>

For example, in FIG. 19, <category name="Coats"> 1902 is a tag that marks the beginning of a category construct, while </category> 1904 is a tag that marks the end of the category construct that begins at 1902. The construct and all of its contents are indicated by bracket 1907. Construct 1907 has nested in it two product constructs, shown at 1909 and 1911 and each of these has a nested attr construct. The attr construct can have no other constructs nested in it. Other constructs are shown by brackets 1905 and 1913. XML is extensible because the user can define his or her own constructs; XML specifies only the construct's form, not its meaning. Of course, if an XML document is to be communicated from a source to a destination, the destination must have access to the XML document's DTD.

As long as the parties who are using XML documents to exchange information all use the same DTD, information exchange is easy and efficient. There are, however, no standards for DTDs. It will thus often occur that two XML documents contain substantially the same information but have different DTDs, and when that is the case, there is no easy way of translating from an XML document with DTD A to an XML document with DTD B, and vice-versa.

Figure 20:
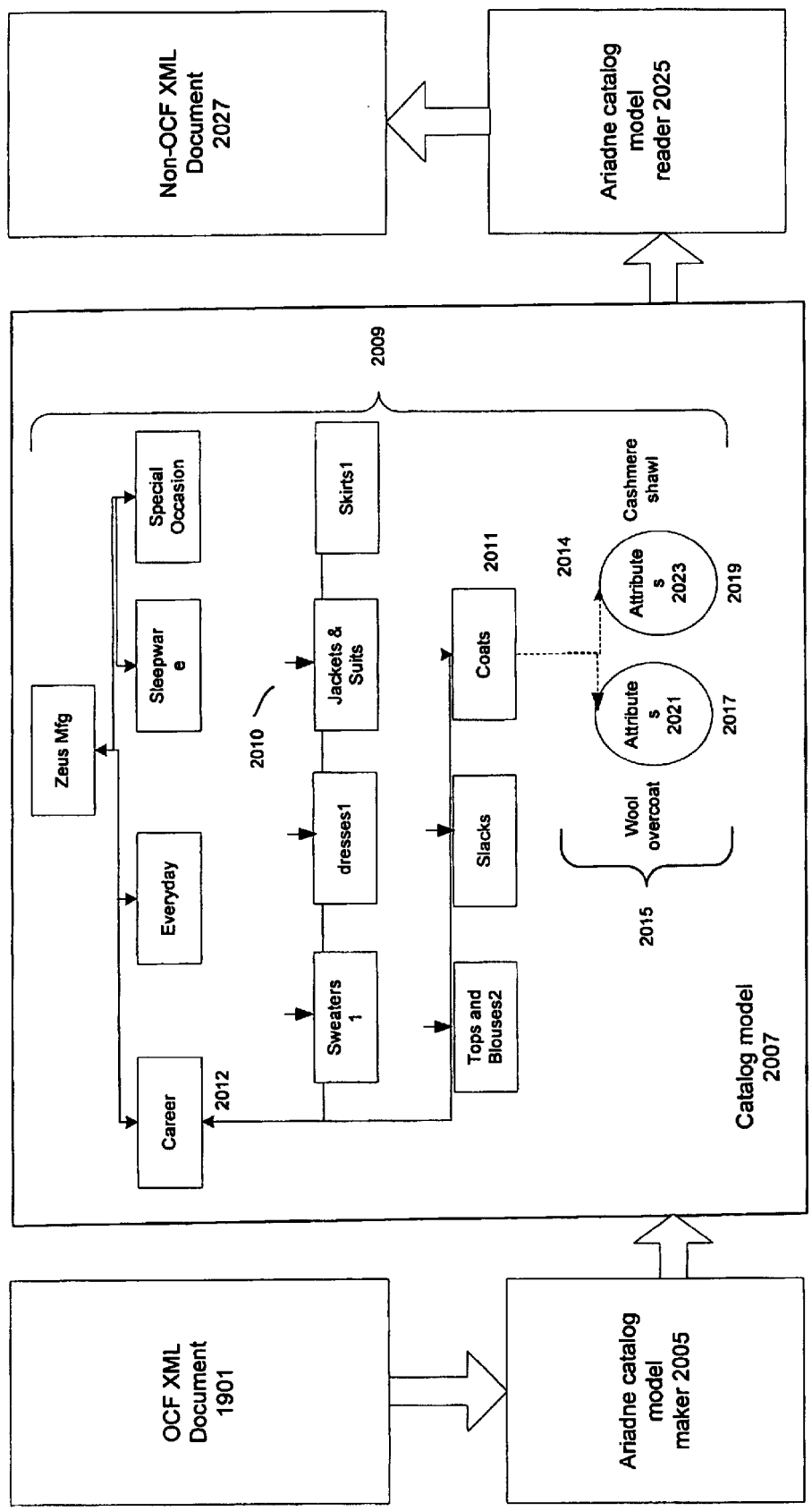
FIG. 20 shows how XML documents may be translated using semantic representations.

Translating XML via a Semantic Representation: FIG. 20

In one aspect of the invention, the problem of translating an XML document that has a first DTD into an XML document that has the same semantics but has a second DTD can be solved by translating from the first XML document into a representation of the semantics and then from the representation of the semantics to a second XML document. The semantic representation can be anything which is able to represent the semantics shared by the XML documents. For example, the OCF XML document 1901 can be represented by an Ariadne taxonomy model, and the translation can be done as shown in FIG. 20.

In translation system 2001, OCF XML document 1901 is translated into non-OCF XML document 2027 by making a semantic representation of document 1901, namely Ariadne catalog model 2007. Translation system 2001 will work to translate any OCF XML document into a document having the same DTD as non-OCF XML document 2027. Ariadne catalog model 2007 is a model of the taxonomy model type. Square boxes indicate the classes 2009 that are the concepts of the model. Circles indicate instances of the class, namely products belonging to the class. The solid arrows 2010 connecting the concepts represent the taxonomy model's subclass and is a facets. Subclasses are shown in model 2007 only for Career class 2012 and instances 2015 are shown only for the Coats class 2011. The dotted arrows 2014 connecting the instances to Coats represent the item and item of facets. Attributes in an instance indicate information in the instance's property list 431 about the product represented by the instance. Where the product is clothing, as in model 2007, the attributes may specify the sizes, fabrics, and colors in which the instance is available. For example, wool overcoat instance 2017 has an attribute in attributes 2021 indicating that its fabric is wool.

It should be noted here that catalog model 2007 is an Ariadne model like any other; consequently, an instance belonging to catalog model 2007 may have facets connecting it to other Ariadne models. For example, another model might organize the products according to the fabrics they were made of. If such a fabrics model has a wool concept, then instance 2017 may have exhibitor and exhibitor-of facets connecting it to the wool concept. As will be explained in detail in the following, translating XML document 1901 into catalog model 2007 may include making such connections between instances in model 2007 and other models.

The translation of XML document 1901 into catalog model 2007 is done by Ariadne catalog model maker 2005, which can make any OCF XML document 1901 into a corresponding catalog model 2007. The translation from catalog model 2007 to non-OCF XML document 2027 is done by Ariadne catalog model reader 2025, which can translate any catalog model 2007 into a corresponding XML document having document 2027's DTD.

Translation of XML Documents into Semantic Representations

In translation both to and from catalog model 2007, what the translation does is find a pattern in a source and generate a structure corresponding to the pattern in a target. For Ariadne catalog model maker 2005, the source is an OCF XML document and the structure corresponding to the pattern in the source is a part of catalog model 2007; for Ariadne catalog model reader 2025, the source is a catalog model and the structure corresponding to the pattern in the source is an XML structure. Translation by finding a pattern in a source and generating a structure corresponding to the pattern in a target is well-known in the compiler and code generation fields. In these areas, the technique used is the following: patterns are expressed as rules in a grammar. Semantics for these patterns are specified by code generation routines. The routines specify what is to be done when an example of the rule for which they are written is encountered. To make a translator, one writes a grammar that describes interesting patterns in the source document. For each rule in the grammar, a small program called a synthesis routine is written in a general-purpose language. The synthesis routine creates an output structure based on information in the pattern matched by the rule. Since the synthesis routine relies on knowledge about the rule, a new synthesis routine has to be written for each rule. Translation using grammars and synthesis routines is a well-known programming paradigm, and several public-domain tools have been written to support programming in this style. For details about the paradigm and examples of the tools used to support it, see John Levine, et al., lexx & yacc, O'Reilly, 1992. While the techniques just described can be used wherever it is possible to define grammar rules for doing the translation from the source to the target, both the definition of the grammar rules and the writing of synthesis routines require a high degree of expertise. Moreover, the synthesis routines are specific to particular grammar rules and are therefore not reusable. Even with such an implementation, however, the use of an Ariadne model as the semantic representation greatly simplifies the work of making model maker 2005 and model reader 2025.

Figure 21:
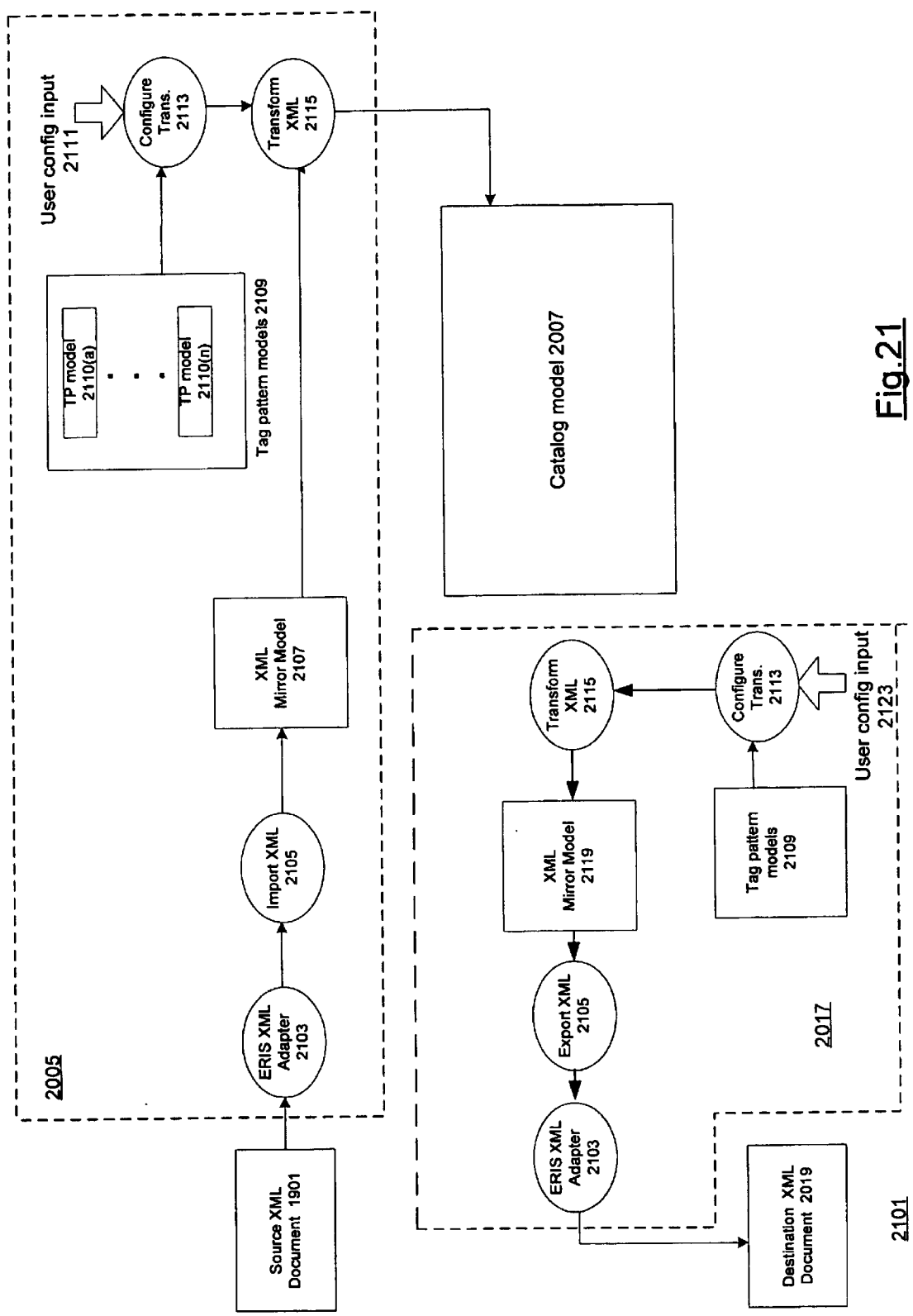
FIG. 21 shows how models may be used to translate other models.

Using Ariadne to Implement Catalog Model Maker 2005 and Catalog Model Reader 2025: FIG. 21

The parser/translator programs made using conventional compiler and code generation techniques are excellent examples of the intertwining of information about the context of use of a program with control information. Here, the context information, namely the grammar rule to which the program applies, is intertwined with the control information for the code generation. With Ariadne, it is possible to separate out these elements, and thus to make it possible for people who are not skilled in the compiler and code generation technologies to implement catalog model maker 2005 and catalog model reader 2025.

FIG. 21 shows how Ariadne models and agents may be used to implement catalog model maker 2005 and catalog model reader 2025. As with standard translation techniques, grammar rules are made for patterns in the source for the translation. In the Ariadne environment, however, the grammar rules are models of type tag pattern and are termed herein tag pattern models. In a preferred environment, the tag pattern models are themselves instances in a taxonomy model. The taxonomy model that organizes the tag pattern models is shown at 2109 and the tag pattern models themselves are shown at 2110(*a* . . . *n*).

Tag pattern models describe how information in a source model is used to make or modify a target model. To actually make or modify the target model, Ariadne applies an ordered set of tag pattern models to the source model. The tag pattern models match patterns in the source that are of interest for the target model and the order of the tag pattern models determines the order in which the tag pattern models are applied to the source. In addition to specifying the parts of the source model to be matched, the tag pattern models specify how information from the source model is used to make or modify the target model. Both the patterns to be matched and the use of the information are specified as annotations to the tag pattern models. In the preferred embodiment, the annotations are implemented as properties of the tag pattern model's vertices.

The Ariadne system of the preferred embodiment provides a predefined set of tag pattern model vertices. The set of vertices is in fact a set of reusable transformation building blocks that represent primitive transformations that can be made of the part of the document matched by the tag pattern models. The vertices act like the custom programmed synthesis routines, but unlike the custom synthesis routines, they can be configured by combining them in tag pattern models. As models, they are as easy to configure as any other Ariadne model. There is no longer any need to code the synthesis routines in a general-purpose programming language—the transformation is created using the tag pattern model vertices which the Ariadne system provides for the purpose of XML translation. Moreover, the technique just described is general—tag pattern models can be used not just to translate XML to and from Ariadne models, but generally to read information from one Ariadne model and use it to make or modify another Ariadne model.

Continuing in more detail, in FIG. 21, models are shown as rectangles and agents are shown as ellipses. Arrows show the flow of information in the translation process. Beginning with the translation of an XML source document to a semantic model, Import-XML agent 2105 accesses source XML document 1901 via an XML adapter 2103 in ERIS 505. XML adapter 2103 parses the XML document and produces a sequence of integers that point to subtrees in the XML document. The subtrees are XML constructs. Import-XML agent 2105 reads the subtrees from adapter 2103 and makes vertices in XML mirror model 2107 corresponding to the XML constructs in the subtrees.

XML mirror model 2107 will be explained in more detail later; for the present discussion, it is necessary only to understand that mirror model 2107 reflects the structure of the XML constructs in XML document 1901 and preserves the information contained in document 1901. The vertices of XML mirror model 2107 represent XML constructs and the facets indicate whether the construct represented by a given vertex is contained in another construct. The content of the XML constructs is expressed as properties of the vertices that represent the constructs. It should be noted here that import-XML agent 2105 is completely generic; it will make an XML mirror model 2107 from any legal XML document, regardless of the XML document's DTD.

Once XML document 1901 has been transformed into an Ariadne mirror model 2107, an ordered set of tag pattern models 2110 specific to the DTD of XML document 1901 can be used to transform mirror model 2107 into the semantic model, here catalog model 2007. A configure-translations agent 2113 specifies what tag pattern models 2110 are to be applied to mirror model 2107 and also the order in which the tag pattern models 2110 are to be applied. As indicated at 2111, selection and ordering may be in response to input from a user of system 2101.

The actual application of the tag pattern models to mirror model 2107 in the specified order is done by transform-XML agent 2115. The results of the application are determined completely by the contents of mirror model 2107, the tag pattern models 2110 that are applied to those contents, and the order in which they are applied. Like import-XML agent 2105, configure-translations agent 2113 and transform-XML agent 2115 are completely generic; while applied here to translate an XML mirror model 2107 into a semantic model 2007, they can in fact be used to transfer information from any Ariadne source model to any Ariade destination model. The transfer may include making as well as modifying the destination model. The only requirement is that the user has set up the ordered set of tag pattern models needed to locate the information in the source model and transfer it to the destination model. It should further be pointed out that a given ordered set of tag pattern models can transfer information from any source model whose patterns match the tag pattern models as ordered to the destination model. Thus, if there is an ordered set of tag pattern models for XML mirror models 2107 made from OCF XML documents and catalog model 2007, system 2101 can translate any OCF XML document into a catalog model 2007.

Translation from a semantic model 2007 to a destination XML document 2027 uses the techniques described above in reverse. Configure-translations 2113 has been set up to specify the ordered set of tag pattern models 2110 needed to transform model 2007 into a mirror model 2119 for an XML document having the output document's DTD. As before, transform-XML 2115 does the actual transformation. Export-AML agent 2117 makes a standard XML DOM graph from mirror model 2119 and provides the DOM graph to ERIS XML adapter 2103 for output.

The fact that all of the data structures used in the translation are Ariadne models provides three advantages:
1. Since the input is represented as a graph, it is possible to represent the rules as graphs,
2. Since the rules are graphs, the syntheses routines can be configured graphically, as annotated vertices, and
3. Since the output is a graph, the transformation can be specified graphically.

The graphical representation of input, rules, synthesis routines, and output mean that people who have the domain knowledge needed to do the translation can specify a translation without learning the programming skills that are normally required for the task.

Ariadne models can be used in the manner described above because Ariadne can manage multiple models in a consistent and powerful way. While the technique just described could be used in systems other than Ariadne, Ariadne offers unique advantages for its implementation.

Figure 22:
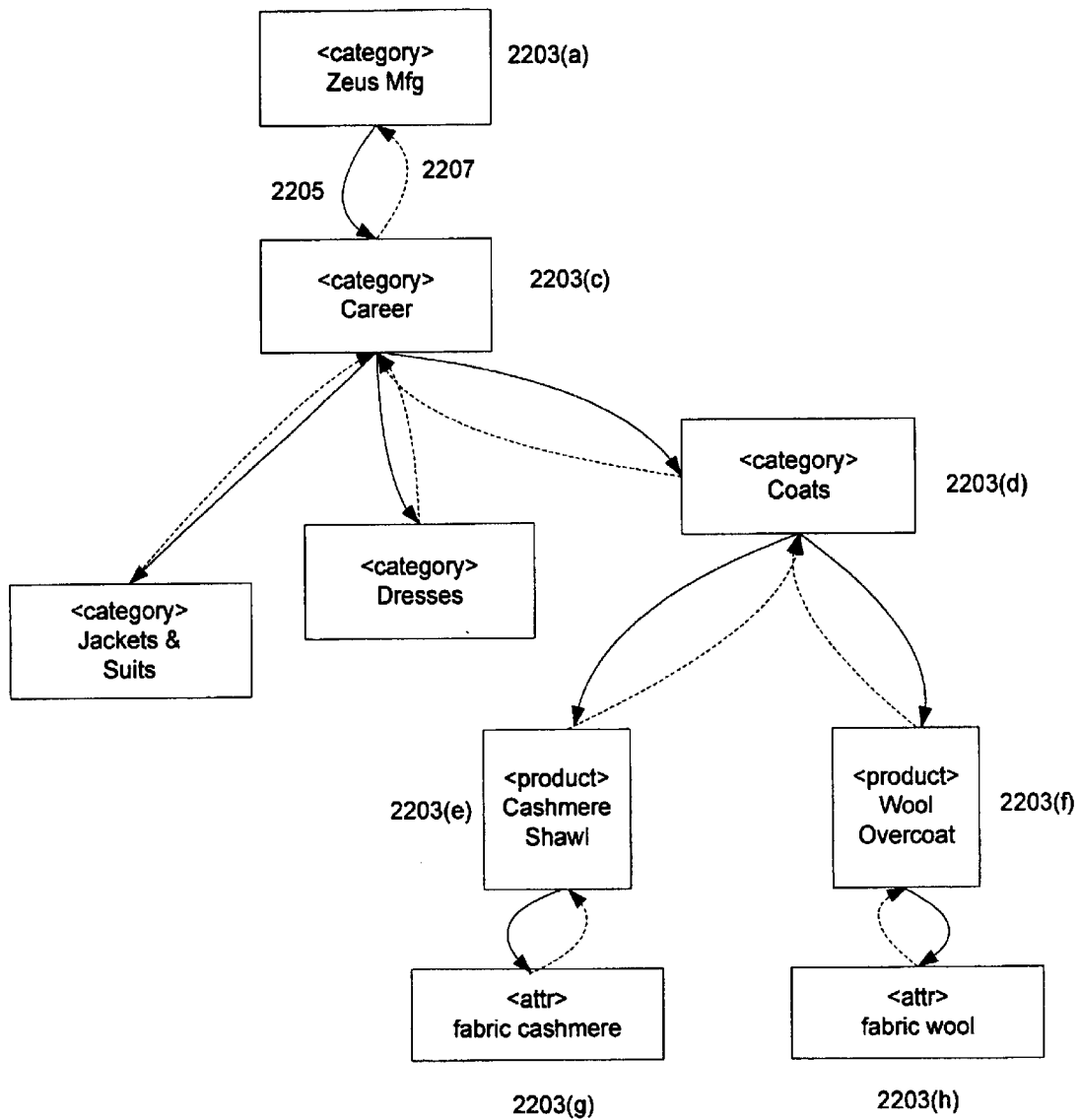
FIG. 22 shows an XML mirror model for the document of FIG. 19.

Details of XML Mirror Model 2107 and Import XML Agent 2105: FIG. 22

Mirror model 2107 is an Ariadne model whose model type is XML-DOCUMENT. Models of type XML-DOCUMENT have only two facets, encloses and enclosed-by, and the only constraint on the facets is that X encloses Y if and only if Y enclosed-by X. As is apparent from the foregoing description, a model of type XML-DOCUMENT can represent any XML source document. Moreover, models of the type can be used not only to represent XML documents, but any kind of source that has a nested structure. Since the sole purpose of models of type XML-DOCUMENT is to represent XML documents and other nested data sources, the type has no model-world facets, i.e, no item, item-of, exhibitor, or exhibitor-of facets. Agents associated with the type XML-DOCUMENT include import-XML agent 2105 and transform-XML agent 2115.

Models of type XML-DOCUMENT have one vertex for each construct in the XML document. As the facet names suggest, if the XML construct has another XML construct immediately nested within it, then its corresponding vertex is connected by an encloses facet and an enclosed-by facet to the vertex corresponding to the enclosed construct. Both facets are transitive. Any information about the structures (e.g., the tag type, attributes or content) is recorded as annotations of the vertex; in a preferred embodiment, these are recorded as properties of the vertex. In a preferred embodiment, each vertex in the XML mirror model has a unique identifier; this solves two problems:
1. It ensures that there will be one and only one vertex in the target model corresponding to a given construct in mirror model 2107; and
2. It ensures that transform-XML agent 2115 can locate the target model vertex corresponding to a vertex in mirror model 2107 being matched by a pattern.

For expository purposes, in this document the names of the vertices will consist of the type of the XML construct represented by the vertex, followed by the construct's direct content.

FIG. 22 shows a portion 2201 of the mirror model for the OCF XML fragment of FIG. 19 which system 2001 transforms into catalog model 2007. Each vertex 2203 represents an XML construct from OCF XML fragment 1901. Thus, vertex 2203(*d*) represents XML construct 1907 of fragment 1901. The encloses facet 2205 is represented by a solid arrow; the enclosed-by facet 2207 is represented by a dashed arrow. Portion 2201 has three recurring patterns of vertices: <category> vertices that are enclosed by other <category> vertices, for example vertices 2203(*c* and *d*), <product> vertices, for example 2203(*e* and *f*), that are enclosed by <category> vertices, and <attr> vertices, for example 2203(*g* and *h*), that are enclosed by <product> vertices. The <category> enclosed by <category> pattern corresponds to a class-subclass relationship between vertices of catalog model 2007, the <product> enclosed by <category> pattern corresponds to a class-instance relationship between vertices of model 2007, and the <attr> enclosed by <product> pattern corresponds to a relationship between an instance and the instance's properties in model 2007.

In a preferred embodiment, XML mirror model 2107 is made by Import-XML agent 2105 from the subtrees that Import-XML gets from adapter 2103. The enclosed-enclosing relationships are clear from the subtrees and ImportXML agent 2105 simply makes model 2107 accordingly. The import from XML to the plain, information-preserving reflection ("mirror model") may be accomplished in other embodiments through the use of any XML parser.

Figure 23:
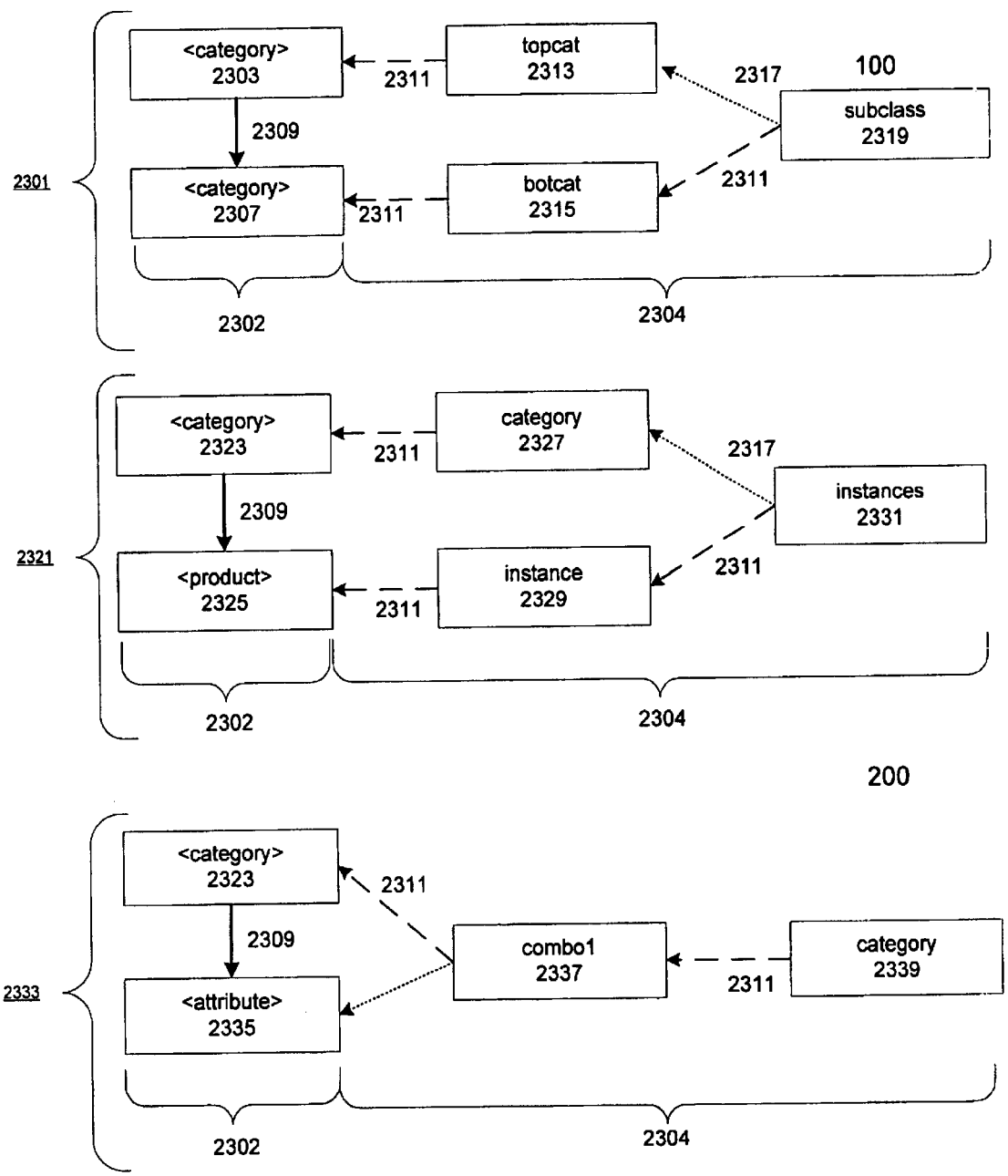
FIG. 23 shows a number of tag pattern models that are used to translate the XML mirror model of FIG. 22 into a catalog model.
Figure 24:
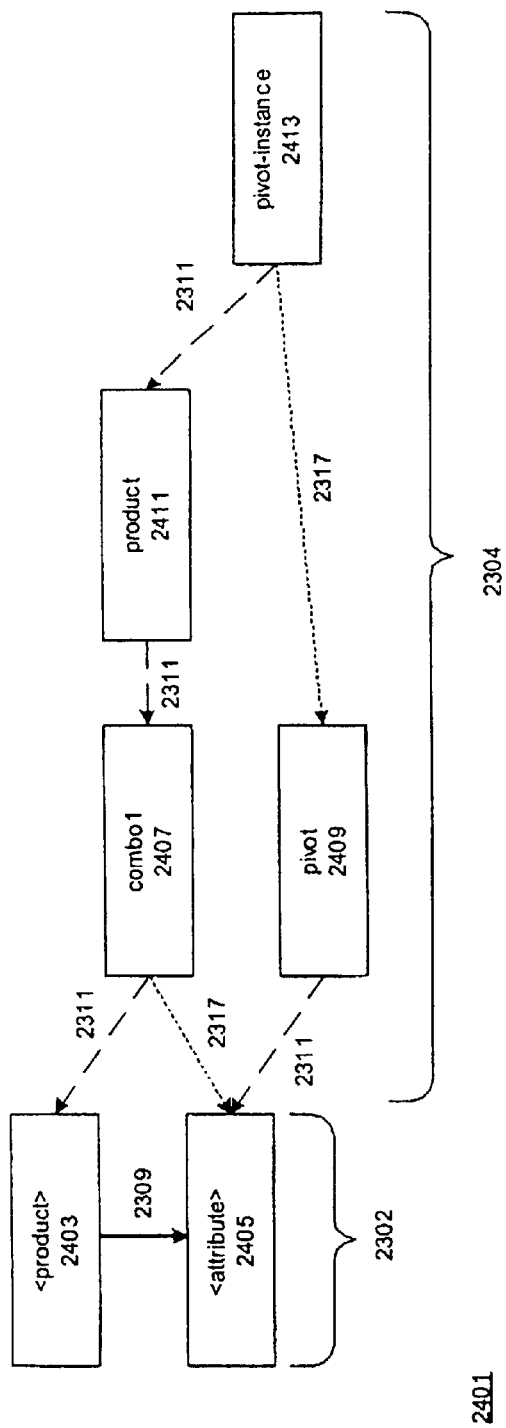
FIG. 24 shows another such tag pattern model.

Details of Tag Pattern Models 2109 and Transform XML Agent 2115: FIGS. 23 and 24

As indicated in the overview, in translation system 2101, transform-XML agent 2115 translates an XML mirror model 2107 into a catalog model 2007 by applying tag pattern models 2109 to patterns in XML mirror model 2107. Tag pattern models 2109 thus perform the same functions as the grammars and synthesis routines of standard compiler technology. FIGS. 23 and 24 show four of the tag pattern models 2109 used to do the translation in a preferred embodiment. The four tag pattern models do the following:

model 2301 matches the pattern of a <category> enclosed within a <category> and produces a class vertex that is a subclass of another vertex in catalog model 2007;

model 2321 matches the pattern of a <product> enclosed within a <category> and produces an instance vertex that is an instance of the category's concept in model 2007;

model 2333 matches the pattern of an <attr> within a <category> and adds the attribute to the properties in the vertex for the category in model 2007.

model 2401 matches the pattern of an <attr> enclosed within a <product> and adds the attribute to the properties in the instance vertex for the product in model 2007. If there is another model that has the name specified in the attribute and a vertex for the value specified in the attribute, model 2401 also adds exhibitor and exhibitor-of facets to the instance vertex that connect the instance vertex to the vertex for the value in the other model.

Tag Pattern Models Generally: FIG. 23

Tag pattern models are models of type tag-pattern. The type description follows:

Model Type: Tag-pattern
  facets:
  Part Of (nontransitive)
  NameSource (nontransitive)
  DataSource (nontransitive)
  propagators: none
  constraints: none
  Notes. The tag-pattern model type is quite simple; its four facets have no propagators or constraints. The arrowhead in the graphical representation of a facet in a model indicates the location of the next neighbor on the facet. Part Of facet 2309 specifies a facet in the source model that is part of the pattern of vertices and facets being matched by the tag pattern. The facet matched by Part Of in a particular tag pattern model is specified in a property in the tag pattern model. The example tag pattern models match XML mirror models 2107, and thus in these models, Part Of generally matches the Encloses facet. DataSource facet 2317 and NameSource facet 2311 are facets that are used by the various agents; the intent is that if an agent requires information about the name of an item, it finds the information by following the NameSource facet; it finds other data about the object by following the DataSource facet.

Sources of and destinations for information contained in a vertex in a tag pattern model are specified by the names and values of properties in the vertex. In general, when a value for a property is specified with ^[xxx], where xxx is the name of a property in a next neighbor on the DataSource or NameSource facet, the value is that of the value for the named property in the next neighbor. When a vertex has only a single one of the two facets, ^[xxx] indicates that the value is to be obtained via that facet. If a vertex has both, the facet an agent follows to find the value is determined by the name of the property; if the name has the prefix name__, it is the NameSource facet; if the name has the prefix data__, it is the DataSource facet. For example, the property name and value name__uid ^[name]

in a particular vertex of the tag pattern model specifies that the UID of the matched mirror model vertex is to be obtained from the name property of the tag pattern model's pattern vertex that is the particular vertex's next neighbor on the NameSource facet.

If a value of a property in a vertex of a tag pattern model is to be propagated to a vertex of the target model, the property name begins with the prefix prop__. Thus prop__uid ^[uid]

indicates that the value represented by ^[uid] is to be propagated to a vertex of the target model. Here, of course, the vertex containing the property has only a single one of the NameSource or Datasource facets.

Semantic Tag: Concept, Instance, Facet
  calling context: These tags are used as values for the property "synth" of a synthesis node in a pattern.
  facets used: DataSource, NameSource
  properties used: prop__*
  description: The semantic tags specify the kind of component to be made or modified in catalog model 2007. As the tags imply, the components may be concept vertices, instance vertices, or facets.
  In the case of the facets, it is expected that DataSource points to a vertex in the tag pattern model that is a source of name information, while NameSource points to a vertex that is a source of other information.

Synthesis nodes with the tags concept and instance enforce the extra stipulation that two vertices in the target model will not be created with both the same name and the same value for the property UID; in this case, only one vertex will be created.

Semantic Tag: Combo
  calling context: This tag is appropriate as a filler for the property "synth" of a semantic node in a pattern.
  facets used: DataSource, NameSource
  properties used: data__*, name__*
  description: combo vertices collect information from more than one of the pattern vertices and pass the combined information on to a synthesis vertex having a concept, instance, or facet tag.

Each tag pattern model has two parts: a pattern part 2302 whose vertices and/or facets identify the pattern of vertices and facets to be matched by the tag pattern model, and a synthesis part 2304 whose vertices and facets describe how the information in the matched vertices of XML mirror model 2107 is to be used to make and/or modify catalog model 2007 and sometimes other Ariadne models. In pattern part 2302, pattern vertex 2303 is connected by a directed part of facet 2309 to pattern vertex 2307. Facet 2309 specifies the facet that the pattern is to match. In model 2301, for example, Part Of facet 2309 is set to specify an ENCLOSED BY facet and both vertices connected by part of facet 2309 specify categories, so model 2301 matches any occurrence in mirror model 2107 of a <category> vertex that is joined by an ENCLOSED BY facet to another <category> vertex. For example, model 2301 matches the vertices 2203(c) and 2203(d) in mirror model portion 2201.

Synthesis part 2304 specifies what kinds of vertices and facets in catalog model 2007 (or other models) will be made or modified using the information contained in the portion of XML mirror model 2107 that matches the pattern specified in pattern part 2302 and how the information is to be used in the vertices and facets. There is a synthesis vertex in synthesis vertices 2304 for each kind of vertex or facet to be made or modified in response to a match. The kind of vertex or facet, the information it is to contain, and the sources of that information are indicated by the properties of the synthesis vertices. The notation used to indicate this in the properties has already been described; a complete example of the propagation of information will be given in the discussion of tag pattern model 2333.

The following is an example of the properties of a synthesis vertex 2304. The list of properties is from a vertex that specifies creation or modification of a vertex that represents a concept in an attribute model. The vertex in question is vertex 2409 in FIG. 24.

| Property name | Property value |
|---|---|
| synth | concept |
| in-model | ^[attr__name] |
| new-item | Light Pink |
| matches | L |
| prop__name | ^[attr__value] |

The synth property specifies what is to be synthesized from the information in the vertex; here, as indicated by the property's value, it is a concept vertex. in-model specifies the model in which the concept to be synthesized is to be found or created. The model is the one that has the name of the attribute represented by the vertex of the mirror model matched by an <attribute> vertex in the tag pattern model. In vertex 2405, the property to which the value belongs has a name of the form name_attr_name. new-item identifies the part of the destination model currently being created or modified using the synthesis vertices; matches specifies the part of the source model currently being matched. Model 2301.

Beginning with model 2301, both vertices connected by part of facet 2309 specify categories, and Part Of facet 2309 specifies an Enclosed By facet, so model 2301 matches any occurrence in mirror model 2107 of a <category> vertex that is joined by an Enclosed By facet to another <category> vertex. For example, model 2301 matches the vertices 2203(c) and 2203(d) in mirror model portion 2201. The vertices of catalog model 2007 that correspond to this part of mirror model portion 2201 are vertices 2012 and 2011.

The action that must be performed when a pattern matching that specified by pattern vertices 2303 and 2307 and Part Of facet 2309 is found in mirror model 2107 is the creation of a class vertex for the category specified by vertex 2307 in catalog model 2007 and making the new class vertex into a subclass of the category specified by vertex 2303. That action is specified by the vertices and facets of synthesis vertices 2304. In 2301, there are three synthesis vertices: vertices 2313 and 2315 specify class vertices in catalog model 2007. Vertex 2313 specifies a class vertex that corresponds to the class specified by pattern vertex 2303 and vertex 2315 specifies a class vertex that corresponds to the class specified by pattern vertex 2307. The latter class vertex is a subclass of the former. Vertex 2319 is a facet vertex; it specifies that the class vertices specified by vertices 2313 and 2315 are to be connected by the facet required for such a relationship, namely, the subclass facet. As pointed out in the discussion of FIG. 4 of the parent application, the facet is represented in a preferred embodiment as an attribute in the class vertex specified by vertex 2313; the facet attribute contains the name of the facet and the name of the vertex that is the next neighbor along the facet. As required by the taxonomy model type, Ariadne automatically creates the is a facet in the class vertex specified by vertex 2315 when it creates the subclass facet.

Putting all of the foregoing together, when transform-XML 2115 applies tag pattern model 2301 to XML mirror model 2107 and finds a pattern <category> enclosed by <category>, as specified by pattern vertices 2303 and 2307, it applies synthesis vertices 2313, 2315, and 2317 and their facets to the information contained in the vertices in XML mirror model 2107 that match the pattern. It does so as follows:

1. As indicated by namesource facet 2311 and the properties of topcat vertex 2313, Transform-XML retrieves the name of the category from the properties of the vertex in mirror model 2107 that is matched by vertex 2303 along with a universal identifier for the matched vertex.
2. Transform-XML then uses the UID to determine whether there is already a category vertex in catalog model 2007 for the category; if there is not, Transform-XML makes a new vertex in catalog model 2007 having the name and UID as properties; the new vertex is given a name that distinguishes it from any vertex in catalog model 2007 that has the same name but a different UID as properties;
3. Transform-XML does the same with the name and UID from the properties of the vertex in mirror model 2107 that is matched by vertex 3307;
4. It then modifies the attributes of the vertices located or created in steps 2 and 3 so that they specify the facets required by the subclass relationship specified in vertex 2319 of the model. The information required to modify the attributes is contained in subclass facet 2319. As indicated by datasource facet 2317, the subclass facet itself will be in the vertex of model 2007 specified by topcat vertex 2313 and will have the name of the vertex of model 2007 specified by botcat, again as indicated by namesource facet 2311.

Tag Pattern Model 2321

Tag pattern model 2321 matches the pattern <product> vertex enclosed by <category > vertex. An example of the pattern is found at vertices 2203(d) and 2203(e) in FIG. 22 and the result of the transformation is shown at vertices 2011 and 2017 in catalog model 2007. As shown there, the transformation required when a match occurs is making or locating an instance vertex for the product that is attached to the class vertex for the category and making an item of facet for the instance in the class vertex. The transformation is comparable in all respects to that specified by tag pattern model 2321, except that an instance vertex and the facets required for such a vertex are produced instead of a class vertex.

Tag Pattern Model 2333

This tag pattern model matches the pattern <attribute> vertex enclosed by <category> vertex. The corresponding pattern in catalog model 2007 is a class vertex that contains the information from the attributes in its properties. There are two synthesis vertices: combol 2337 and product 2339. Combo vertices are synthesis vertices that combine information from pattern vertices. combol 2337 combines information from the mirror model 2119 vertices that match the pattern specified by vertices 2323 and 2335 and the Part Of facet and either makes a new vertex for the class specified by <category> vertex 2323 in model 2007 and places the information from <attribute> 2335 in the new vertex's properties or finds the already existing vertex in model 2007 and adds the information from the attribute to the vertex's properties.

The properties in combol vertex 2337 and category vertex 2339 that are relevant for propagation of information from the vertices and facets of the matched pattern in the source model to the target model are shown in the following tables:

| Property name | Property value |
|---|---|
| Properties in combo1 vertex 2337 | |
| name_name | ^ [attr_name] |
| data_val | ^ [attr_value] |
| data_attr | ^ [attr_name] |
| synth | combo |
| name_uid | ^ [name] |
| Properties in category vertex 2339 | |
| prop_ocf_ ^ [attr] | ^ [val] |
| prop_desc | ^ [name] |
| prop_uid | ^ [uid] |
| synth | category |
| prop_name | ^ [name] | combol 2337 has NameSource pointing to <category> pattern vertex 2323 and DataSource pointing to <attribute> pattern vertex 2335. Suppose that the matched vertices of mirror model 2017 represented category and attribute tags in the original OCF XML document that looked like this:

```
<category name="Shirts">
    <attribute name="Fabric" value="cotton"> </attribute>
</category>
```

Given the above properties in the synthesis vertices and the above content of the OCF XML document, Transform-XML agent 2115 populates combol 2337 with properties based on the propagation properties. A property called name is made, its value is the value of the property attr_name from the matched category vertex of mirror model 2017, which, in turn, has the value "Shirts" of the category structure in the XML document that corresponds to the matched category. Transform-AML agent 2115 similarly makes properties called val and attr are from the name and value attributes of the mirror model vertex corresponding to the OCF <attr> construct("cotton" and "Fabric"). Finally, agent 2115 makes the "uid" property from the UID in the name property of the mirror model vertex corresponding to the <category> structure. Next, Transform_XML creates a new concept vertex in the catalog target model as specified by category vertex 2339. The values for the properties of the new concept vertex come from the properties of category vertex 2339 that have the prop_prefix and as shown in the table above, the values for these properties are obtained from combol 2337, as specified by NameSource facet 2311. Thus, prop_desc ^[name] specifies that the property called "desc" in the target vertex is to be set to the value of the name_name property of combol. The value of name_name has already been set to the name of the attribute construct in the OCF XML document. Notice finally the propagation property prop_ocf_^[attr]. The name of this property of combol for this match is node is now prop_ocf_fabric. As specified by this name, Transform-XML agent 2115 creates a property in the concept vertex of the target model called "ocf_Fabric". The value of this property is given by ^[val] in category vertex 2339. That value in turn comes via the matched <attribute> vertex of mirror model 2017 from the "value" attribute of the <attr> XML construct in the OCF XML document, i.e., "cotton". The end result of all of this is a concept vertex in the target model whose name is something like "Shirts1", whose description is "Shirts", with a property ocf_fabric", value "cotton". "Shirts" becomes the unique name "Shirts1" so that Transform-XML does not confuse the concept vertex with others of the same name.

Tag Pattern Model 2401

Tag pattern model 2401 matches the pattern in mirror model 2107 of a <product> vertex followed by an <attribute> vertex. Such a pattern requires two responses:

1. the information in the <attribute> vertex must be added to the properties of the instance vertex in catalog model 2007 corresponding to the <product> vertex; and
2. if there is an attribute model for the kind of attribute represented by the <attribute> vertex, the vertex for the concept in the attribute model that corresponds to the attribute's value must be connected by an exhibitor facet to the instance vertex in model 2007.

To make response (2) more concrete, <product> vertex 2203(f) in mirror model portion 2201 ENCLOSES an <attribute> vertex 2203(g) for an attribute which has the name fabric and the value wool. If the Ariadne application that includes catalog model 2007 also has a fabric attribute model with a concept vertex for each of the kinds of fabrics that appear in the products which have instance vertices in catalog model 2007, then instance vertex 2019 in catalog model 2007 that corresponds to <product> vertex 2203(f) in mirror model portion 2201 needs to have an exhibitor facet to a wool vertex in the fabric model. The two responses guarantee that the fabric model is automatically kept current with catalog model 2007.

The synthesis vertices 2304 in tag pattern model 2401 include combol vertex 2407, product vertex 2411, pivot vertex 2409, and pivot-instance vertex 2413. combol 2407 specifies the information that is to be collected from the vertices of the mirror model matched by <product> vertex 2403 and <attribute> vertex 2405 for use in the vertex of catalog model 2007 representing the instance and the vertex having the attribute's value of the attribute model having the attribute's name. product vertex 2411 specifies the instance node in catalog model 2007 which must be created or modified to include the attribute information from the vertex matched by <attribute> vertex 2405. pivot vertex 2409 specifies the concept node in the attribute model specified by the attribute name in vertex 2405 that corresponds to the attribute value specified in vertex 2405. pivot-instance vertex 2413 specifies the exhibitor facet that connects the instance vertex specified by product vertex 2411 to the concept vertex specified by pivot vertex 2409.

As indicated by the facets in model 2401, transform-XML obtains the product name and attribute information needed for combol vertex 2407 from the vertices of the mirror model matched by vertices 2403 and 2405 and obtains the attribute information needed to find and if necessary make the concept for the attribute in the attribute model from the vertex of the mirror model matched by vertex 2405; then transform-XML uses the information in combol 2407 as specified in product node 2411 to find or if necessary make the vertex in catalog model 2007 for the instance that represents the <product> vertex in the mirror model matched by vertex 2403. Finally, transform-XML uses the information in pivot_instance 2413 to make the exhibitor facet linking the concept of the attribute model to the instance vertex in catalog model 2007. Of course, as required by Ariadne's model type definitions, the creation of the exhibitor facet also results in the creation of an exhibitor-of facet.

Details of XML Transform Agent 2115

There follows the specification of XML transform agent 2115:

signature: transform-xml (XML-mirror, grammar instance)

calling context: transform-xml is not really an agent on the tag-pattern model type; rather, it takes a model-instance, where the model corresponding to that instance is assumed to be of type tag-pattern. transform-xml is called by import-xml on a model of type xml-document.

facets used: Part Of properties used: match-action, pattern, final, tags motivation: transform-xml is a parser that uses grammar rules in the form of models (of type tag-pattern) to parse a model of type xml-document.

description: transform-xml performs a recursive descent parse of XML mirror model 2107, searching for patterns that match the ordered set of tag pattern models 2110 specified by configure_transform 2113. Pattern vertices 2302 in the set of tag pattern models 2110 are matched to patterns of vertices in mirror model 2107. A pattern vertex matches simply if the type of the vertex in mirror model 2107 is listed on the tags property of the pattern vertex.

Matching is implemented through an agenda mechanism. The matcher component matches a graph that is a component of another graph. The matcher must find all the matches, so when it reaches a new node, the problem is a sort of OR/AND problem; there are several ways the component graph might match, any one of which could lead to success (that's the OR), but for each of these, there is a set of conditions, all of which must hold (there's the AND). The agenda mechanism keeps track of what the matcher is working on, and what remains to be done.

The agenda is made up of a list of items. Each item corresponds to a possible match; when an item finishes (all its parts match), then we have one successful match, and we can call the synthesis routine. Each item is made up of tasks. All tasks in an item must complete successfully in order for the item to match. A task is made up of two parts; the first of the parts is a pattern to be matched and the second is a list of portions of the source model that are possible matches. The task will succeed exactly if each of the patterns can find a match somewhere in the source list (in order, but possibly with intervening sources).

The algorithm implemented in transform-XML processes this agenda; when a match is found, appropriate tasks and items are placed back on the agenda as required to ensure that every possible match will be found. When an item has no more tasks, it is complete, and the corresponding portion of the target model can be synthesized. When the agenda has no more items, every possible match has been found. When a match fails, that task fails, and its containing item is discarded from the agenda.

Details of Configuring Transform XML 2115

As already indicated, the transform-XML agent works with any collection of tag pattern models 2110. In a preferred embodiment, the tag pattern models 2110 are collected as instances in tag pattern models 2109. Tag pattern models 2109 itself is a model of type Simple Taxonomy with three concepts: XML type, a concept under which the tag pattern models 2110 for performing XML translations are collected, and two subclasses of that concept, Input and Output. The tag pattern models used to translate from XML mirror model 2107 to catalog model 2007 are instances of the Input subclass; those used to translate from catalog model 2007 to XML mirror model 2119 are instances of the Output subclass. As can be seen from the above description, tag pattern models 2109 may also contain tag pattern models for model transformations other than those involved in XML translation.

Configure-translations agent 2113 permits the user to specify the tag pattern models from 2109 which transform-XML 2115 will apply to an XML mirror model, the order in which it will apply them, and the target model which will be made or modified by the application of the tag pattern models to the mirror model. The order is important, since the synthesis parts of the tag pattern models presume the existence of certain parts of the target model. For example, the tag pattern models 2301, 2321, 2333, and 2401 must be applied in the order 2301, 2321, 2333, and 2401. Configuration is by means of a window in which the user can select and order tag pattern models and can specify the model type that is to be created.

In a preferred embodiment, the ordered list of tag pattern models produced by configure-translations agent 2113 is termed an XML type. Configure-translations agent 113 associates the XML type with the model type of the source model and the model type of the target model. When the transform-XML agent runs on a model of the type of the source model, it uses the XML type associated with the source model's type to produce a model of the destination model's type. This arrangement permits transform-XML to be used with source and destination model pairs having any combination of model types.

Figure 26:
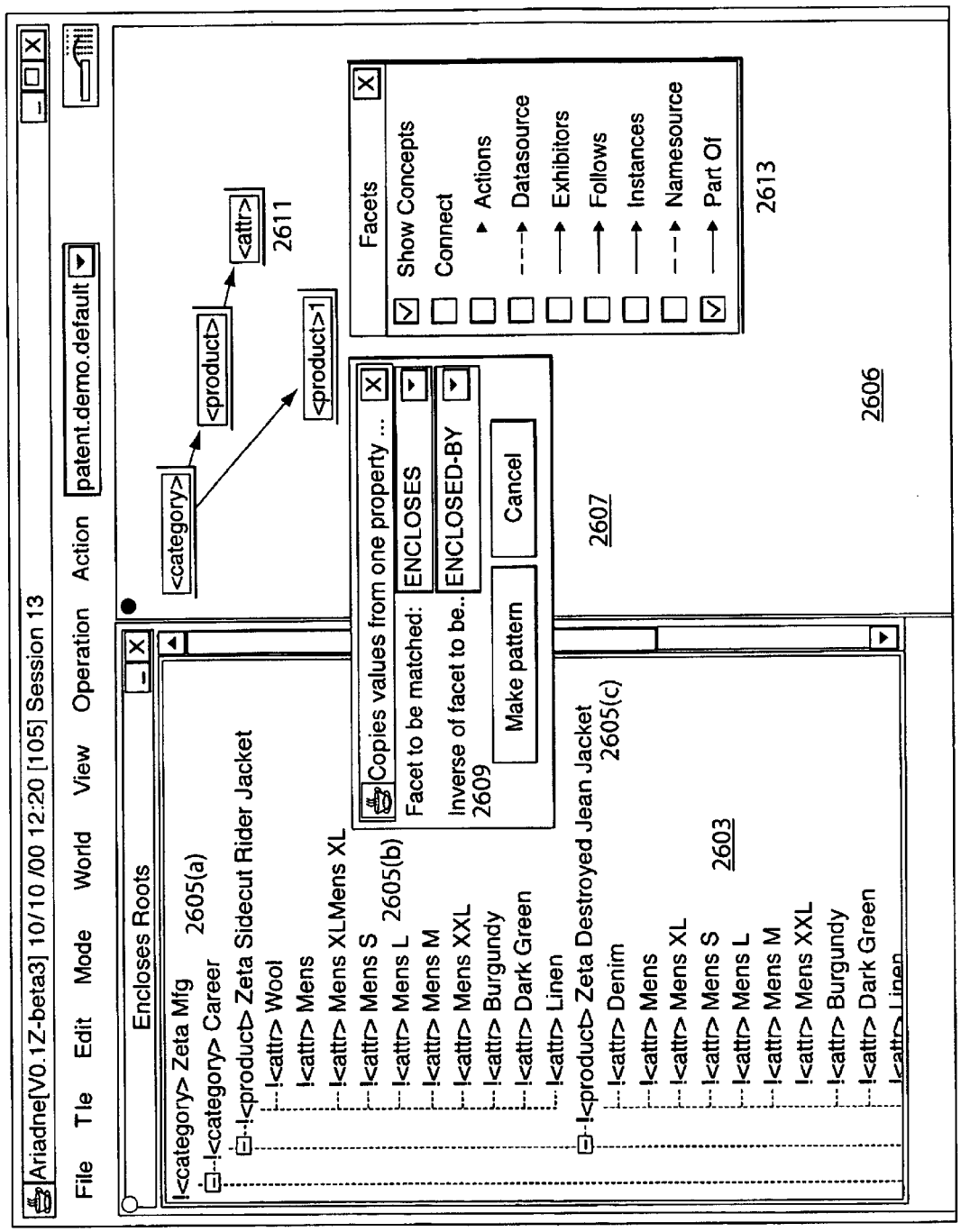
FIG. 26 shows the GUI used to define pattern vertices in a tag pattern model by specifying vertices in a source model.

Making Tag Pattern Models: FIG. 26

There are two parts to making a tag pattern model 2110: specifying pattern vertices 2302 and specifying synthesis vertices 2304. In the Ariadne system, pattern vertices 2302 can be specified interactively using graphical user interface 2601 shown in FIG. 26. The window of interface 2601 has two main parts: subwindow 2603 shows a model that contains the patterns to be matched by the tag pattern model; here the model is a portion of an XML mirror model 2107; the remaining portion 2606 of the window is the Ariadne system's standard graphical user interface for making models in the Ariadne system. Here, it shows model 2611, which is the pattern part 2302 of a tag pattern model 2110. As befits the pattern part, the vertices are connected by a Part Of facet. The user of the interface will use the standard model making interface to construct the synthesis part of the model.

The user has made model 2611 by selecting the vertices 2605(a, b, and c) of the XML mirror model 2107 shown in window 2603 as the vertices to be matched and by using floating window 2607 to specify which facet of the source model is represented by the Part Of facet of tag pattern model 2611. In this case, of course, it is the Encloses facet. After having selected the vertices and the facet, the user clicks on make pattern button 2609 and the Ariadne system produces model 2611. As part of producing model 2611, the Ariadne system asks the user for a name for the model. Model 2611 has nodes corresponding to the smallest subtree of the model in window 2603 which is necessary to contain the selected vertices. It is for these reason that model 2611 has nodes corresponding not only to category node 2605(a), attribute node 2605(b), and product node 2605(c), but also to product node 2605(d), since it is that node which ENCLOSES attribute node 2605(b).

Figure 25:
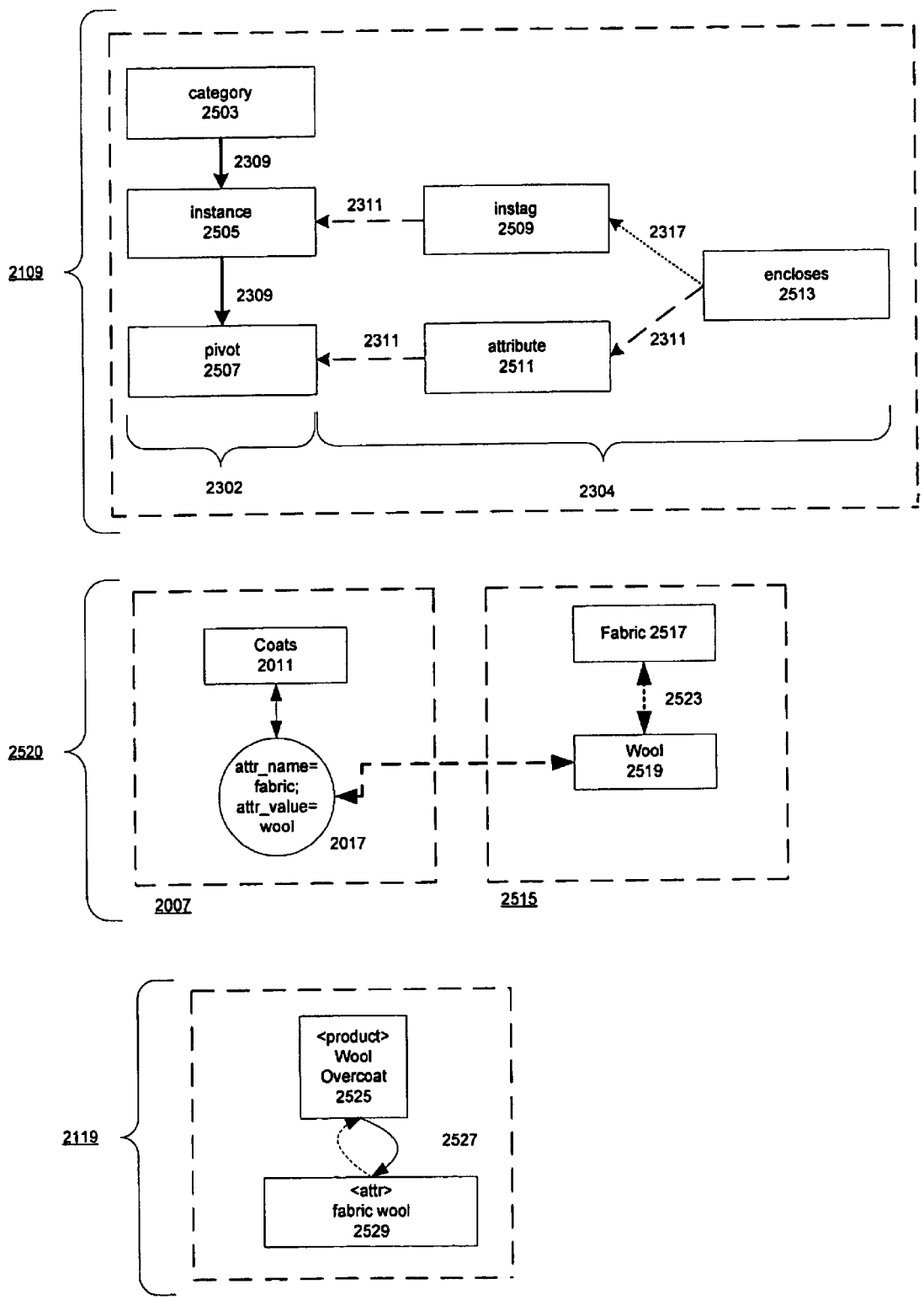
FIG. 25 shows a tag pattern model used to translate a catalog model into an XML mirror model.

Details of Transforming an Ariadne Model into an XML Document: FIG. 25

The translation of an Ariadne model such as catalog model 2007 into an XML document employs the techniques just described for the translation of an XML document into an Ariadne model. The only differences are that the source model is catalog model 2007, that the destination model is the mirror model 2119 for the XML document being output, and that Export-XML agent 2117 translates mirror model 2119 into an XML DOM graph for output to the ERIS XML adapter, which produces destination XML document 2027 from the XML DOM graph. The tag pattern models 2110 match patterns in catalog model 2007 and produce vertices in mirror model 2119, and as before, configure-translations agent 2113 is used to select the tag pattern models and specify the order in which they will be applied.

FIG. 25 shows portions of four Ariadne models, tag pattern model 2109, catalog model 2007, a fabric model 2515 which is a taxonomy model whose vertices represent different classes of fabrics, and XML mirror model 2119. The tag pattern model 2110 shown at 2501 is an output tag model. Output tag model 2501 matches a pattern 2520 that involves two models: catalog model 2007 and another model that has a concept connected to an instance of catalog model 2007 by an exhibitor-of facet. Model 2501 then transforms a portion of the two models having pattern 2520 into a portion of XML mirror model 2119 like that shown: namely, a vertex representing a product that ENCLOSES a vertex representing an attribute. In FIG. 25, the exact portion of catalog model 2007 being matched is coats concept vertex 2011 and the instance vertex 2017 for a wool overcoat. One of the properties of instance vertex 2017 is an attribute with the name fabric and the value wool. fabric model 2515 has a concept vertex named wool, and thus instance vertex 2017 also has an exhibitor-of facet 2521 linking instance vertex 2017 for the wool overcoat product to the wool vertex 2519.

When transform-XML agent 2115 finds the pattern specified at 2302 in catalog model 2007, namely a concept vertex that has an instance vertex that has an exhibitor-of facet, it does the action specified in instag vertex 2509: it retrieves the name of the product from the matched product vertex's properties and places it in instag vertex 2509 of tag pattern model 2501; it also does the action specified in attribute vertex 2511: it retrieves the attribute name and value from the exhibitor-of facet and places it in attribute vertex 2511; it then does the action specified in encloses node 2513: it finds or constructs a <product> vertex 2527 in mirror model 2119 corresponding to instag vertex 2509; if the vertex is new, it places the product name in that vertex. Next, it constructs a vertex 2529 in mirror model 2119 corresponding to attribute vertex 2511 and places the attribute name and value in that vertex; finally, it connects new product tag vertex to the new attribute vertex with an encloses facet, as specified in encloses vertex 2513 of the tag pattern model. The facet constraints for the mirror model type provide for the construction of the Enclosed-By facet.

Conclusion

The foregoing Detailed Description has disclosed to those skilled in the relevant arts how to make and use an environment for composing software in which a program is made up of one or models belonging to user-defined model types, of agents executing in the environment provided by the models, and adapters which access objects that are represented by vertices in the models. As disclosed herein, the environment for composing software permits the separation of control functions (performed by the agents) from information about the context in which the control functions operate. The Detailed Description has further disclosed how the software composition environment may be used to make a system which will translate XML documents into models and vice-versa and how such a system may be used to translate an XML document having one DTD into an XML document having another DTD by translating the first XML document into a model representing the semantics of the XML document and translating the model into the second XML document. The system for translating XML documents into models employs a general technique for translating any XML document into a mirror model that reflects the structure of the XML document and a general technique of using tag pattern models to obtain information from one model and using it to make or modify another model. In the system for translating XML documents, the tag pattern models are used to translate mirror models into semantic models. Those portions of the Detailed Description which are new in this application disclose the best mode known to the inventors of implementing what is described in those portions at the time this application was filed.

It will be immediately apparent to those skilled in the arts to which the inventions described herein belong that there are many ways other than the one disclosed herein to implement a software composition system that makes programs out of models, agents, and adapters. It will further be apparent that there are ways other than the one disclosed herein to translate between an XML document having one DTD and an XML document having another DTD by translating the first document into a semantic representation of the XML document and translating the semantic representation into the second XML document. There are additionally ways other than the ones disclosed herein to make mirror models from nested data and tag pattern models that translate mirror models into semantic models and vice-versa. Indeed, as their nature and use implies, there are as many ways to make tag pattern models as there are ways of solving a programming task generally.

For all of the foregoing reasons, the Detailed Description is to be regarded as being in all respects exemplary and not restrictive, and the breadth of the invention disclosed herein is to be determined not from the Detailed Description, but rather from the claims as interpreted with the full breadth permitted by the patent laws.

What is claimed is:

1. Apparatus for controlling a processor that has access to a storage device, the apparatus comprising:

a model type in the storage device that defines a class of models, a model being a graph that has one or more entities as vertices;

an agent in the storage device that is associated with the model type and specifies an operation to be performed in a context provided by a model of the class defined by the model type; and a particular model of the model type in the storage device to which the agent has been made available, the processor responding to the agent by performing the operation specified thereby in the context provided by the particular model.

2. The apparatus for controlling a processor set forth in claim 1 further comprising:

a set of one or more definitions of events in the storage device, the agent being further associated with a definition of an event and the processor responding to the event defined in the definition by performing the operation specified by the agent in the context of the particular model.

3. The apparatus for controlling a processor set forth in claim 2 wherein:

the set of definitions of events is a model.

4. The apparatus for controlling a processor set forth in claim 1 wherein:

there is a plurality of the particular models; and the agent is available to more than one of the particular models.

5. The apparatus for controlling a processor set forth in claim 1 wherein:

there is a plurality of the particular models; and a given vertex belongs to more than one of the particular models.

6. The apparatus for controlling a processor set forth in claim 1 wherein:

there is a plurality of the model types; and the agent is associated with more than one of the model types.

7. The apparatus for controlling a processor set forth in claim 1 wherein:

the agent is made available to the particular model when the agent is an entity in the particular model.

8. The apparatus for controlling a processor set forth in claim 1 wherein:

the model type defines a facet type that specifies a type of relationship to a vertex of a model of the type; and the particular model has a facet of the facet type; and the processor manipulates the particular model as specified by the facet type definition for the facet.

9. The apparatus for controlling a processor set forth in claim 8 wherein:
there is a plurality of the facet types defined in the model type.

10. The apparatus for controlling a processor set forth in claim 9 wherein:
there is a plurality of vertices in the particular model, ones of the plurality of vertices being related to others thereof by facets having types belonging to the plurality of types.

11. The apparatus for controlling a processor set forth in claim 10 wherein:
a given vertex has a plurality of facets of different facet types.

12. The apparatus for controlling a processor set forth in claim 8 wherein:
the facet type definition specifies a set-theoretic character of the relationship.

13. The apparatus for controlling a processor set forth in claim 8 wherein:
the facet type definition specifies a constraint on the facet.

14. The apparatus for controlling a processor set forth in claim 8 wherein:
the facet type definition specifies a propagator on the facet.

15. The apparatus for controlling a processor set forth in claim 1 wherein:
there is a plurality of the vertices;
the vertices of a first subset of the vertices are instance vertices representing things; and
the vertices of a second subset of the vertices are vertices representing abstractions concerning the things represented by the first subset of the vertices.

16. The apparatus for controlling a processor set forth in claim 15 wherein:
an instance vertex may represent an instance of an abstraction represented by a vertex of the second subset.

17. The apparatus for controlling a processor set forth in claim 15 wherein:
an instance vertex may exhibit a property represented by a vertex of the second subset.

18. The apparatus for controlling a processor set forth in claim 15 wherein:
there is a plurality of the particular models; and
a vertex in the first subset represents another particular model.

19. The apparatus for controlling a processor set forth in claim 15 wherein the apparatus further comprises:
things represented by the instance vertices in the storage device; and
a thing represented by an instance vertex is locatable from the instance vertex.

20. Apparatus employed in a system having a processor and storage accessible thereto for using information contained in a first graph stored in the storage to make or modify a second graph stored in the storage, both graphs having vertices containing information that are joined by edges specifying relationships between the vertices, the apparatus comprising:
a third graph stored in the storage, the third graph including
a pattern part that specifies a pattern of vertices and/or edges in the first graph and
a synthesis part that specifies a modification of the second graph; and
code stored in the storage and executable by the processor that matches the pattern part to vertices and/or edges having the pattern in the first graph and uses information from the matched vertices and/or edges in the first graph as specified in the synthesis part to make or modify the second graph.

21. The apparatus set forth in claim 20 wherein:
the first graph and the second graph have types; and
the third graph is associated with the types of the first and second graphs.

22. The apparatus set forth in claim 20 wherein:
there is a plurality of the third graphs; and
the code matches the third graphs to the first graph in a predetermined order.

23. The apparatus set forth in claim 22 wherein:
the predetermined order is associated with the types of the first and second graphs.

24. The apparatus set forth in claim 20 wherein:
there is a plurality of predefined ones of the third graphs; and
a user of the apparatus selects a set of the third graphs from the predefined ones and determines an order in which the third graphs in the set are matched to the first graph.

25. The apparatus set forth in claim 24 wherein:
the user further associates the selected and ordered set of the third graphs with the types of the first and second graphs.

26. The apparatus set forth in claim 24 further comprising:
a graphical user interface for selecting the set of third graphs and determining the order.

27. The apparatus set forth in claim 20 further comprising:
a graphical user interface for specifying a pattern part in the third graph by selecting one or more vertices in the first graph.

28. The apparatus set forth in claim 27 wherein:
the graphical user interface further specifies the pattern part by specifying a class of edge in the first graph.

29. The apparatus set forth in claim 28 wherein:
the first graph is hierarchical; and
when the graphical user interface selects a plurality of the vertices, the pattern part in the third graph includes vertices corresponding to the vertices in the smallest subtree with regard to the selected class of edge in the first graph that contains the selected vertices.

30. The apparatus set forth in claim 20 wherein:
a vertex of a pattern part matches a class of vertex in the first graph and an edge of a pattern part matches a class of edge in the first graph.

31. The apparatus set forth in claim 30 wherein:
an annotation in the vertex of the pattern part specifies the class of vertex or the class of edge.

32. The apparatus set forth in claim 20 wherein:
the synthesis part includes a vertex that that specifies a class of vertex or a class of edge that is to be made or modified in the second graph.

33. The apparatus set forth in claim 32 wherein:
an annotation in the vertex specifies the class of vertex or class of edge.

34. The apparatus set forth in claim 32 wherein:
the synthesis part further includes a vertex that combines information from a plurality of vertices in the third graph for use in a further vertex of the synthesis part.

35. The apparatus set forth in claim 32 wherein:

an edge in the synthesis part together with an annotation in a vertex of the synthesis part specifies a portion of a flow of the information via the third graph from the matched vertices of the first graph to the edges and/or vertices being made or modified in the second graph.

36. Apparatus employed in a system having a processor and storage accessible thereto for producing a model having a plurality of vertices and facets in the storage, the apparatus comprising:

a linear representation of a plurality of nested entities in the storage; and code stored in the storage and executable by the processor that makes the model in response to the linear representation, the graph having vertices representing the entities and facets representing the nesting.

37. The apparatus set forth in claim 36 wherein:

the entities in the linear representation have content; and the code associates content from the entity with the vertex corresponding to the entity.

38. The apparatus set forth in claim 36 wherein:

the linear representation is an XML document and the entities are XML constructs.

39. Apparatus employed in a system having a processor and storage accessible thereto for producing a linear representation in the storage, the linear representation having a plurality of nested entities and the apparatus comprising:

a model in the storage, the model having vertices connected by facets indicating an enclosure relationship; and code stored in the storage and executable by the processor that makes the linear representation in response to the graph, entities in the linear representation corresponding to vertices in the graph and the entities being nested in the linear representation as indicated by the facets of the graph.

40. The apparatus set forth in claim 39 wherein:

the vertices in the graph are associated with content; and an entity in the linear representation corresponding to a vertex contains the content associated with the vertex.

41. The apparatus set forth in claims 39 wherein:

the linear representation is an XML document and the entities are XML constructs.

* * * * *